(12) United States Patent
Miller et al.

(10) Patent No.: US 10,930,144 B2
(45) Date of Patent: Feb. 23, 2021

(54) SYSTEMS AND METHODS FOR COLLABORATIVE ROAD USER SAFETY

(71) Applicant: Labyrinth Research LLC, Gainesville, FL (US)

(72) Inventors: Victoria J Miller, Gainesville, FL (US); Kevin L Miller, Gainesville, FL (US)

(73) Assignee: Labyrinth Research LLC, Gainesville, FL (US)

( * ) Notice: Subject to any disclaimer, the term of this patent is extended or adjusted under 35 U.S.C. 154(b) by 0 days.

(21) Appl. No.: 16/679,222

(22) Filed: Nov. 10, 2019

(65) Prior Publication Data

US 2020/0074853 A1 Mar. 5, 2020

Related U.S. Application Data

(63) Continuation of application No. PCT/US2019/048107, filed on Aug. 26, 2019.
(Continued)

(51) Int. Cl.
*G08G 1/01* (2006.01)
*G08G 1/00* (2006.01)
(Continued)

(52) U.S. Cl.
CPC ......... *G08G 1/0141* (2013.01); *G06F 16/182* (2019.01); *G08G 1/0125* (2013.01);
(Continued)

(58) Field of Classification Search
CPC ... G08G 1/01; G08G 1/00; H04L 9/06; H04L 9/32
See application file for complete search history.

(56) References Cited

U.S. PATENT DOCUMENTS 10,580,306 B1 * 3/2020 Harris ............... H04W 4/44
2010/0291907 A1 * 11/2010 MacNaughtan ... G06Q 30/0241
455/414.1
(Continued)

FOREIGN PATENT DOCUMENTS

DE 102016007472 A1 12/2017

*Primary Examiner* — Kira Nguyen
(74) *Attorney, Agent, or Firm* — Labyrinth Law PLLC; Kevin Miller

(57) ABSTRACT

Systems and techniques describe a collaborative road user safety service that interacts with a coordinating set of collaborative safety devices belonging to road users in order to interchange reliable information about road safety. A distributed ledger/blockchain is utilized in connection with the service to coordinate data exchange between collaborative safety device users and provide data subscribers with reliable safety data that can be used to automate ancillary technical processes. Collaborative safety devices can alert members to road safety issues and be used to confirm information about road safety by collecting sensor and telemetry data. Data subscribers can receive aggregated, anonymized, de-anonymized, or specific road user data pertaining to road users and define the terms of incentives to road users that "self-revise" if a road user's vehicle is a target vehicle via smart contract interfaces. Cryptographic token can be transferred to incentivize data sharing, accuracy, and safe road behaviors.

11 Claims, 12 Drawing Sheets

Related U.S. Application Data

(60) Provisional application No. 62/723,254, filed on Aug. 27, 2018.

(51) Int. Cl.
  *H04L 9/06* (2006.01)
  *H04L 9/32* (2006.01)
  *G06F 16/182* (2019.01)
  *H04W 4/021* (2018.01)
  *H04W 4/40* (2018.01)

(52) U.S. Cl.
  CPC .......... *G08G 1/20* (2013.01); *H04L 9/0637* (2013.01); *H04L 9/3213* (2013.01); *H04W 4/021* (2013.01); *H04W 4/40* (2018.02); *H04L 2209/38* (2013.01); *H04L 2209/84* (2013.01)

(56) References Cited

U.S. PATENT DOCUMENTS

| | | | |
|---|---|---|---|
| 2012/0226434 A1* | 9/2012 | Chiu | G08G 1/096811 |
| | | | 701/117 |
| 2013/0300581 A1* | 11/2013 | Jenkins | G08G 1/20 |
| | | | 340/903 |
| 2014/0279707 A1 | 9/2014 | Joshua et al. | |
| 2015/0099537 A1* | 4/2015 | Merithew | H04W 4/021 |
| | | | 455/456.1 |
| 2016/0061625 A1* | 3/2016 | Wang | G08G 1/012 |
| | | | 701/454 |
| 2018/0309592 A1* | 10/2018 | Stolfus | G08G 1/202 |

\* cited by examiner

SYSTEMS AND METHODS FOR COLLABORATIVE ROAD USER SAFETY

CROSS-REFERENCE TO RELATED APPLICATION(S)

This application is a Continuation of International Application No. PCT/US2019/048107, filed on Aug. 26, 2019; which claims the benefit of U.S. provisional application Ser. No. 62/723,254, filed on Aug. 27, 2018, which is incorporated herein by reference in its entirety.

BACKGROUND

Despite the increasing presence of automation and advanced safety features in vehicles, the safety of road users has been rapidly declining. In 2018, an estimated 40,000 people lost their lives to car crashes in the U.S., an increase of 14% over the last four years; in addition, about 4.5 million people were seriously injured in crashes in 2018. The number of pedestrians killed on and along U.S. roads in 2018 reached 6,227, the highest in 28 years, which represents a 35% increase since 2008 and a rise of 4% over 2017.

Nearly 1.3 million people worldwide die in road crashes each year, an average of 3,287 deaths per day. An additional 20-50 million are injured or disabled each year. The World Health Organization expects the number of deaths to reach nearly 2 million per year by 2030. The economic losses amount to around 3% of many countries' annual GDP. Road crashes are the leading cause of death for those aged 15 to 29. Road traffic injuries are predicted to become the fifth leading cause of death by 2030.

In frustration over the increasing dangerousness of roadway travel, some drivers have turned to ad-hoc methods such as posting videos of hazardous drivers on their social media accounts and web pages, telephoning the police department, or telephoning fleet watch services such as "1800-HOW'S-MY-DRIVING" to report problem drivers.

BRIEF SUMMARY

The ad-hoc activities described above have many drawbacks, not the least of which is that the entry methods for these systems (e.g., telephoning) can in themselves be unsafe for the driver reporting the hazardous behaviors. In addition, such methods are also unreliable, largely unverifiable, and provide no means for real-time data sharing, trend analysis, or automated decision-making by associated systems. In short, existing ad-hoc methods lack adequate technical systems for allowing a variety of participants to collaborate on road user safety.

Recognizing these deficiencies, systems and techniques are described herein for facilitating collaborative road user safety using a "collaborative road user safety service" that interacts with a coordinating set of devices belonging to road users ("collaborative safety devices") in order to interchange reliable information about road safety. A distributed ledger (e.g., a blockchain) of a distributed application network is utilized in connection with the collaborative road user safety service to coordinate data exchange between collaborative safety device users and, in some embodiments, to provide data subscribers with reliable safety data that can be used to automate ancillary technical processes that can have a tangible effect on improving road safety.

Thus, in one aspect, a system for a collaborative safety device, or CSD, is described that enables a road user to gather relevant and reliable data in regard to a concerning safety behavior—such as aggressive driving, speeding, and erratic behavior—and exchange this information with other users of a collaborative road user safety service. Embodiments are described in which the CSD can be used to collect sensor data and telemetry data that verifies a safety behavior and/or vehicle identification data. Embodiments are also described in which the CSD, in coordination with the collaborative road user safety service, can be used to confirm the safety behavior and/or vehicle identification data related to vehicles submitted by another proximate user. Embodiments are also described in which a CSD provides real-time information to road user members about proximate vehicles exhibiting road safety behaviors of interest or concern. Advantageous technical effects of a CSD's features in some embodiments include improved usability and techniques for gathering target vehicle identification and safety data, high reliability of data (e.g., GPS data and sensor data are automatically captured), and verification of data via technical methods of interchange with other CSDs.

In another aspect, a "collaborative road user safety service/system," or CRSS, is described to facilitate the interchange of data between CSDs for the purpose of reliably collecting vehicle identification data and safety data. In various embodiments, the CRSS coordinates the activities of other CSDs in the vicinity of a "target vehicle" reported by another CSD to serve as "confirming devices" used to confirm, validate, or suggest vehicle identification data and/or safety data associated with the target vehicle. In some embodiments, the CRSS coordinates the exchange of safety information about target vehicles to proximate CSDs and other interested parties. In some embodiments, the CRSS computes metrics to evaluate driver safety and incident severity that can be used in automated interchange with ancillary technical processes.

Some embodiments include distributed ledger-facilitated technical features to encourage participation and data sharing between members of the CRSS. These technical features facilitate the transfer of cryptographic token into and out of cryptographic token repositories belonging to or associated with members who serve various roles in the CRSS. These technical features have the advantage of encouraging data sharing between devices participating in the CRSS, in addition to having the advantageous technical effect of improving and ensuring the quality of data that is used to make road user safety assessments at all levels of collaboration, from individual safety decisions, to regulatory/enforcement performance, to road safety operations, planning, and systems design.

Some embodiments of the CRSS provide the capability for permissioned data subscribers to receive aggregated, anonymized, de-anonymized, or specific road user data pertaining to one or more road users via smart contract interfaces of the distributed application network. Some embodiments enable permissioned data subscribers to have the capability to utilize smart contracts to define the terms of incentives to road users that "self-revise" if a road user's vehicle is exhibiting a safety-related behavior. Thus, a key advantageous technical effect of the collaborative nature of the described systems and techniques is the ability to interchange highly reliable safety data between disparate data subscribers who need reliable data for complex decision-making, especially decision-making performed by automated systems.

Systems and techniques provide many additional advantageous technical effects described in relation to specific embodiments and examples herein. Also, the Examples section near the end of the Detailed Description describes a number of additional embodiments and combinations thereof.

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

DETAILED DESCRIPTION

"Road users" is a term used herein to refer collectively to everyone on or near the roadway, for example, private and commercial vehicles, motorbikes, cyclists, scooters, pedestrians, golf carts, skateboarders, and personal transporters (e.g., SEGWAY). Any road user may use a collaborative safety device as a "member" of the collaborative road user safety service to initiate a "tagging event" against another road user vehicle exhibiting a safety-related behavior ("target vehicle").

Figure 1:
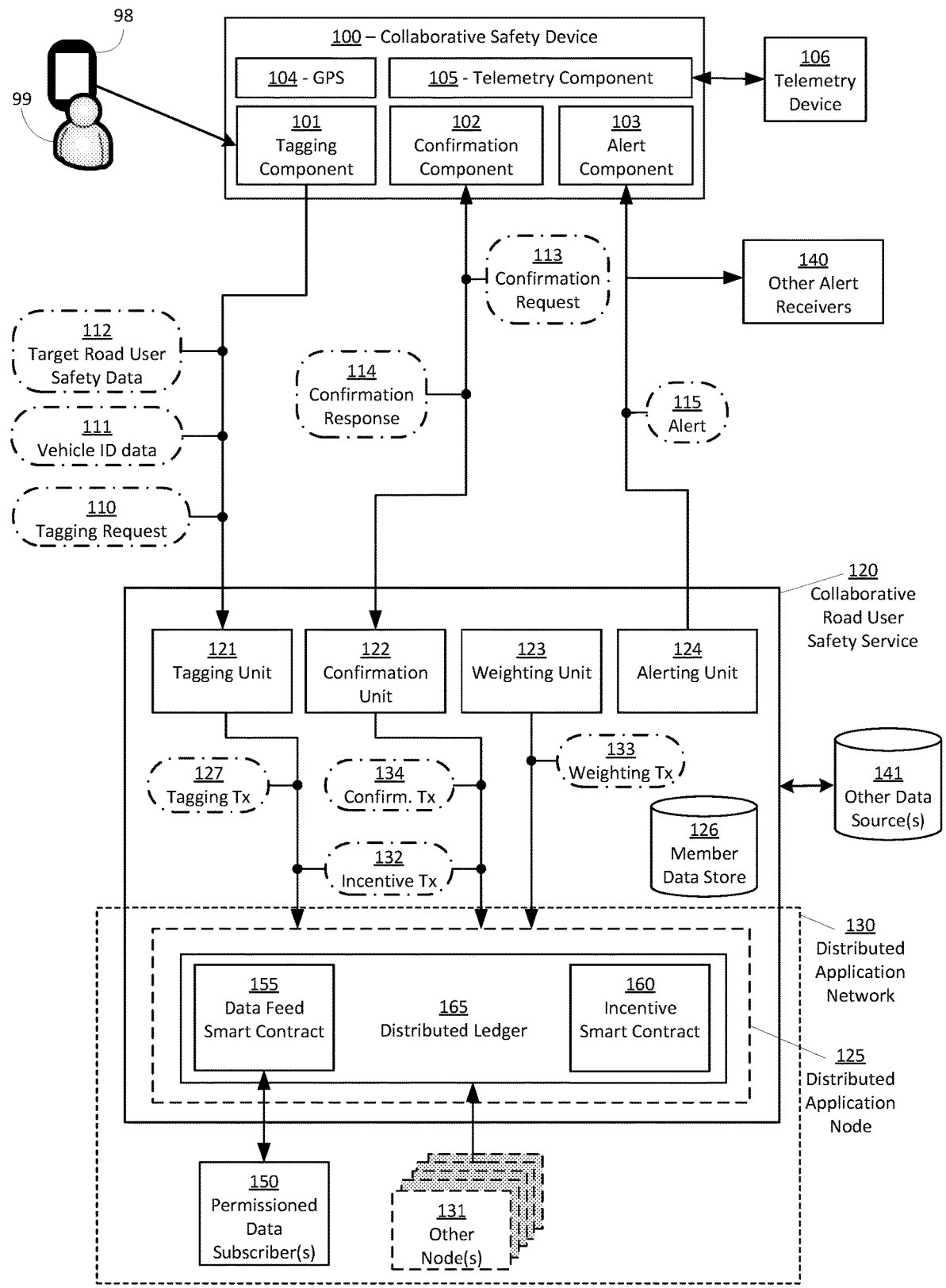
FIG. 1 shows an example system/component environment in which some implementations of systems and techniques for collaborative road user safety can be carried out.

FIG. 1 shows an example system/component environment in which some implementations of systems and techniques for collaborative road user safety can be carried out. FIG. 1 depicts one example representation or embodiment of a collaborative road user safety service/system (CRSS) and associated devices and participants who interact with the CRSS. The example in FIG. 1 shows aspects that may be optional (i.e., not necessary) in certain embodiments.

In brief, but explored below in more detail, the example component environment includes a collaborative safety device 100, which, for example, may be implemented on a mobile device 98 in the possession of a road user 99. Collaborative safety device 100 interacts with a collaborative road user safety service (CRSS) 120 by sending a tagging request 110 and other data (e.g., 111 and 112) over a network to CRSS 120. CRSS 120 may contain other components or sub-components (e.g., 121-124). Components of the CRSS 120 perform various processing tasks to facilitate systems and techniques described herein. These processing tasks are described in detail with respect to FIGS. 2B, 3A, 3C, and FIGS. 4-7. In its most basic embodiment, CRSS 120 submits, via its own distributed application node 125 belonging to distributed application network 130 (e.g., a blockchain network), a tagging transaction 127 to record the tagging request and associated data on a distributed ledger 165 collectively instantiated and shared by the distributed application network 130 member nodes. The tagging transaction 127 may be distributed to, processed by, and verified by other member nodes 131 that are members of the distributed application network 130. In certain embodiments, one or more other transactions, such as weighting transaction(s) 133, incentive transaction(s) 132, and confirmation transaction(s) 134, described in detail below, may be further submitted similarly.

Reviewing aspects of FIG. 1 in more detail, a collaborative safety device 100 (or CSD, as sometimes used herein) is situated in the possession of a road user 99 who is a member of the CRSS 120. A collaborative safety device 100 can be a device or system as described in regard to FIG. 10. Examples of system or device form factors in which the collaborative safety device 100 can be implemented include mobile devices such as smartphones, tablets, laptops, smart watches, smart glasses and other wearables, and vehicle dashboard interfaces/panels, commercial vehicle dispatch interface devices, and navigation devices. Mobile device 98 is depicted as an example of one such device form factor.

A CSD 100 may perform different processing tasks to collect and interchange data for the CRSS 120, depending on the operational needs with respect to a particular tagging request. One or more aspects of processing tasks may be implemented by components within the CSD 100, for example, a tagging component 101, a confirmation component 102, an alert component 103, a GPS component 104, and a telemetry component 105. These components may be implemented as software, firmware, hardware, or any combination thereof.

Figure 2A:
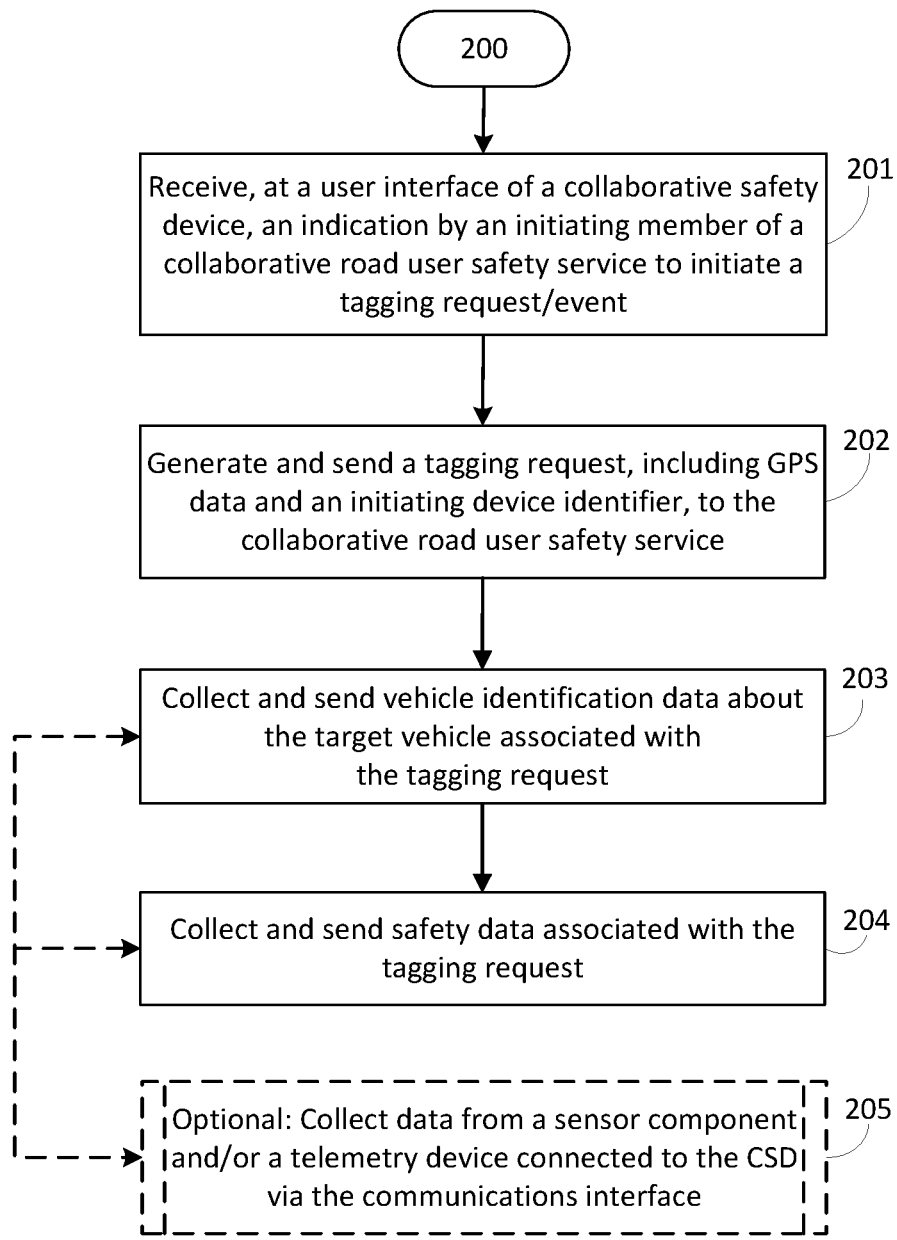
FIG. 2A shows an example process flow relating to CSD processes for initiating a tagging event and related collection aspects.

Tagging component 101, for example, may be responsible for implementing the processing tasks associated with providing interfaces to an initiating member for gathering tagging information and transmitting a tagging request 110 to the CRSS 120. To do so, tagging component 101 may provide a user interface to the initiating member (e.g., 99) for initiating a tagging request 110 and for inputting one or more data element(s) of the vehicle identification data 111 and/or the target road user safety data 112. In some cases, tagging component 101 may coordinate with other components of the CSD 100, such as the GPS component 104 or telemetry component 105, to obtain sensor data and telemetry from sensor components on or connected to (e.g., 106)

the collaborative safety device 100. FIG. 2A shows an example process flow for tagging event operations that may be performed by a tagging component 101.

Confirmation component 102, for example, may be responsible for implementing the processing tasks associated with receiving, acting on, and responding to a confirmation request 113 from the CRSS 120. A confirmation request 113, as described in more detail in regard to FIGS. 3A-3C, may be sent by the CRSS 120 to a confirming device (which may be a CSD 100) to confirm certain data in relation to a particular tagging request that originated with a different initiating device. The confirming device, via, e.g., the confirmation component 102, may receive the confirmation request 113, verify certain requested information by interacting with a confirming member via a user interface and/or coordinating with other components of the confirming device, such as the GPS component 104 or telemetry component 105, to obtain sensor data and telemetry from sensors on or telemetry devices 106 connected to the CSD 100, and then send a confirmation response 114 back to the CRSS 120 with the requested data.

Figure 4:
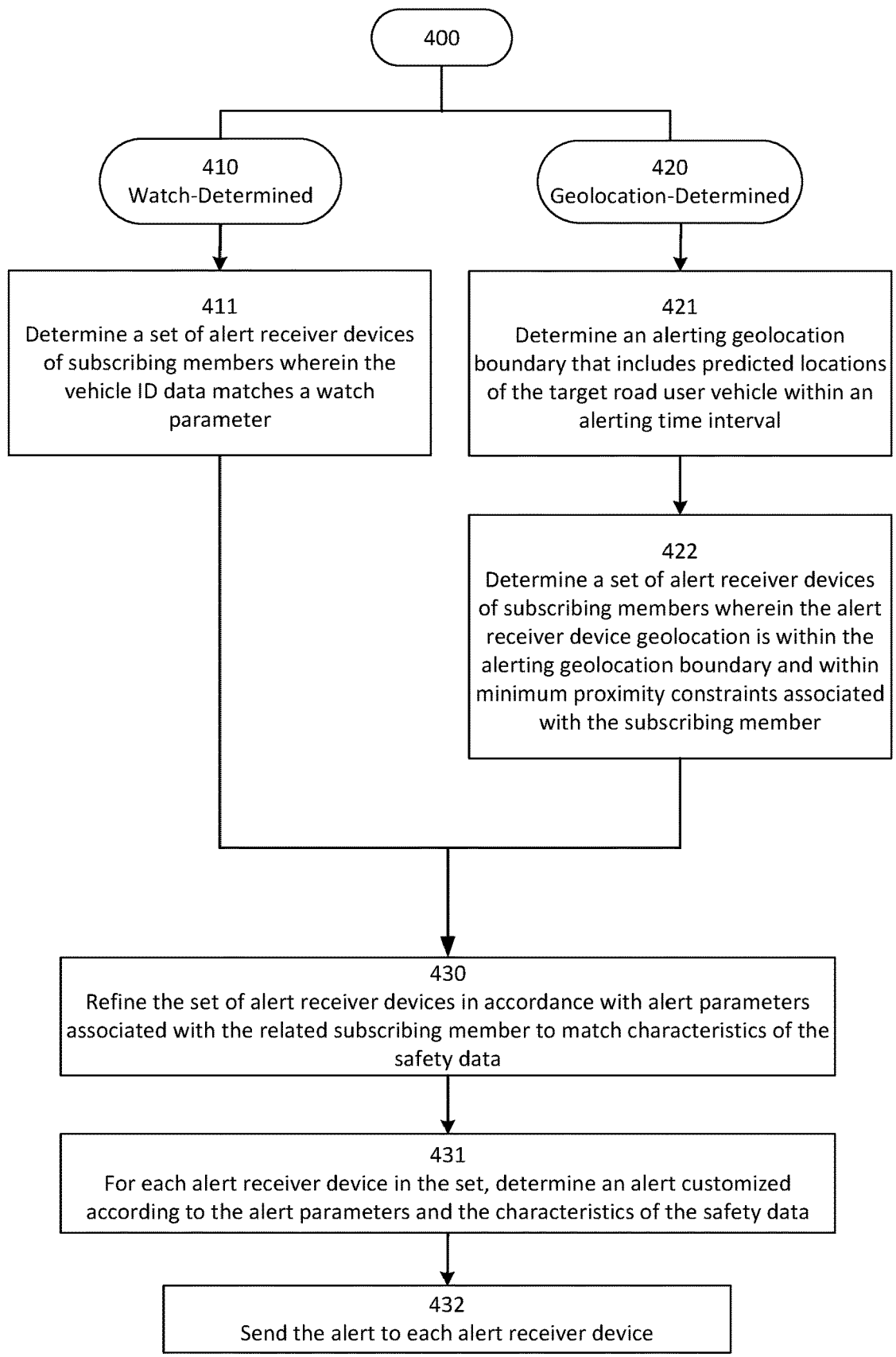
FIG. 4 shows an example process flow, appropriate to certain embodiments, for alerting and notifying members of the CRSS regarding road user safety.

Alert component 103, for example, may be responsible for implementing the processing tasks associated with receiving an alert 115 from the CRSS 120 and presenting user interface elements to notify road users who are subscribing members of the existence and/or likely proximity of a target road user vehicle to an alert receiver device (which may be, but is not necessarily, a CSD 100) in the possession of the subscribing member. FIG. 4 describes in more detail the process flows and other aspects of determining and sending an alert by the CRSS 120. In some cases, alert component 103 may coordinate with other components of a CSD 100, such as the GPS component 104.

GPS component 104, for example, may be responsible for implementing the processing tasks associated with interfacing with GPS sensors on the CSD 100 in order to provide geolocation information (e.g., in GPS coordinates or other coordinate system) and other GPS data, such as speed and direction, about the CSD 100 to the CRSS 120. GPS component 104 may provide geolocation information on demand as, for example, when an initiating member of the service uses a CSD 100 user interface to initiate a "tagging" operation of a target road user vehicle (as outlined, for example, in regard to FIG. 2A). The GPS component 104 may support any processing activities of the CSD 100, including those of any component (e.g., components 101-103 and 105). In some cases, GPS component 104 may provide geolocation information on a repeating periodic basis to the CRSS 120 (such as every few minutes, seconds, or milliseconds) to support processing activities of the CRSS 120 that are assisted by the identification of confirming devices or subscribing members with alert receiver devices who are geolocated proximate to the target road user vehicle of a particular tagging request. In some cases, the GPS component 104 provides further information in addition to geolocation (e.g., GPS) coordinates. For example, the speed and direction of travel of a CSD 100 might be determined by computing a vector from two or more geolocation coordinates (and their timestamps) gathered over a period of time. A canonical timestamp may also be included in GPS data.

Telemetry component 105, for example, may be responsible for implementing the processing tasks associated with interfacing with sensor components resident on the CSD 100, or with interacting with a telemetry device 106 that is connected to the CSD 100 via a communications interface. The telemetry component 105 may support any processing activities of the CSD 100, including those of any component (e.g., components 101-104). Types of sensor components and telemetry devices 106, their manner of connection to the CSD, and processing by the telemetry component 105 are described in detail in regard to FIG. 2A.

The described aspects of the CSD 100 (including components) may be instantiated as software (such as an application, "app," distributed application or "DApp/dApp" framework, other software layer, device driver, or hardware/software component interface), or firmware embodying program instructions that, when executed, perform certain data gathering, user interface, and user input/output operations described herein. Such instructions may be installed on the CSD 100 via an installer program or other installation process (e.g., downloading an app from the GOOGLE PLAY STORE), or they may be incorporated into existing control software (such as an operating system). Program instructions may take the form of programming language code, object code, statically or dynamically linked libraries, or any other form familiar to ordinary practitioners in the art.

The processing tasks performed in respect to a particular tagging event may, in turn, describe the role a road user member represents in any given usage instance. For instance, an initiating member of the CRSS 120 may use the CSD 100 as an "initiating device" to initiate a particular tagging request about a target road user vehicle, while a different CSD, in the possession of a different road user member ("confirming member"), acts as a "confirming device" to confirm certain data in relation to the particular tagging event. Still other CSDs may act as "alert receiver devices" that render alerts on their user interfaces to notify subscribing members about the particular tagging event. A road user member may have one or more of these roles (e.g., initiating member, confirming member, and subscribing member) in accordance with the way their CSD is being utilized with respect to a particular tagging event—which may vary according to the operational needs in any particular instance. However, not necessarily every CSD 100 implements every type of component (e.g., 101-105) or fulfills every type of processing task (e.g., tagging, confirming, and alerting); a given device 100 may fulfill one or more of these processing task types, in any combination (for example, a CSD 100 instantiated on a smart watch form factor may implement the program instructions of a tagging component 101 and alert component 103, but not of the confirmation component 102).

Figure 3A:
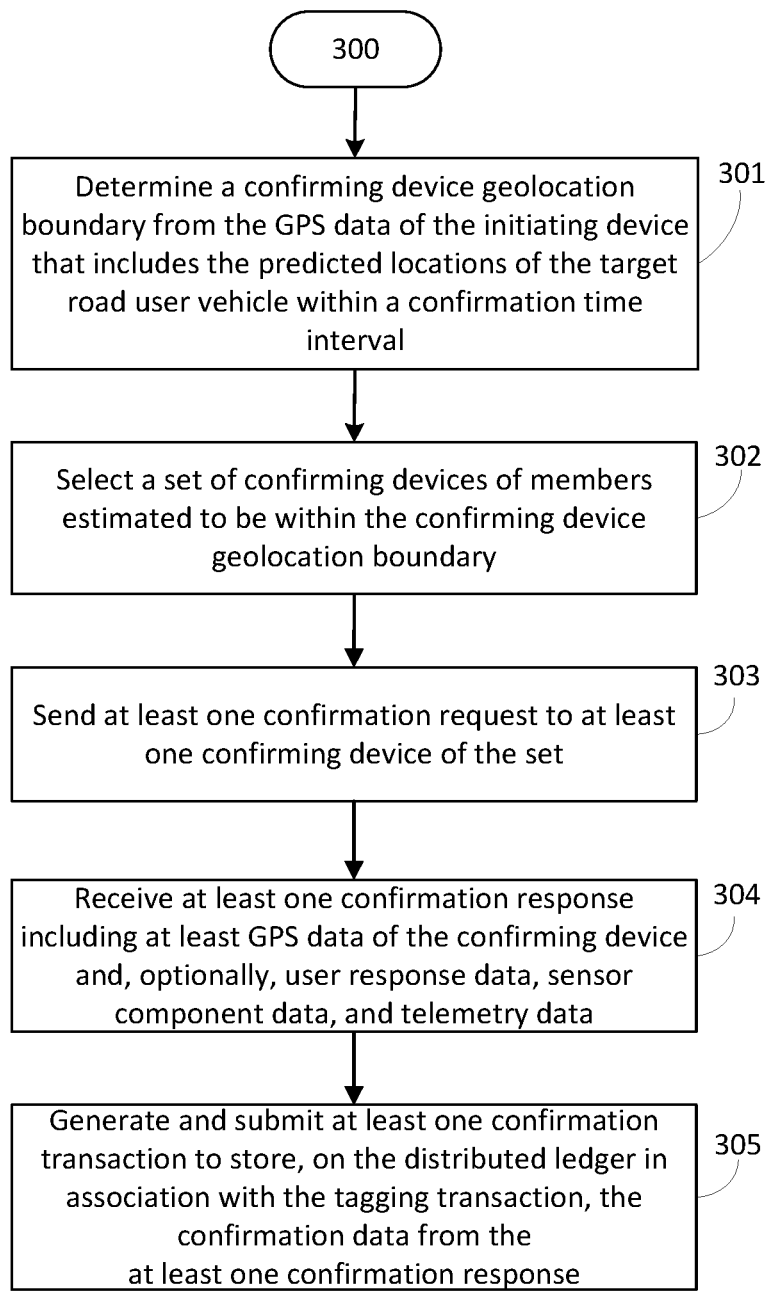
FIG. 3A shows an example process flow for determining and interacting with geolocation-determined confirming devices.
Figure 3B:
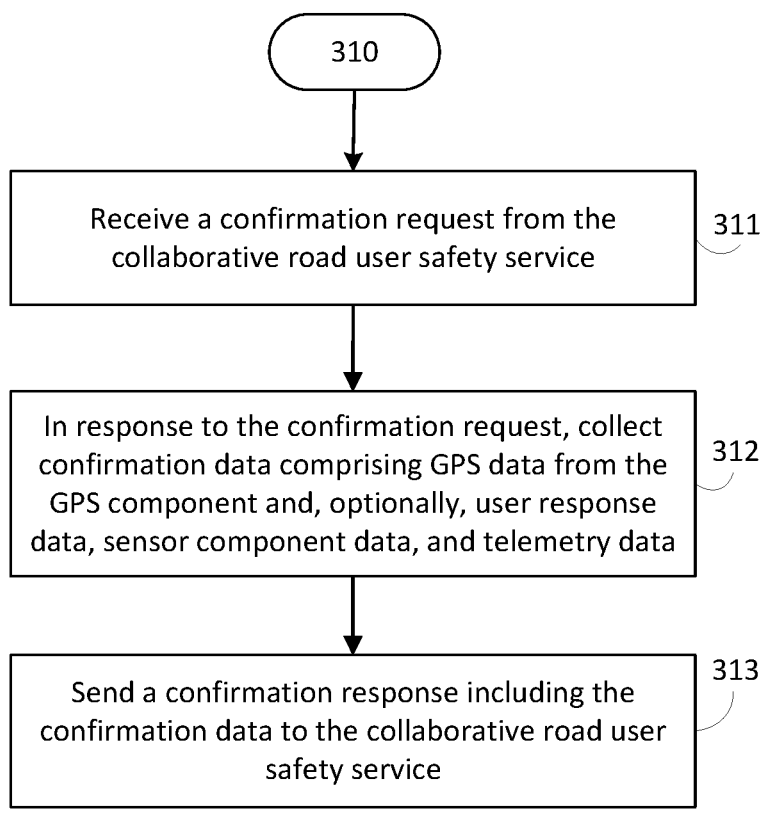
FIG. 3B shows an example process flow for facilitating the use of a collaborative safety device as a confirming device.

Various processing tasks of a CSD 100 and its associated sub-components are described in regard to FIGS. 2A, 3B, and 4.

Figure 10:
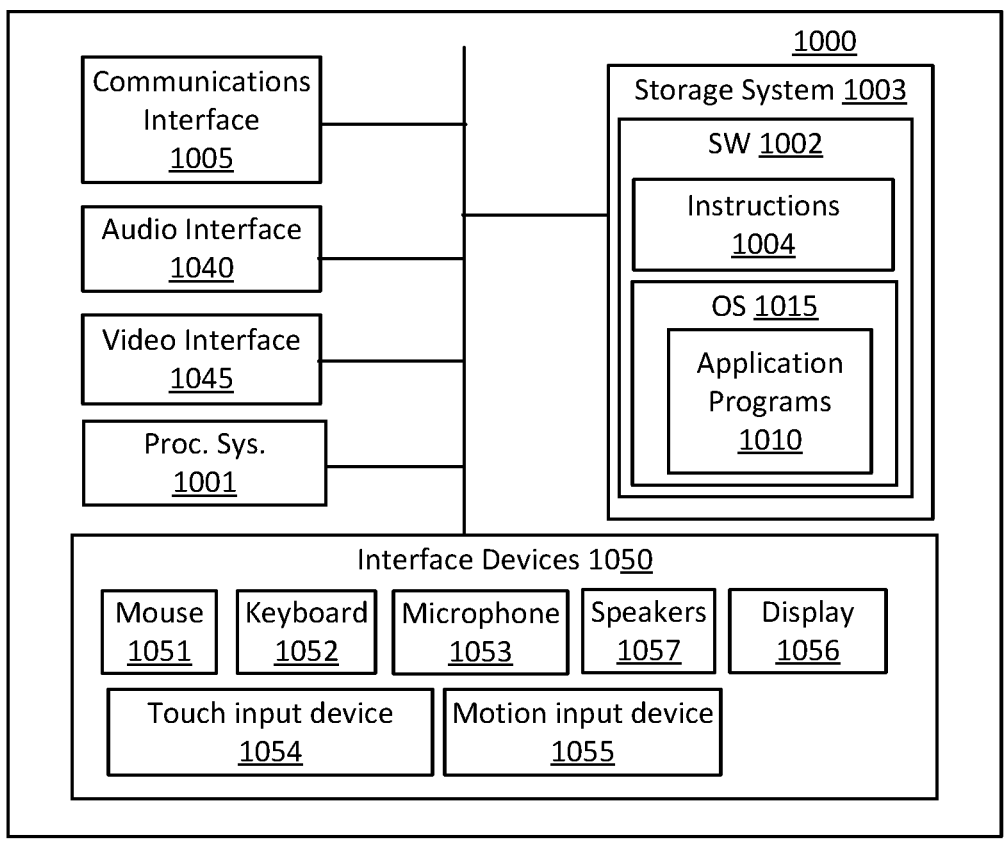
FIG. 10 shows a block diagram illustrating components of a system or computing device used in some embodiments of techniques and systems for facilitating collaborative road user safety.

CSD 100 (including its components 101-105) communicates with a CRSS 120 to send the tagging request 110 over a network using a communications interface as described in FIG. 10. CSD 100 facilitates the interaction between itself and CRSS 120, for example, by utilizing an application programming interface (API) of the CRSS 120 accessible over the network. An "API" is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational State Transfer) or SOAP (Simple Object Access Protocol) architecture. In some cases, an API may send response messages formatted in, e.g., XML (Extensible Markup Language) or JSON (JavaScript Object Notation).

The network can include, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Generally, but non-limitingly, a CRSS 120 receives the tagging request 110 (and other data from the collaborative safety device 100, such as vehicle identification data 111 and target road user safety data 112), performs various processing activities (such as weighting, confirmation, alerting, incentive transfers), and records transactions on a distributed ledger 165 of the distributed application network 130. Processing activities of a CRSS 120 are discussed in detail in the text relating to FIGS. 2B, 3A, 3C, and 4-7. However, an architectural view of a CRSS 120 and its associated distributed application network 130 architecture is salient here. FIG. 10 describes a system that may be used in some environments to implement a CRSS 120 using various types of physical and virtual computing systems and associated components.

To perform its various processing activities, CRSS 120 may be considered as one or more units (or modules, or components) that perform specific processing activities, such as tagging unit 121, confirmation unit 122, weighting unit 123, alerting unit 124, distributed application node 125, data feed smart contract unit 155, and incentive smart contract unit 160. These units may be segmented into separate, discrete codebases running on different systems, or they may reside on the same system and have a logical/conceptual separation. In the example of FIG. 1, line 120 shows a virtual system boundary surrounding components that are logically within the control of the CRSS.

Tagging unit 121, for example, may perform processing tasks associated with receiving tagging request(s) 110, concurrently or subsequently receiving vehicle identification data 111 and target road user safety data 112, and generating and submitting tagging transactions 127 on the distributed ledger 165 via distributed application node 125. These processing tasks are described in detail in regard to the example process flow of FIG. 2B. Confirmation unit 122, for example, may perform processing tasks associated with sending confirmation request(s) 113, concurrently or subsequently processing confirmation responses 114, and generating and submitting confirmation transactions 134 on the distributed ledger 165 via distributed application node 125; these processing tasks are described in detail in regard to the example process flows of FIGS. 3A and 3C. In some embodiments, tagging unit 121 and/or confirmation unit 122 may enact one or more incentive transactions 132, described later. Weighting unit 123, for example, may perform processing tasks associated with determining tagging event weighting scores and generating and submitting weighting transactions 133 on the distributed ledger 165 via distributed application node 125. These processing tasks are described in detail in regard to the example process flow of FIG. 5. Alerting unit 124, for example, may perform processing tasks associated with determining geolocation-based and watch alerts in regard to tagging events, and then sending those alerts 115 to CSDs 100 acting as alert receiver devices, and to other alert receivers 140. These processing tasks are described in detail in regard to the example process flow of FIG. 4, as are the types and varieties of other alert receivers 140.

The CRSS 120 may also have one or more associated data repositories, such as member data store 126. A member data store 126 is collectively composed of the data structures and data content that describe members of the service and their associated metadata. In general, structuring techniques for a member data store 126 can range from highly-ordered organizations of information—where each data element has a place in a rigidly defined structure—to loose collections of unstructured data. Highly-ordered information collections may be managed by relational database management systems (RDBMS), which have the advantages of fast indexing and transactional integrity on changes to data. In some cases, flexible collections of unstructured data can be advantageous because they lack a centralized indexing hierarchy that may become a processing bottleneck in an RDBMS. These more unstructured methods of repository management are sometimes referred to as non-relational, or "NoSQL" databases. One of the simplest forms of a non-relational database uses "documents" or files in the file system to serve as a data store. The "database" merely consists of a collection of such store files, many of which may refer to binary objects. A document or file loosely corresponds to a record in an RDBMS table, but contains data which is far less structured in many cases.

It should be noted that such examples are not intended to limit the amount or varieties of data that may be stored by member data store 126. Member data store 126 may be implemented as databases, tables, and records in a database management system or relational database management system, examples of which are Microsoft SQL Server® and Oracle®. Member data store 126 may also be implemented using NoSQL techniques, XML file structures, or other file structures, as will be appreciated by practitioners in the art. Member data stores 126 can be implemented in whatever structural form may reside on computer-readable media of the CRSS 120.

In some embodiments (though not shown in FIG. 1), all or part of the member data store 126 resides on the distributed ledger 165 on the distributed application network 130. In certain embodiments, member data store 126 resides on or utilizes state or data storage services such as a decentralized file system, decentralized database, key/value store, or other state storage mechanism accessible through, integrated with, or residing on the distributed application network 130. Such services may be accessible through a smart contract or distributed application (also known as a "DApp") of the distributed application network 130. Examples of such services that are available from third parties and integrated into existing distributed application networks such as Ethereum include Namecoin, Filecoin, BigChainDB, and Swarm. In some embodiments, all or part of member data store may be stored in conjunction with an identity solution or service, which provides features for associating a common identity or set of accounts on a distributed application network with multiple DApps (CIVIC is one of many examples of companies providing this solution).

In some embodiments, member data store 126 (or other data source 141) may be provided through an "oracle" service accessible through, but not necessarily residing on, the distributed application network 130. An oracle service provides supplemental feeds or streams of data that have been "trusted" by the distributed application network to provide reliable supplementary data that may be required for certain activities.

Furthermore, it is contemplated that, in all variations of storage configurations, all of a data store (e.g., member data store 126) may reside on a single storage type or the data store may be arranged across more than one storage type (e.g., some data structures or data segments of the member data store 126 may reside on computer-readable media provided by the CRSS and some may reside on a decentralized database, oracle, or on the distributed ledger itself).

To record a tagging transaction 127 (or incentive transaction 132, weighting transaction 133, or confirmation transaction 134), in a persistent and trusted manner that allows for responsive and automated data interchange with permissioned data subscribers, CRSS 120 may store the records on a decentralized distributed ledger 165 (in which records are unchangeable and undeletable) that is housed on the distributed application network 130. The CRSS 120 may use a distributed application node 125 that is connected to a distributed application network 130 to access the network and its distributed ledger 165.

A distributed application network 130 typically includes several other nodes 131, which may be, e.g., one or more systems, machines, computers, databases, data stores, or the like, operably connected with one another. Computing systems can become nodes in a distributed application network 130 by running node software that is particular to the type of distributed application network 130, such as node software for participating in a blockchain network (e.g., Bitcoin, Ethereum, a private blockchain implementation, etc.). In some cases, each of the nodes or multiple nodes are maintained by different entities. The node software interconnects with other nodes/peers (e.g., 131) in the distributed application network via a network (e.g., the Internet) and maintains a complete or partial copy/replica of the distributed ledger database (e.g., 165). CRSS 120 includes a distributed application node 125, which participates in a distributed application network 130 at least by running node software.

In some embodiments, the distributed ledger 165 may be implemented as a blockchain. The blockchain is a reliable distributed database system collectively maintained by all participating nodes in a decentralized and trustless way and is characterized by its unchangeability. A blockchain typically works without a central repository or single administrator. One well-known application of a blockchain is the public ledger of transactions for cryptocurrencies such as used in Bitcoin.

A blockchain provides numerous advantages over traditional databases. A large number of nodes of a blockchain may reach a consensus regarding the validity or a transaction contained on the transaction ledger. Similarly, when multiple versions of a transaction exist on the ledger, multiple nodes can converge on the most up-to-date version of the transaction. For example, in the case of a virtual currency transaction, a node within the blockchain that creates a transaction can determine within a level of certainty whether the transaction can take place and become final by confirming that no conflicting currency transactions have been confirmed by the blockchain elsewhere.

Data records recorded in the blockchain are enforced with cryptographic hashes and stored on the nodes of the blockchain in a chained sequence in which each subsequent block maintains a pointer to the previous block in the chain. A blockchain typically has two primary types of records. The first type is the transaction type, consisting of the actual data stored in the blockchain. The second type is the block type, which are records that confirm when and in what sequence certain transactions became recorded as part of the blockchain. Transactions are created by participating nodes, one of which is the distributed application node 125 of CRSS 120, to describe information that should be permanently recorded on the blockchain. Users of the blockchain (i.e., participating nodes 131 of the distributed application network 130 of which CRSS 120 is one) create transactions that are passed around to various nodes of the blockchain through a peer-to-peer (P2P) sharing network. Block type transactions are created by nodes known as "miners" or "validators" (depending on the type of distributed application network) who use special software functions and/or equipment to create blocks that comprise one or more sequenced transactions that have been proven to be valid. A "valid" transaction is one that can be validated based on a set of rules that are defined by the particular system implementing the blockchain. For example, in the case of cryptocurrency blockchain (e.g., Bitcoin), a valid transaction is one that is digitally signed, spent from a valid digital wallet and, in some cases, one that meets other criteria. In some blockchain systems, miners or validators are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue performing the processing work of creating new blocks. A miner may run blockchain node software and blockchain mining software, or combined blockchain node/mining software.

In some implementations, depending on the type of distributed application network utilized, a blockchain or distributed ledger may be "sharded" in order to improve processing efficiency or storage. In sharding, the "state" of the blockchain as represented by the current state of its transactions is split into a number of partitions called "shards". For example, a sharding scheme on Ethereum (a well-known distributed application network) might put all addresses starting with 0x00 into one shard, all addresses starting with 0x01 into another shard, and so on. In the simplest form of sharding, each shard also has its own transaction history, and the effect of transactions in a given shard k are limited to the state of shard k. One simple example would be a multi-asset blockchain, where there are K shards and each shard stores the balances and processes the transactions associated with one particular asset. In more advanced forms of sharding, some form of cross-shard communication capability, where transactions on one shard can trigger events on other shards, is also included. Sharding enables several different types of nodes to be run as participants in the distributed application network, such as a super-full node, which processes all transactions in all collations and maintains the full state for all shards; a top-level node, which processes all top-level blocks, but does not process or try to download the transactions in each collation (instead, it accepts it on faith that a collation is valid if two thirds of the collators in that shard say that it is valid); a single-shard node, which acts as a top-level node, but also processes all transactions and maintains the full state for some specific shard; and a light node, which downloads and verifies the block headers of the top-level blocks only (it does not process any collation headers or transactions unless it needs to read some specific entry in the state of some specific shard, in which case it downloads the Merkle branch to the most recent collation header for that shard and from there downloads the Merkle proof of the desired value in the state).

Any one node may have a complete or partial copy of the entire ledger or set of transactions and/or blocks on the blockchain. Generally, devices with more limited processing systems and storage capability may run partial nodes or "light clients". Systems described herein as having a distributed application node (e.g., 125) may be nodes that have either a complete or a partial copy as described above, and the nodes may also be miners, depending on implementation.

In various embodiments, the distributed ledger (e.g. 165) or blockchain may be permission-less, permissioned/private, or a combination thereof. A permission-less blockchain includes, for example, a Bitcoin blockchain in which any device can download and participate in the operation and maintenance of the blockchain by joining as a node. A permissioned blockchain refers to a blockchain in which joining as a node is limited to particular entities with validated login or other credentials. In a combination permission-less and permissioned blockchain, the consensus process is controlled by a pre-selected (permissioned) node. In various embodiments described herein, certain data stores may reside on a permissioned distributed ledger, while others reside on a permission-less distributed ledger. In embodiments where a permissioned or permission-less distributed ledger is dedicated to storing transactions exclusively related to the disclosed CRSS 120, the distributed ledger may be referred to as a "collaborative road user safety distributed ledger" or "collaborative road user safety blockchain".

For example, Hyperledger is a technology for building permissioned DApps. Hyperledger "fabric" is an implementation of the Hyperledger project. Other implementations include Intel® Sawtooth and R3 Corda. Fabric is a permissioned decentralized platform that allows permissioned DApps (called chaincodes) to be run from it. To utilize Hyperledger, an instance of "fabric" is deployed and then permissioned DApps relating to collaborative road user safety functions are deployed on the instance. Every node in the network runs an instance of fabric. Fabric allows the selection of various consensus protocols and features. Hyperledger uses the blockchain data structure. Hyperledger-based blockchains can currently choose to have no consensus protocols (that is, the NoOps protocol) or else use the PBFT (Practical Byzantine Fault Tolerance) consensus protocol. Hyperledger fabric has a special node called the certificate authority, which controls which entities/nodes can join the network and their access rights.

Nodes (e.g., 125, 131) can typically read information recorded in a transaction record without restriction. In some cases, transaction data is stored in a cryptographically encrypted or otherwise obfuscated form accessible only to those with a cryptographic key to decrypt the transaction data. In some cases, obfuscated information may be verified by miners using zero-knowledge proofs such as zkSNARKS.

In implementations using some types of distributed application networks, smart contracts may be supported. A smart contract is a set of program instructions for automating certain processing by a distributed application network. A smart contract is written in a Turing-complete language. To deploy a smart contract, it is compiled and submitted to a distributed application network 130 as a transaction. When the contract generation transaction is processed by nodes 131 of the distributed application network 130 and committed permanently to the distributed ledger 165, the smart contract becomes a set of functions that can be invoked by calling processes to do various kinds of work on the distributed application network 130. The invocation of the smart contract (e.g., by calling its one or more functions) causes the program instructions embedded in the smart contract to be executed on the processing systems of one or more nodes 131. One or more smart contracts may be called a distributed application or DApp on some distributed application networks (e.g., Ethereum). Smart contracts constituting aspects of a CRSS (e.g., 155, 160) may be implemented as a DApp on Ethereum or other distributed application network. Once committed to the distributed ledger 165, smart contracts run exactly as programmed without third-party interference.

In embodiments, certain techniques performed by the CRSS 120 may involve invoking one or more smart contracts published to the distributed ledger 165. Various process flows described herein may be implemented, published and deployed by the CRSS 120 as smart contracts, or functions thereof. Smart contracts of the CRSS may interact with the distributed ledger 165 to access, create, or modify data relating to the CRSS, as well as to generate and submit tagging transactions 127, incentive transactions 132, weighting transactions 133, and confirmation transactions 133 to the distributed ledger 165 in various embodiments.

Figure 6:
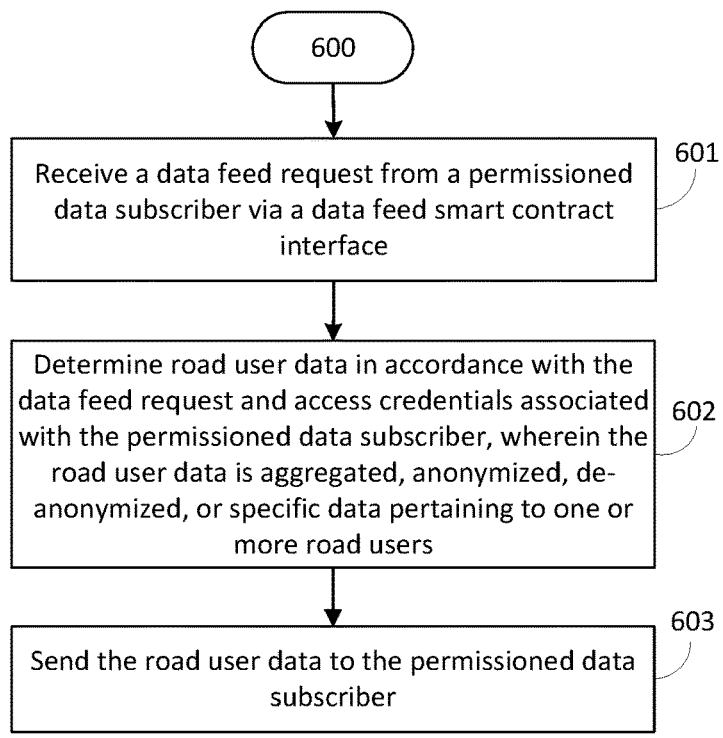
FIG. 6 shows an example process flow for a data feed smart contract that provides road user data to permissioned data subscribers.
Figure 7:
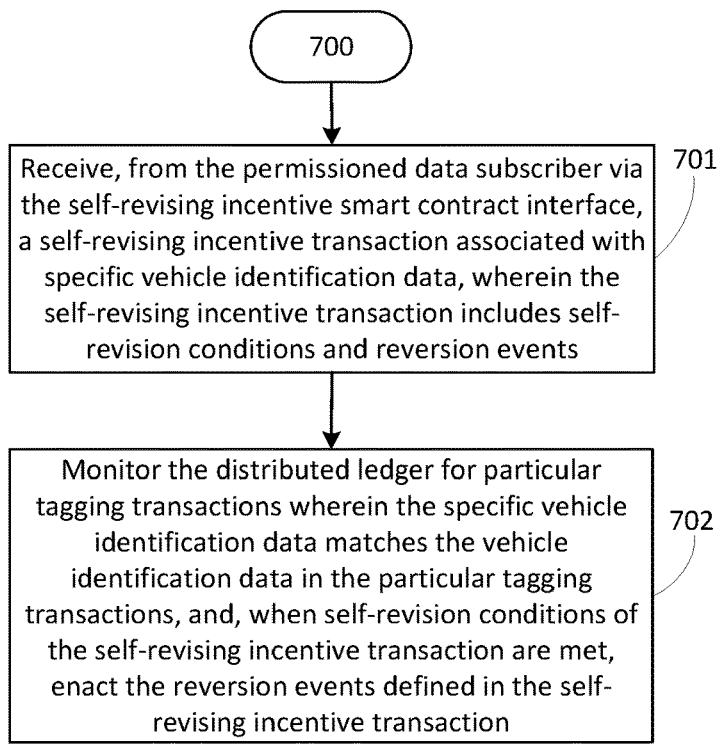
FIG. 7 shows an example process flow for a self-revising incentive smart contract that enables permissioned data subscribers to define self-revising incentives in relation to specific vehicle identification data.

In some embodiments, the CRSS 120 may implement and deploy smart contracts for data feeds 155 (as described in regard to FIG. 6) and incentives 160 (which can include both incentive transactions and smart contracts for self-revising incentives as described in regard to FIG. 7). Permissioned data subscribers 150 may be provided with access to data feed smart contracts 155 and/or incentive smart contracts 160 via their ability to interact with the distributed application network 130 as described in FIGS. 6-7.

CRSS 120 may interact with other data sources 141 for data that might be pertinent to CRSS processing tasks. Requests for data can be sent/received using the API of these other data sources 141, which may be publicly or privately accessible. Examples include weather services, real-time traffic condition services, insurance databases, and county licensing databases. Various types of other data sources 141 and the manner of using their information are described in regard to several process flows below. In any implementation, other data source 141 may be an "oracle" service accessible to the distributed application network 130.

Figure 2B:
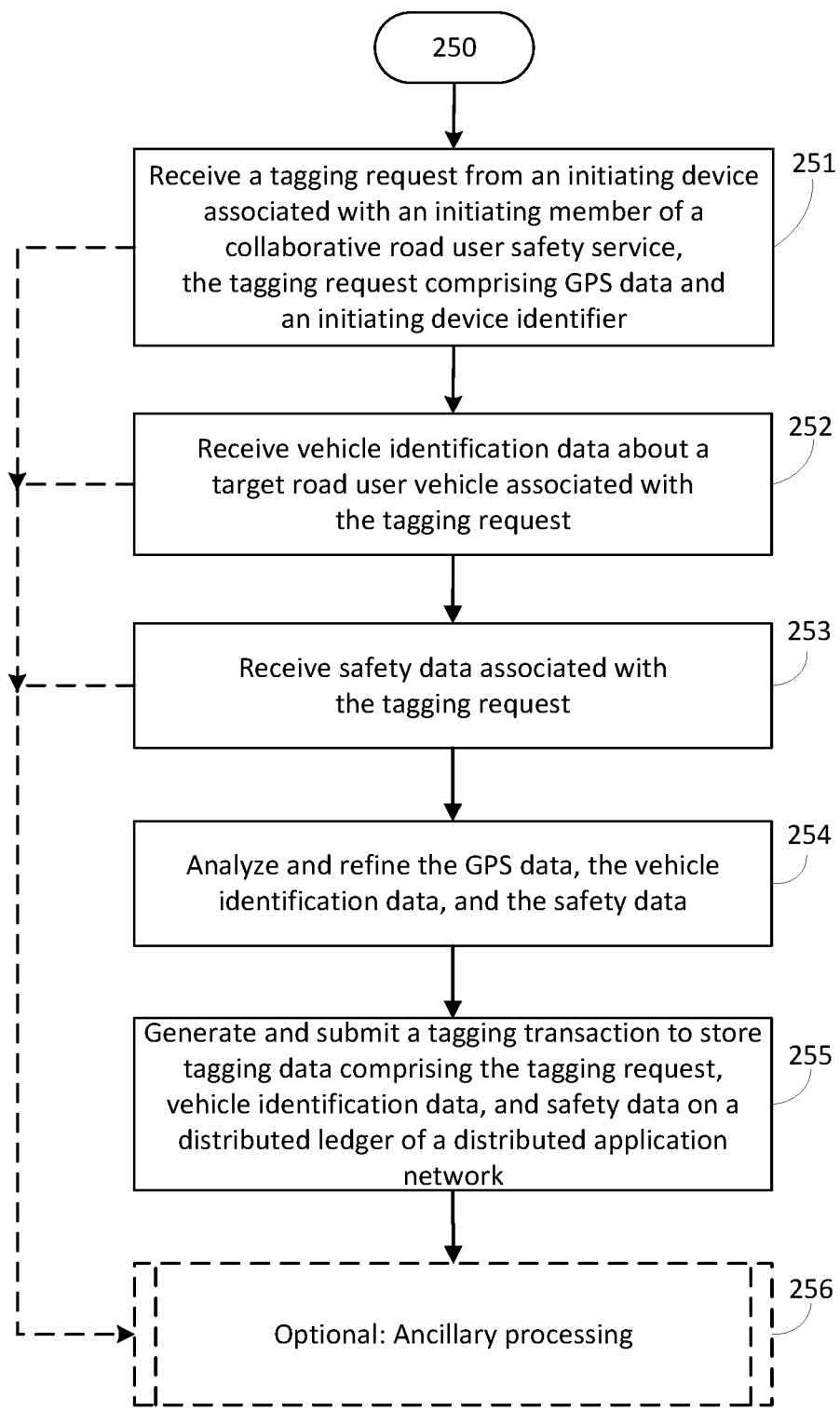
FIG. 2B illustrates an example process flow for enhancing collaborative awareness of road user safety appropriate to certain example embodiments.

FIGS. 2A and 2B show example process flows relating to an initial gathering and exchange of tagging event-related data between a CSD and the collaborative road user safety service, respectively. FIG. 2A shows a process flow for CSD data gathering and sending aspects, and FIG. 2B shows a related process flow for receiving and processing of the tag event-related data at the CRSS.

FIG. 2A shows an example process flow relating to CSD processes for initiating a tagging event and related collection aspects. The process flow 200 of FIG. 2A may be implemented, for example, as part of a tagging component 101.

System component aspects of a CSD, including GPS component, were described extensively with regard to FIG. 1. Recall that a variety of system or device form factors can implement a CSD, with appropriate program instructions; for example, mobile devices such as smartphones, tablets, laptops, smart watches, smart glasses and other wearables, and vehicle dashboard interfaces/panels, commercial vehicle dispatch interface devices, and navigation devices.

A user interface for initiating a tagging request is provided by the CSD. Using the user interface in accordance with any of its various input modalities, an indication from an initiating member of the CRSS to tag a vehicle is received at the user interface (201), from which processing elements 202-205 may follow.

Figure 9:
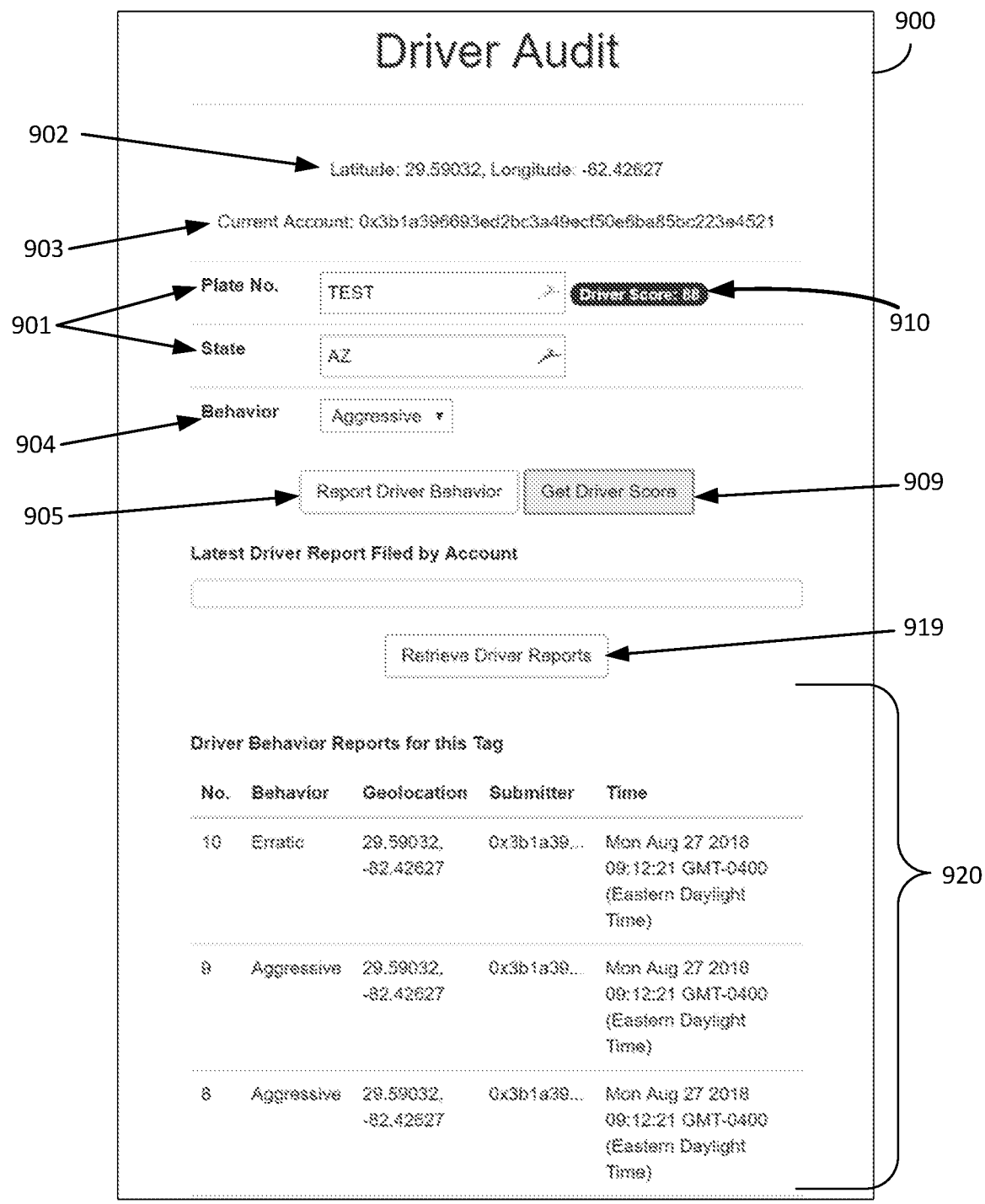
FIG. 9 shows an example user interface a member can use to initiate tagging requests and view associated information.

The user interface design and its associated input modalities vary in accordance with the system/device form factor of the CSD. In instances where the CSD is a mobile device, it may, for example, provide the user interface by rendering program instructions from the CRSS in a Web browser on the mobile device; it may also render the user interface from instructions installed on the mobile device as an App or DApp by downloading program instruction deployment packages from an online software library. An example user interface that initiates a tagging request is depicted in FIG. 9. Wearables may use similar methods to deliver simpler interfaces customized to render to the smaller screen size; and vehicle dashboard interface panels may render the interfaces from dash "app" code integrated into or downloaded for the dashboard interface software library.

User interface elements can be visual, e.g., command buttons that can be pressed with a finger on a touch screen or a mouse pointer, input fields for entering text, etc. Any user interface design choice can include interface elements for entry of data that are not only visual (e.g., voice, tactile); the most desirable or useful input modalities of the user interface, naturally, will vary with the type of CSD device. For example, voice recognition capabilities of the CSD or the App can provide voice-initiation of a tagging event, e.g., "OK GOOGLE. TAG plate number ABC-1234 from California." The voice command then initiates a tagging request in the App and collects certain vehicle identification data. It should be noted that alternative input modes such as voice can be used to provide at least some vehicle identification data and safety data in addition to initiating the tagging request.

Upon receipt of an indication by the initiating member at the user interface according to any of its input modalities, a tagging request is generated comprising GPS data and the initiating device identifier, and the tagging request is sent to the CRSS via the communications interface (202).

GPS data includes geolocation information about the instant position of the initiating device CSD. In some cases, the GPS component further provides information, such as the speed and/or direction of travel of the CSD, in addition to geolocation (e.g., GPS) coordinates. In some mobile operating systems, for example, the speed and direction of the mobile device can be obtained via operating system functions. In other cases, the speed and/or direction of the initiating device CSD might be determined by computing a vector from two or more geolocation coordinates (and their timestamps) gathered over a period of time by program instructions in CSD App software. Generally, it is desirable for the CSD to gather instant geolocation data as close in time to the tagging request indication as possible in order to have the most accurate capture of the geolocation of the tagged incident.

An "initiating device identifier" includes (but is not limited to, depending on implementation) data that is sufficient to uniquely identify the initiating device and associate it to a specific initiating member of the CRSS. For example, the initiating device identifier can include a device universally unique identifier (UUID) of the initiating device, which may have been assigned to the initiating device at the time software applications (e.g., "apps" or "DApps") were installed on the initiating device to enable the initiating member to join the CRSS; or, a device UUID could be generally available from the device's operating system functions; or, a cryptocurrency wallet address of the initiating member could function as the initiating device identifier; or, the initiating device identifier can include the login credentials the initiating member uses to login to the CRSS applications.

A tagging request can also include other relevant information, such as a tagging universally unique identifier (UUID) of the tagging request. Subsequent transmissions of data (e.g., vehicle identification data, safety data, subsequent data requests and responses) may also include the tagging UUID to assist the CRSS or the CSD in linking related tagging event data.

The sending of the tagging request and its associated data to the CRSS may be accomplished by transmitting data structures through the communications interface over an API, as described in relation to FIG. 1. In a preferred embodiment, the tagging request is sent close in time to the tagging request indication, so that the CRSS can begin its own processes of sending confirmation requests and determining alerts (described in regard to FIGS. 2B, 3A-3C, and Alerting sections, below).

Vehicle identification data about the target road user vehicle associated with the tagging request is collected and sent to the CRSS (203). "Vehicle identification data" can take a variety of forms, including a plate number or partial plate number, the state/locality the plate was issued from, identifying characteristics of a vehicle (e.g., black LEXUS) which, along with its geolocation, might be used to identify a target vehicle well enough that its presence at the scene can be confirmed by another member (see FIGS. 3A-3B, below), or by the target vehicle's operator or passenger (FIG. 3C) if he/she is a member of the CRSS. The collection of all or part of the vehicle identification data can occur in any given instance via one of the input modalities described above for the initiating member.

In some embodiments, all or part of the vehicle identification data can include data collected from a sensor component or telemetry device connected via the communications interface. A full description of these processes and related devices are described further below. Briefly, for example, this type of vehicle identification data could include a photo or video taken from a camera (e.g., a camera on a mobile device serving as a CSD, or a camera that is connected to the CSD via pairing with the initiating member's vehicle systems). Further examples include a unique identifier being broadcast by connected vehicle systems on the target vehicle, and/or a transponder identifier being broadcast from an onboard device in the target vehicle, such as the transponder identifier broadcast from an automated tollbooth transponder or RFID sticker (e.g., "EZ-Pass").

The sending of the vehicle identification data to the CRSS may be accomplished by sending data structures through the communications interface over an API, as described in relation to FIG. 1. Vehicle identification data can be sent in multiple parts and at different times (e.g., vehicle identification data entered by the initiating member may be sent at a different time than what is sent from a telemetry device or sensor). The vehicle identification data may be linked to the tagging request via the tagging UUID.

Safety data associated with the tagging request is collected and sent to the CRSS (204). "Safety data" can include a variety of forms, any of which may be combined to form "safety data" collectively. For example, it can include "safety behavior type," a classification of different possible categories of target vehicle behavior (e.g., "Aggressive", "Speeding", "Erratic", "Hazard", "Proximity too close", etc.), each of which may have severity weights/ratings associated with them. It can also include a narrative description provided by the initiating member. Collecting all or part of the safety data, including the safety behavior type and narrative description, can occur in any given instance via one of the input modalities described above for the initiating member.

In some embodiments, all or part of the safety data can be collected from a sensor component or telemetry device connected via the communications interface. A full description of these processes and related devices are described further below. Briefly, for example, this type of safety data could include data from the initiating member's CSD, such as speed and direction obtained from a GPS component, accelerometer data from the accelerometer, proximity of the initiating member's vehicle to other vehicles (e.g., via proximity sensors in the initiating member's vehicle).

The sending of the safety data to the CRSS may be accomplished by sending data structures through the communications interface over an API, as described in relation to FIG. 1. Safety data can be sent in multiple parts and at different times (e.g., safety data entered by the initiating member may be sent at a different time than what is sent from a telemetry device or sensor). The safety data may be linked to the tagging request via the tagging UUID. It should be noted that, depending on implementation, the sending of the tagging request, vehicle identification data, and safety data may occur jointly or severally.

Some types of input modalities enable not only the initiation of the tagging request, but also the collection of some or all of the tagging event-related data (e.g., vehicle identification data, safety data). Capturing a photo or video from inside the App a might initiate the tagging request while also collecting a source image on which image recognition and optical character recognition can be used to obtain vehicle identification data (e.g., the target vehicle's plate number, locality/state of issue, and make/model/color of vehicle). A video might be analyzed to determine or suggest certain safety data related to the tagging event, such as the safety behavior type (e.g., erratic behavior, following too close or moving into the lane too closely in the front). In some cases, the CSD may perform these image analysis processes itself, or the photo/video might be transmitted in their raw form to the CRSS for analysis.

In some implementations, input modalities such as a "TAG skill" or capability may be installed into the skill/capability ecosystem of a voice-activated agent/assistant (e.g., AMAZON ALEXA, SIRI, GOOGLE ASSISTANT) to provide an entry point for a tagging request and/or its associated vehicle identification and safety data. This skill or capability can be "enabled" by an initiating member to integrate with his or her CRSS account. For example: an initiating member might command the ALEXA app on her phone "ALEXA, TAG"; ALEXA might respond "OK. What's the plate number of the vehicle?"; the initiating member replies with the plate number "ABC-1234 California"; ALEXA then responds "OK. Tagging ABC-1234 from California. What was the vehicle doing?"; the initiating member replies with "It cut me off and slammed on the brakes."; ALEXA responds "OK. Entering "aggressive driving" safety information with the description 'cut me off and slammed on the brakes.'" Behind the scenes, the "TAG skill" program instructions installed into the skill/capability ecosystem use an API of the CRSS to submit the tagging request, vehicle identification data, and safety data.

In some embodiments, the vehicle identification data or the safety data may be enhanced by data from a sensor component on the CSD and/or a telemetry device connected to the CSD via the communications interface (205). These techniques may be performed by a telemetry component (e.g., 105) present in some examples to facilitate the interaction with sensors on the CSD or connected telemetry devices (e.g., 106).

With respect to capabilities of the device itself, "sensor components" can include the onboard sensors of the device on which the CSD is implemented, e.g., a mobile device. Examples include the aforementioned GPS, accelerometers, gyroscopes, magnetometers, proximity sensors, ambient light sensors, microphones, touchscreen sensors, fingerprint sensors, barometers, thermometers, heart rate sensors, air humidity sensors, and Geiger counters. Sensor components can also include other device components, such as mobile device front-facing and/or rear-facing cameras, as well as other capabilities, such as the Bluetooth, cellular radio (e.g., 2G-5G, LTE), or Wi-Fi network radio that is used to detect signals from passing mobile phones, transponders, or RFID components.

With respect to the "telemetry devices" connected via the communications system, these can include devices placed on or in the vehicle in which the initiating member is an operator or passenger, such as cameras (e.g., dashcams, rear-view mirror cameras, rear shelf cameras, fish eye cameras), motion sensors of various types (e.g., ultrasonic, RADAR, infrared), or speed detection devices (RADAR, LIDAR). These types of telemetry devices often include communications interface capabilities so that drivers can pair them to their mobile devices for control and monitoring using Wi-Fi, Bluetooth, or USB connectors.

Telemetry devices may in some cases be part of the vehicle systems of the vehicle in which the initiating member is a driver or passenger, such as its vehicle detection systems or driver assist sensor array (e.g., sensors in side mirrors, cameras installed in A-pillars, rear view mirrors to warn drivers of vehicles next to them, rear cameras and video interfaces for assisting the driver to back up, curb sensors and automatic parking system sensors, collision detection, warning or auto-braking sensors, etc.), and/or autonomous or semi-autonomous driving sensor array (e.g., cameras positioned in various viewpoints on the outside of the vehicle, LIDAR or RADAR sensors positioned in one or more places on the vehicle, such as the rooftop, the front bumper/grill, and/or rear bumper/grill).

Some vehicle systems have the capability for users or manufacturers to upload custom programs onto the vehicle systems. For example, "apps" can, in some vehicles, be installed via the vehicle's user interface panel, which may run a variation of a common operating system such as ANDROID. In this manner, specialized program instructions may be installed on the computer-readable storage media of the vehicle system. When executed by a processing system it may perform these specialized operations for accessing and instructing vehicle system telemetry devices in accordance with processes herein.

Telemetry devices may be connected to the CSD via the communications interface in numerous ways appropriate to the type or category of telemetry device being connected, for example: wireless network (e.g., any available Wi-Fi network on any band, cellular networks including 2G-5G or LTE, Bluetooth networks, NFC, etc.), wired network (e.g. Ethernet), or other communications interface types that are used to connect components or devices together (e.g., USB, FireWire, Thunderbolt, Parallel Ports, Serial Ports, HDMI, VGA, SVGA, DVI, DisplayPort, as well as custom communications interfaces such as those that might be used to integrate sensors in vehicle detection systems).

Indication by the initiating member to start a tagging request may almost instantaneously cause the CSD (via the communications interface) to activate the collecting, monitoring, and/or historical preservation state of any available sensor components and telemetry devices. For instance, the camera or other sensor may be turned on to record information about any target vehicles nearby. Collection may continue for a certain fixed period of time (e.g., 5-10 seconds), or it may terminate when the sensors/telemetry devices detect that the target vehicle is out of range. Some embodiments may have the capability to obtain historical telemetry from sensor/telemetry devices from a short time before (e.g., 1-20 seconds before) the tagging request was initiated, depending on the availability of this capability in the sensor or telemetry device in any given operational instance.

Raw telemetry data gathered in this way may be interpreted at the CSD and/or transmitted in its raw form to the CRSS for processing, depending on the embodiment. As discussed below, telemetry data provided by sensors/telemetry devices in association with the tagging request may influence the tagging event weighting score associated with the tagging event, or the tagger reputation score associated with the initiating member (see FIG. 5).

Having described the types of sensor components, telemetry devices, and communications interfaces, the discussion now turns to examples of how these sensors and devices can enhance or supplement vehicle identification data and/or safety data. Any or all of these examples may be combined. For example:

T1. The LIDAR or RADAR sensor connected to the vehicle system is activated to provide data about the direction and speed of a passing target vehicle; the direction may be an aspect of the vehicle identification data, while the direction and speed may be aspects of the safety data.

T2. The wireless network capabilities of the mobile device on which the CSD is installed are used to capture the mobile phone wireless signals (e.g., Wi-Fi, Bluetooth, cellular radio) in potential target vehicles nearby and use them to gather SSIDs, MAC addresses, IMEIs, RSSI (Received Signal Strength Identifier), and CoD (Class of Device) information. This information may be used as an aspect of the vehicle identification data (e.g., to uniquely identify target vehicles or associate them with existing vehicle identification data for supplementation), or as an aspect of the safety data (e.g., using triangulation of RSSI to determine the speed/direction of potential target vehicles).

T3. One or more cameras on or connected to the CSD or connected to the vehicle system are activated to provide images or video of passing potential target vehicles; image recognition and optical character recognition can be used to obtain vehicle identification data (e.g., the target vehicle's plate number, locality/state of issue, and make/model/color of vehicle). A video might be analyzed to determine or suggest certain safety data related to the tagging event, such as the safety behavior type (e.g., erratic behavior, following too close or moving into the lane too closely in the front).

T4. The accelerometer on the CSD device is activated to provide data about the initiating member's vehicle's behavior in response to the tagging event; whether the initiating member's vehicle had to swerve or brake suddenly may be aspects of the safety data.

T5. A sensor or telemetry device (e.g. proximity sensor, RADAR, LIDAR, camera, infrared sensor) is activated to provide data about the distance of passing potential target vehicles to the initiating member's vehicle; the proximity may be aspects of the safety data.

T6. The wireless network capabilities of the mobile device on which the CSD is installed are used to capture the RFID information from potential target vehicles' transponders, connected car identifiers, or RFID tags. This information may be used as an aspect of the vehicle identification data (e.g., to uniquely identify target vehicles or associate them with existing vehicle identification data for supplementation).

In some embodiments, collection of the vehicle identification data or safety data from sensor components or connected telemetry devices may be processed or partially processed by program instructions of the CSD. The processing might determine aspects of the vehicle identification data or safety data that would be further enhanced or narrowed by interaction with the initiating member. In such embodiments, the CSD may request verification via the user interface of the determined aspects. For example, analysis of wireless network information (e.g., in Example T2, above) might conclude that the MAC address is associated with a target of a previous tagging request whose vehicle had a plate number of "ABC-1234"; the CSD may ask the initiating member to confirm (e.g., via a voice prompt) whether that plate number is indeed the target vehicle being tagged. As a further example, if analysis of proximity information (e.g., in Example T5, above) shows that a target vehicle was tailgating, the CSD suggests to the initiating member that the safety behavior type be assigned as "proximity" and asks the initiating member to confirm.

FIG. 2B illustrates an example process flow for enhancing collaborative awareness of road user safety appropriate to certain example embodiments. Certain operations described in the example process flow 250 of FIG. 2B may be implemented in some embodiments by a collaborative road user safety service (CRSS) 120, or by components thereof, such as tagging unit 121 and weighting unit 123. FIG. 2A describes the CSD activities pertaining to entering tagging requests, and the form and substance of collecting and sending vehicle identification data and safety data; FIG. 2B describes CRSS-related activities associated with receiving and processing tagging requests, vehicle identification data, and safety data.

Initially, a tagging request (e.g., 110) from an initiating device associated with an initiating member of the CRSS is received (251). Recall that FIG. 2A describes the aspects of entry of a tagging request by an initiating member via an initiating device using various user interface/input motifs.

The tagging request includes GPS data pertaining to the initiating device and an initiating device identifier. The GPS data gathered from the GPS component of the initiating device can include timestamp, geolocation (in GPS coordinates or another coordinate system), and speed and direction, (which may be included in the GPS data or be computed by the CRSS in relation to previous recent passive geolocation data sent by the initiating device CSD).

The initiating device identifier is used by the CRSS, in some embodiments, to identify an initiating member, for example, for assigning tagging event weighting scores and tagger reputation scores (see, e.g., FIG. 5), refining the selection of confirming devices and alert receiver devices (see, e.g., FIGS. 3A-3B and FIG. 4, respectively), and determining and providing road user safety incentives.

A tagging request can also include other relevant information, such as a tagging universally unique identifier (UUID) of the tagging request. A tagging UUID may assist the CRSS in associating tagging request data with subsequent data received or computed in relation to the tagging event.

Once a tagging request has been received from an initiating device, the initiating device has provided GPS data that identifies geolocation and other relevant data about the tagging event. This data, though only one aspect of a tagging transaction, can be used initiate ancillary processing (256) of process flows and techniques present in some embodiments. This ancillary processing can begin in parallel with, including before, vehicle identification data and/or safety data are received from the initiating device. This technical feature has the advantage of increasing data gathering accuracy by better selection and communication with other vehicles, which may be moving at high velocity. Note that ancillary processes can begin to execute at any processing stage subsequent to the tagging request, or repeatedly after every such processing stage.

As an example of ancillary processing, in some embodiments, confirming devices can be promptly chosen and confirmation requests can be promptly sent in relation to the geolocation of the initiating device (see, e.g., FIGS. 3A-3B). This increases the likelihood that confirming devices will be able to gather accurate and useful information about the target vehicle, and it allows the set of confirming devices to be more targeted. In some cases, confirming devices may even be in a position to confirm vehicle identification data that can then be suggested to the initiating device for verification.

As a further example of ancillary processing, in some embodiments, alert receiver devices can be chosen accurately and rapidly notified of the presence of a target vehicle that might be unsafe (see, e.g., FIG. 4). In some cases, partial or provisional alerts can be sent to alert receiver devices without complete vehicle identification data or safety data. For example, a first, provisional alert might indicate that a target vehicle has been "tagged" nearby and so the alerted member should be on the lookout. As vehicle identification and safety data are refined with further information from the initiating device, a second or updated alert might provide the additional information; or, cancellation of the first alert might occur if the enhanced safety data does not match the subscribing member's alert parameters.

Vehicle identification data about a target road user vehicle associated with the tagging request is received (252). Vehicle identification data is described extensively in respect to FIG. 2A and, as noted there, complete or partial vehicle identification data may include telemetry data. The vehicle identification data may be received by the CRSS in data structures sent by the CSD through the communications interface over an API, as described in relation to FIG. 1. The vehicle identification data may be related to a prior-arriving tagging request via the tagging UUID.

Safety data associated with the tagging request is received (253). Safety data is described extensively in respect to FIG. 2A and, as noted there, complete or partial safety data may include telemetry data. The safety data may be received by the CRSS in data structures sent by the CSD through the communications interface over an API, as described in relation to FIG. 1. The safety data may be related to a prior-arriving tagging request via the tagging UUID.

The GPS data, the vehicle identification data, and the safety data are analyzed and refined (254). Depending on embodiment and operating instance, analysis and refinement of GPS data, vehicle identification data, and/or safety data can include supplementing the data (for example, by combining it with other data stored previously by the CRSS on the distributed ledger or on CRSS-managed data stores, or by sending and receiving requests to other data sources 141) and discarding certain data (e.g., when raw data is transmitted that is not relevant or necessary for tagging data). In some cases, analysis and refinement may result in additional requests being sent to the initiating device to request interaction via its user interface with the initiating member.

If an initiating member is only able to provide partial vehicle identification data, for example, such as only a partial plate number and color of the vehicle, the partial vehicle identification data might be analyzed and refined by attempting to match the partial plate number and vehicle color against CRSS member records to see if the target vehicle belongs to a CRSS member; if a match is found, the target member's CSD may be "pinged" for its current geolocation and, if the target member's CSD is found in close proximity, the vehicle identification data can be supplemented with the additional data from the target member's account record. Similar methods might be used to match partial vehicle identification data with target vehicle identifiers in prior tagging transactions and further supplement the vehicle identification data.

GPS data, for example, might contain raw GPS component telemetry that, once it is used to determine the initiating device's geolocation (and/or speed and direction), is unnecessary to store in the tagging transaction and can be discarded.

In embodiments that include telemetry data related to vehicle identification data and/or safety data that has been gathered by the CSD from sensor components and/or connected telemetry devices, all or part of the vehicle identification data and the safety data may be analyzed at the CRSS; the telemetry data may be supplemented (e.g., with analysis) or partially discarded (e.g. certain raw telemetry is discarded, such as telemetry about vehicles near the initiating device that were not the target of the tagging request.)

For instance, vehicle identification data may be analyzed from telemetry data by analyzing raw wireless network traffic as described in regard to Example T2, above; the gathered network user identifiers may be analyzed against existing vehicle identification data or member data to provide supplemental information. After completing the analysis to determine proper vehicle identification data, the extraneous raw network telemetry may be discarded. In an instance referencing Example T3, above, images or video footage may be discarded that is 1) unrelated to the vehicles nearby that were not the target vehicle, 2) indeterminate of any useful supplemental information, and/or 3) in excess of what is useful to validate the tagging request.

Likewise, telemetry data that might enhance safety data from the array of sensors and telemetry devices associated with the CSD can be analyzed and then discarded. In Example T4, the accelerometer data can be analyzed to see if sudden braking or other rapid jerky movements were indicated; data that is relevant can be used to refine the safety data, and the remainder can be discarded.

In some embodiments, vehicle identification data and/or safety data can be enhanced by interconnections with other data sources (e.g., 141). One type of other data source is a weather service that provides weather data (e.g., visibility level, precipitation, wind speed, temperature) localized by geolocation. Another type of data source is a service that provides real-time or near real-time traffic conditions, such as average traffic speed, accident conditions, travel times, and so on. Requests that include the geolocation of the initiating device (from GPS data) can be sent and responses received using the API of these services, which may be publicly or privately accessible.

Returning to FIG. 2B, a tagging transaction (e.g., 127) is generated and submitted to store the tagging data in a data structure on a distributed ledger of the distributed application network (255). A tagging data structure can be formatted in any suitable structured data language, such as XML or JSON, as will be appreciated by an ordinarily skilled practitioner. To maintain privacy of certain data recorded on a distributed ledger (whether permissioned or permissionless), the tagging data structure may include a cryptographically encoded version of one or more data elements stored within the tagging data structure. Data elements may be encoded using one or more cryptographic hash functions, such as one or more variants of the secure hash algorithm such as SHA-2 and SHA-3. In some cases, symmetric encryption may be used to encode all or part of the data elements; data encrypted with symmetric encryption may require a reader of the tagging data, such as a permissioned data subscriber or subscribing member, to share a private key with the CRSS. In some cases, asymmetric encryption (such as public-private key pairs) may be used to encode all or part of the data elements; the data may be encoded using the public key of a reader or accessible to a class of readers (e.g., permissioned data subscribers with particular access credentials), and decoded by the reader using the private key of the reader.

In embodiments in which the distributed ledger or the distributed application network includes a distributed blockchain ledger or distributed smart contract system, storing the tagging data on the blockchain may include storing the tagging data within a data structure on a blockchain, such as by generating a transaction to store the tagging data on the blockchain or invoking a tagging data storing/recordation function of a CRSS contract or smart contract published to the blockchain. Functions of a CRSS contract published to the blockchain and designed for execution may be executed by transactions invoking such functions. To invoke the CRSS tagging data storing function, a transaction including a call to invoke the function may be generated.

The generated tagging transaction may be transmitted to at least one of the nodes (e.g., 131) of the distributed application network 130 having a full or partial copy of the distributed ledger 165. The transaction may be sent to the at least one node by one of the distributed application network nodes directly connected to (e.g., local to) the CRSS, such as the node embodied in distributed application node 125. As with other steps of sending transactions to a node, sending the transaction may trigger the transaction to be included in a process by one or more of the nodes 131 of the distributed application network 130 to incorporate the tagging transaction into a block of the blockchain distributed ledger (e.g., 165) stored by the nodes 131. Once incorporated into a block, the transaction has been executed. An address of the location of the tagging transaction on the blockchain may be received, such as by the tagging unit 121 or by a distributed application network node (e.g., 125) connected to this unit.

Figure 8:
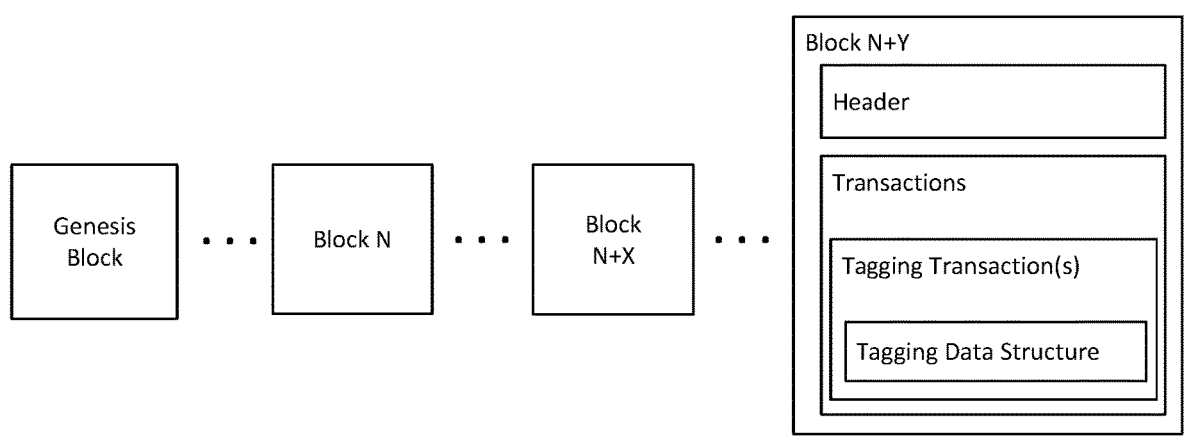
FIG. 8 depicts an example of a blockchain of the distributed ledger after incorporation of a tagging transaction to store tagging data.

FIG. 8 depicts an example of a blockchain of the distributed ledger after incorporation of a tagging transaction to store tagging data. The blockchain may include a genesis block, followed by any number of subsequent blocks N up to a preceding block N+X, that is followed by a subsequent portion leading to a block, such as the N+Yth block, that may incorporate the transaction to store tagging data. Depending on embodiment, implementation, and operating conditions, however, any subsequent block may incorporate the transaction. In some embodiments, a tagging transaction identifier may be returned to the CRSS that includes an address of the location of the tagging transaction after recordation on the blockchain.

In some examples and embodiments, the collaborative road user safety service (CRSS) interacts with one or more confirming devices in the vicinity of the target road user vehicle to confirm, validate, or suggest vehicle identification data and/or safety data associated with the tagging request. Confirming devices include CSDs belonging to members of the CRSS who are different from the initiating member. CSDs belonging to members near the target road user vehicle (i.e., within the confirming device geolocation boundary) may in some instances be passengers or even an operator of the target road user vehicle.

FIG. 3A shows an example process flow for determining and interacting with geolocation-determined confirming devices. Certain operations described in the example process flow 300 of FIG. 3A may be implemented in some embodiments by a CRSS 120 (or components thereof, such as confirmation unit 122), in interaction with confirming devices such as collaborative safety device 100 (or confirmation component 102 thereof) and other data source(s) 141.

Initially in FIG. 3A, a confirming device geolocation boundary is derived from the GPS data of the initiating device that includes the predicted locations of the target road user vehicle within a confirmation time interval (301).

It should be remembered that at least one advantageous technical effect of the process flow in FIGS. 2A-2B, in which a tagging request including the GPS data of the initiating device is immediately transmitted to the service, is that the GPS data is at its most accurate, in a moving vehicle, when gathered from the GPS component at the instant the target road user vehicle safety impact is noted by the initiating member. The GPS data received with the tagging request includes at least the geolocation of the initiating device along with the specific time the tagging request was initiated at the initiating device. GPS component (e.g., 104), in some implementations, provides additional GPS data such as the speed and direction of the initiating device, e.g., through additional firmware or software provisioned by the particular device form factor (e.g., mobile device) on which the initiating collaborative safety device operates. In some implementations, GPS data such as speed and direction may be determined from one or more successive (or previous) geolocation and time coordinates and used to establish a velocity vector. Successive or previous geolocation and time coordinates may be gathered, e.g., by a tagging component 101 of a CSD 100 taking GPS data samples at time intervals after or before a tagging request.

Computation of the geolocation, speed, and direction of the initiating device allows the determination of an estimate of predicted locations of the target road user vehicle within a given confirmation time interval and margin for error. In some embodiments, other public or private data source(s) (e.g., 141), such as those that provide real-time traffic data, may be contacted via their APIs. Data from these other data sources may be used refine the estimate(s) of the predicted locations.

A confirming device geolocation boundary can be determined that includes the predicted locations of the target road user vehicle within a confirmation time interval, within a margin for error. The geolocation boundary may include a time-based scale that accounts for the uncertainty of determining the predicted location of the target road user vehicle as the elapsed time since the tagging request increases. Such time-based scaling may be used to select confirming devices incrementally as time elapses from the moment of the tagging request. For example, the target road user vehicle location is known relatively accurately within a few seconds of the time of the tagging request, allowing for a relatively accurate and narrow confirming device geolocation boundary in close proximity to the initiating device; however, a few seconds to minutes after the tagging request was received, the possible confirming device geolocation boundary may be less accurate and no longer includes the initiating device.

A set of confirming devices of members (aka "confirming members") is selected that are estimated to be within the confirming device geolocation boundary (302). The confirming device geolocation boundary, including geolocation boundary implementations that have time-based scaling, allow the selection of confirming devices which are, or are predicted to be, geolocated within the confirming device geolocation boundary in the time interval associated with the elapsed time between the tagging request and the time of sending the confirmation request to that particular confirming device. In some examples or embodiments, the confirming device geolocation boundary determines an initial boundary containing a prospective set of confirming devices. The devices in the prospective set are sent a request for their updated GPS locations, which are then used to refine the members of the set.

Geolocation of members with collaborative safety devices may be known approximately via GPS data sharing between their CSDs and the CRSS. Every so often (e.g., ranging from every few seconds to a small number of minutes, depending on implementation), the CSD may send updated GPS data to the CRSS so that it knows the approximate geolocation of members' CSDs. This approximate GPS data can be used to refine an approximate set of confirming devices to which to send confirmation requests.

At least one confirmation request is sent to at least one confirming device of the set of confirming devices (303). The sending of the confirmation request to confirming devices may be accomplished by transmitting data structures through the communications interface via an API.

A confirmation request may seek the confirming device to validate all or part of the vehicle identification data and/or safety data for a nearby target road user vehicle. The content of a confirmation request to a confirming device can have multiple aspects.

In one aspect, the confirmation request can contain information that the confirming member is to validate, such as a question. This aspect of a confirmation request may instigate the presentation of user interface elements on the user interface of the confirming device CSD. For example, the confirming member might be asked to indicate, via a visual or auditory user interface prompt, whether a vehicle having certain vehicle identification data is present nearby. As another example, the confirmation request might present to the confirming member certain vehicle identification data, such as a partial plate number or vehicle color, and ask the user to supplement the vehicle identification data with whatever additional information is available (e.g., the rest of the plate number, the make and model of the vehicle). In another example, the safety behavior type might be presented on the confirming device and the confirming member might be asked to provide the complete vehicle identification data by observing behaviors of nearby vehicles.

As an example of confirming safety data, the confirming member might be asked to indicate, via a visual or auditory user interface prompt, whether a vehicle with the presented vehicle identification data and safety behavior type is currently acting in a way consistent with that safety behavior type. For example, the confirmation request content presented with the user interface might be, "A vehicle with plate number ABC-1234 is reported to be driving aggressively nearby, can you confirm?" This confirmation request might allow the confirming member to answer in three possible ways: "Yes", "No", or "No such vehicle nearby."

In some situations, more than one confirmation request might be sent to a confirming device. For example, the first confirmation request could verify the presence of the target vehicle, and the second confirmation request, to verify the safety behavior type, could be sent to confirming devices who responded to the first confirmation request in the affirmative.

In another aspect, the confirmation request can take the form of an instruction to the confirming device to collect vehicle identification data and/or safety data from sensor component(s) in the confirming CSD or from telemetry device(s) connected to the confirming CSD. The types of sensor components and telemetry devices and manner of gathering and processing their data for supplementing vehicle identification data and/or safety data are described extensively with respect to FIGS. 2A and 3B. Any individual aspect of confirmation request content (e.g., question, instruction to obtain sensor data and telemetry) can be combined with any other individual aspect.

In some embodiments, a confirmation request can be combined with an alert as described in regard to FIG. 4.

Ultimately, a confirmation response to a confirmation request is received from a confirming CSD (304). The confirmation response comprises confirmation data that includes at least GPS data of the confirming device. Varying by embodiment, the nature of the confirmation request, and the capabilities of the confirming device CSD, the confirmation data in each case includes one or more of user response data, sensor component data, and telemetry data. Receiving the confirmation response from confirming devices may be accomplished by receiving data structures transmitted through the communications interface by the confirming device via an API; a tagging UUID sent as part of the confirmation response can be used to match the response to the request.

In some embodiments, confirming devices may be determined iteratively at periodic intervals by the CRSS. For instance, the confirming device geolocation boundary may be refined by GPS data received from another confirming device, including a confirming device that is the CSD of the target road user vehicle's operator or passenger. If received in conjunction with user response data or sensor data or telemetry data that provides confirming or disconfirming information about the target road user vehicle, the GPS data provides updated and current geolocation of the confirming device so that target road user vehicle geolocation can be updated or refined. This enables the confirming device geolocation boundary to be updated/refined with new predicted locations based on the actual updated presence or absence of the target road user vehicle in a predicted location. The set of confirming devices can then be reselected and, in some cases, additional confirmation requests can then be sent to the updated set.

In embodiments or operating scenarios where sensor component data and/or telemetry data are received in the confirmation data, the sensor component data and telemetry data may be analyzed to suggest confirmation or disconfirmation of the safety data received from the initiating member or other confirming devices, and confirmation data may be appropriately refined (e.g., ratings are assigned, raw data is summarized). The types of sensor component data and/or telemetry data, and their use in validating vehicle identification data and safety data, have been previously discussed in regard to FIGS. 2A-2B.

A confirmation transaction (e.g., 134) is generated and submitted, storing the confirmation data from each confirmation response on the distributed ledger in association with the tagging transaction (305). Confirmation data can be part of a confirmation data structure formatted in any suitable structured data language, such as XML or JSON, as will be appreciated by an ordinarily skilled practitioner. To maintain privacy of certain data recorded on a distributed ledger (whether permissioned or permission-less), the confirmation data structure may include a cryptographically encoded version of one or more data elements stored within the confirmation data structure substantially as described in regard to element 255 of FIG. 2B. The confirmation data structure can include a referent to associate the confirmation transaction with the related tagging transaction, e.g. via a tagging transaction identifier, tagging transaction address, or a tagging UUID. The confirmation data structure, once formatted, can be submitted (e.g., transmitted or stored) on the distributed ledger 165 by executing a transaction, via the CRSS distributed application node 125, that broadcasts it to one or more nodes 131 on the distributed application network 130, calling a function of a CRSS smart contract, or other method substantially as described in regard to element 255 of FIG. 2B.

In embodiments, a CSD as described in FIG. 2A can be extended with further program instructions to act as a confirming device (e.g., via a confirmation component 102). FIG. 3B shows an example process flow for facilitating the use of a collaborative safety device as a confirming device.

In process flow 310 of FIG. 3B, a confirmation request is received from the CRSS (311). Receiving the confirmation request from the CRSS may be accomplished by receiving data structures transmitted through the communications interface by the CRSS via an API; a tagging UUID sent as part of the confirmation request can be used to match the later confirmation response to the request. Aspects of a confirmation request, i.e., whether its content seeks interactive validation by the confirming member, or its content has an instruction to collect sensor component data or telemetry data, is described in regard to processing element 303 of FIG. 3A.

In response to the confirmation request, confirmation data is collected (312). Collecting of confirmation data in all cases includes the updated and current GPS data from the GPS component (e.g., 104) of the confirming device. Other confirmation data being collected is aligned with the nature of the confirmation request and, in some embodiments, the capabilities of the CSD in regard to sensor components and connected telemetry devices.

In scenarios where the confirmation request includes an information request for the confirming member to validate, as described in FIG. 3A, the CSD instigates the presentation of user interface elements on the user interface of the CSD. For example, the CSD might present the confirming member with a visual or auditory user interface prompt to indicate whether a vehicle having certain vehicle identification data is present nearby. As another example, collecting of confirmation data for the confirmation request might include presenting to the confirming member certain vehicle identification data, such as a partial plate number or vehicle color, and asking the user to supplement the vehicle identification data with whatever additional information is available (e.g., the rest of the plate number, the make and model of the vehicle). In another example, the safety behavior type might be presented by the user interface of the confirming device and the confirming member might be asked to provide the complete vehicle identification data. As an example of confirming safety data, the confirming member might be presented with user interface elements that ask the confirming member to indicate, via a visual or auditory user interface prompt, whether a vehicle with the presented vehicle identification data and safety behavior type is currently acting in a way consistent with that safety behavior type. For example, the confirmation request prompt presented via the user interface might be, "A vehicle with plate number ABC-1234 is reported to be driving aggressively nearby, can you confirm?" This confirmation request might allow the confirming member to answer in three possible ways: "Yes", "No", or "No such vehicle nearby." The confirmation data being collected thus encodes the confirming member's responses to these interrogatories.

In some scenarios, the confirmation request includes an instruction to the confirming device to confirm vehicle identification data and/or safety data by activating sensor components or telemetry devices. Use of CSD sensor components or telemetry devices paired with the CSD for the purpose of responding to confirmation requests may be explicitly assented to at the time of the request by the confirming member, or may have been implicitly assented to via a system setting, user configurable setting, or other conditions associated with members who download CSD-related software. The types of sensor components and telemetry devices and manner of gathering and processing their data for supplementing and confirming vehicle identification data and/or safety data are described extensively with respect to FIG. 2A (especially processing element 203). The confirmation data being collected thus encodes the sensor and telemetry data that might be used to confirm (or disconfirm) the presence or actions of the target road user vehicle.

A confirmation response including the confirmation data is sent to the CRSS (313). The sending of the confirmation response to the CRSS may be accomplished by sending data structures through the communications interface over an API, as described in relation to FIG. 1. The confirmation response may include a tagging UUID from the confirmation request, so that it can be matched at the CRSS.

In some embodiments, a confirming device can be a CSD of a member associated with the target road user vehicle identified by the vehicle identification data. This could occur, for example, in situations when the vehicle identification data about the target road user vehicle identifies a vehicle associated with one or more members of the CRSS (e.g., a member who owns or is authorized to operate the vehicle or is occasionally or frequently a passenger in the target vehicle). These types of confirming devices may be used to validate or confirm important data related to the tagging event, as these devices potentially have GPS, sensor and/or telemetry data that can positively verify geolocation, speed, direction, erratic movements, hazardous braking, and other safety issues in regard to the target vehicle. These members may be referred to herein as "special target-related members."

Figure 3C:
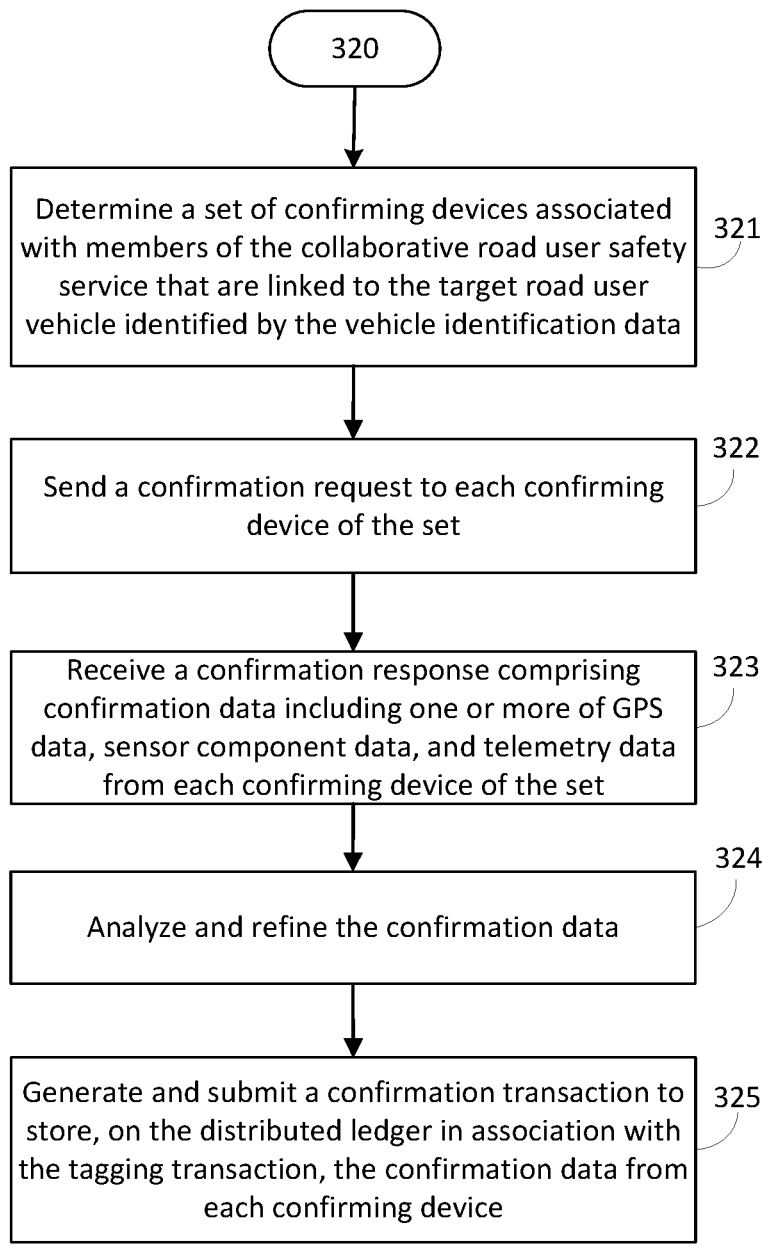
FIG. 3C shows an example process flow for determining and interacting with confirming devices belonging to potential operators or passengers of the target road user vehicle.

FIG. 3C shows an example process flow for determining and interacting with confirming devices belonging to potential operators or passengers of the target road user vehicle. Certain operations described in the example process flow 320 of FIG. 3C may be implemented in some embodiments by a CRSS 120 (or components thereof, such as confirmation unit 122).

Initially, a set of confirming devices is determined that belong to members who are linked to the target road user vehicle identified by the vehicle identification data (321). Determination of these special target-related members linked to the target vehicle may occur in various ways. In one aspect, the member account data (e.g., stored in the member data store 126) of member accounts is searched to identify the CSDs of owners and authorized operators of vehicles with matching vehicle identification data. In another aspect, the CSDs of frequent passengers of the target vehicle may be identified by matching wireless network identifiers gathered in relation to the tagging data of previous tagging transactions (see Example T2 of FIG. 2A) having the target vehicle's identification data with the wireless network identifiers of CSDs. Any aspect may be combined with other aspects.

Having thus identified a set of confirming devices belonging to special target-related members, a confirmation request is sent to each confirming device of the set (322). The confirmation request is sent substantially as described in regard to processing element 303 of FIG. 3A. However, the confirmation request content for confirming devices of special target-related members may vary in some implementations or operating situations; for example, instructions to collect vehicle identification data or safety data from sensors and connected telemetry devices may be preferred to interactive content presented to the target member via the user interface of the CSD.

In some cases, a confirmation request for GPS data may initially be sent to the confirming devices of special target-related members, which may be followed by additional confirmation requests to those devices that send confirmation responses indicating they are present within a confirming device geolocation boundary near the geolocation of the tagging request. This multiple confirmation request technique may be used to exclude the CSDs of special target-related members who are not where expected (e.g., are not passengers of the target vehicle) from further, more data intensive, confirmation requests.

After processing by the CSD in substantially the form described in regard to FIG. 3B, a confirmation response comprising confirmation data is received from the confirming devices (323). The confirmation data can include one or more of GPS data, sensor component data, and telemetry data, depending in each case on the nature of the confirmation request and the capabilities of the confirming device CSD. The receiving of a confirmation response is performed substantially as described in regard to processing element 304 of FIG. 3A.

The confirmation data from a confirmation response is analyzed and refined (324). Analysis can include examining and comparing the data for value and validity, and refinement can mean assigning ratings/weightings to, supplementing, and/or discarding certain raw data. For instance, initially, if the analysis of GPS data of the special target-related member confirming device indicates that it is not geolocated within a confirming device geolocation boundary computed from the GPS data of the initiating device, different processing may occur depending on the nature of the special target-related member. For example, the confirmation data may be discarded if the special target-related member was a suspected "passenger" determined from a pool of likely prior passengers; the lack of a nearby geolocation indicates that the suspected passenger was probably not in the target vehicle; on the other hand, if the special target-related member was the target vehicle's designated operator, then the confirmation data may be retained and refined with ratings or indicators that tend toward "disconfirmation" of the vehicle identification data of the original tagging event.

Alternatively, if the geolocation of a confirming device is within the confirming device geolocation boundary, then a special target-related member's presence there weights the vehicle identification data toward confirmation, and the confirmation data is refined with ratings/indicators that tend toward "confirmation" and is retained. The increase in value of the rating/indicator might vary depending on whether the special target-related member was an owner or a suspected passenger.

In embodiments or operating scenarios where sensor component data and/or telemetry data are received in the confirmation data, the sensor component data and telemetry data may be analyzed when the geolocation of the confirming device is established within the confirming device geolocation boundary. For instance, sensor component data from special target-related member's confirming devices may suggest confirmation or disconfirmation of the safety data received from the initiating member or other confirming devices, and confirmation data may be appropriately refined (e.g., ratings are assigned, raw data is summarized). In fact, the safety data of special target-related members with CSDs in the target vehicle may have extra importance/weight, as these devices' safety data can positively verify speed, direction, erratic movements, hazardous braking, and other safety issues in regard to the target vehicle.

A confirmation transaction is generated and submitted, storing the confirmation data from each confirming device on the distributed ledger in association with the tagging transaction (325). This processing step is performed substantially as described in regard to processing element 305 of FIG. 3A.

FIG. 4 shows an example process flow, appropriate to certain embodiments, for alerting and notifying members of the CRSS regarding road user safety. Certain operations described in the example process flow 400 of FIG. 4 may be implemented in some embodiments by a CRSS 120, or by components thereof, such as alerting unit 124.

Two primary types of alert receiver devices belonging to subscribing members can be sent alerts: watch-determined alert receivers, described in sub-process flow 410, and geolocation-determined alert receivers, described in sub-process flow 420. Each type shares common processing elements (430-432) for refining, determining, and sending an appropriate alert to each alert receiver device.

"Subscribing members" are users who have signed up with the CRSS 120, typically via a website or app interface. Subscribing members include members with a CSD 100 (e.g., a mobile device or other form factor on which the components described in regard to FIG. 1 have been downloaded or installed as software, hardware, or firmware, for example, as a mobile device app). Subscribing members can also include those users who have signed up with the CRSS to receive alerts that are directed to alert receiver devices that do not include their CSDs. For example, in some implementations or situations, parents of teen drivers may sign up with the service to receive alerts when their teen's vehicle identification data is the target of a tagging transaction; the parents themselves may not have installed the CSD components but instead choose to receive alerts related to their teen by SMS message, email, or other method. Subscribing members can also be regulated alert subscribers (described in more detail below) who receive alerts on alert receiver devices such as law enforcement or EMS consoles. Subscribing members can also be the user associated with the vehicle identification data, if that vehicle identification data is associated with a subscribing member's account.

Subscribing members receive alerts on one or more of their preferred alert receiver device(s), which can include, for example, alerts directed at the subscribing member's CSD (e.g., in the CSD's app interface), a mobile device operating system notification, a vehicle electronic dashboard interface panel or console, a text message (e.g., SMS or MMS), phone message, email, browser notification, desktop OS notification, a notification or indicator within the interface of another mobile app or desktop application (such as Google® Maps), a virtual assistant notification (such as an Amazon Alexa® or Amazon Echo® notification enabled via a "skill"), and by exposing the alert via an API of the CRSS so that third-party data interchange services (e.g., "IFTTT") can use them to automate certain activities across system boundaries. One or more preferred alert receiver devices can be designated by the subscribing member as an account setting.

Watch-determined alert receiver devices (410). In some embodiments, some types of subscribing members have the ability to request to be notified when the vehicle identification data of a particular target road user vehicle is the target of a tagging transaction. Initially, a set of alert receiver devices of subscribing members of the CRSS are determined wherein the vehicle identification data matches a watch parameter (411).

"Watch parameters" are set when specific watch requests are made by the subscribing member that identify the vehicle identification data of vehicles to watch. These may work in tandem with other alert parameters (see below), such as those that designate the severity threshold for receiving an alert. When a tagging event occurs that includes the vehicle identification data matching the watch parameter, the subscribing member will receive an alert at their designated alert receiver device(s).

For example, family members of the operator of a target road user vehicle (such as the parents of a minor child operator, or the children or caregivers of an elder parent operator) may become subscribing members in order to be alerted when the operator's road user vehicle is the target of a tagging transaction. In another example, the employer of an operator of a company-owned target road user vehicle may become a subscribing member in order to be alerted when one of the company-owned vehicles is the target of a tagging transaction. In another scenario, two friends or "buddies" might wish to enter a reciprocal pact to become safer drivers by becoming subscribing members in order to be alerted when the other subscribing member's (e.g., the friend's) vehicle is the target of a tagging transaction. In another scenario, the operators of vehicles may become subscribing members in order to be alerted when their own vehicle is the target of a tagging transaction or event.

In some embodiments, controls may govern the specific subscribing members who can enter watch parameters/requests on road user vehicles in order to increase privacy and security or adhere with local restrictions. In instances when the vehicle identification data in a watch parameter is associated with an existing member of the CRSS, an electronic verification message may be directed to the collaborative safety device of the existing member to approve the subscribing member's request to enter a watch request on the existing member's vehicle. When there is no such existing member, controls may require verification of ownership of the vehicle identified by the vehicle identification data in the watch parameter. For example, the CRS S may interface with an external data source (e.g., 141) accessible via an API, such as an electronic database of county tax and licensing records or an insurance company database, that can verify the ownership/custodianship of the vehicle in question by the subscribing member.

Geolocation-determined alert receiver devices (420). In some embodiments, alert receiver devices of subscribing members may be selected by proximity of the alert receiver device to the target road user vehicle near the time of the tagging event. These techniques enable nearby subscribing members of the CRSS to be aware of road user vehicles in their vicinity who are currently exhibiting erratic or unsafe driving behaviors.

An alerting geolocation boundary is determined that includes or bounds the predicted locations of the target road user vehicle within an alerting time interval (421). The alerting geolocation boundary may be initially derived from the GPS data of the initiating device. The alerting geolocation boundary may be determined using methods similar to those described in regard to processing element 301 of FIG. 3A for determining a confirming device geolocation boundary. However, the alerting time interval may be different from (e.g., longer) than the confirmation time interval in that description.

In some embodiments, the alerting geolocation boundary may be refined by GPS data received from a confirming device, including a confirming device that is the CSD of the target road user vehicle's operator or passenger. Furthermore, geolocation-determined alert receiver devices may be determined iteratively at periodic intervals by the CRSS. For instance, a target road user vehicle's predicted location may be refined as confirmation responses are received from confirming devices; therefore, an additional or updated alerting geolocation boundary may be determined with the updated GPS data and used to select additional alert receiver devices. For example, a new confirmation response from a confirming device may trigger the determination of a new alerting geolocation boundary with the concomitant selection of a new set of alert receiver devices within that boundary.

In some examples or embodiments, the alerting geolocation boundary determines an initial boundary containing a prospective set of alert receiver devices. The devices in the prospective set are sent a request for their updated GPS locations, which are then used to refine the members of the set.

An alert receiver device is selected for the set of alert receiver devices when the alert receiver device geolocation is within the alerting geolocation boundary (422). Geolocation of subscribing members with CSDs may be known approximately via GPS data sharing between CSDs and the CRSS. Every so often (e.g., ranging from every few seconds to a small number of minutes, depending on implementation), the CSD may send updated GPS data to the CRSS so that the service knows the approximate geolocation of subscribing members' CSDs. This approximate GPS data can be used to refine an approximate set of alert receiver devices to which to send alerts. In some cases, the CSDs (e.g., via the alert component 103) can decide whether to display the alert (which may contain the alerting geolocation boundary information) based on actual, updated GPS data taken from the GPS component at the time the alert is received by the CSD. In some cases, the members of the approximate set of alert receiver devices may be actively "pinged" for GPS data by the CRSS before an alert is sent in order to obtain the most updated GPS data for the alert receiver devices; the members of the approximate set may then be culled for the actual set to which to send the geolocation-determined alerts.

"Other alert receiver devices" (e.g., 140), such as those belonging to regulated alert subscribers (see below), may sometimes be in the set of alert receiver devices receiving a geolocation-determined alert. Other alert receiver devices might include, for example, law enforcement or Emergency Management System (EMS) dispatch/monitoring consoles or systems. In such cases, the precise geolocation of these "other" alert receiver devices may be determined using geolocation-sharing with the CRSS, similarly to the methods used to determine geolocation for CSDs. However, these other alert receivers' geolocation may need to be known less accurately/more approximately, since an alerting geolocation boundary may be wider for regulated alert subscribers.

Continuing with process flow element 422, the set of alert receiver devices may be further refined by minimum proximity constraints associated with the subscribing member associated with a given alert receiver device. Minimum proximity constraints identify the minimum distance the target road user vehicle should be to the alert receiver device before an alert is sent to it. Minimum proximity constraints may be default settings appropriate to the type of subscribing member (e.g., standard member, premium member, regulated alert subscriber); minimum proximity constraints may be configurable in certain ways in accordance with the type of subscribing member.

The set of alert receiver devices having been determined for both watch-determined (410) and geolocation determined (420) alerts, common processing elements are now described.

The set of alert receiver devices may be further refined according to alert parameters set by each subscribing member associated with each alert receiver device (430). "Alert parameters" include settings that indicate the circumstances under which a given subscribing member wants to be, or should be, alerted. The CRSS may set alert parameters to default settings, for example, when the subscribing member initially signs up for the service, some or all of which may be configurable by the subscribing member, e.g., via a website or mobile app user interface. In some cases, the type of subscribing member, which may govern their level of permissions to change alert parameters, may govern which alert parameters can be set or their range of acceptable configurations.

Examples of alert parameters appropriate to some embodiments include the specific types of safety data the subscribing member wants to be alerted about (e.g., the member only wants to be alerted about target road user vehicles whose safety data indicates they are aggressive or dangerous, but not necessarily those target vehicles who are merely speeding); minimum proximity constraints; one or more device type associated with the alert receiver devices connected with the subscribing member's account; and the subscribing member type.

As noted, some alert parameters define constraints on the types of safety data required (e.g., a safety behavior type or tagging event weighting score associated with the target road user vehicle's tagging event) before the alert receiver device is sent an alert, and thus may be used to refine the set of alert receiver devices by removing the alert receiver devices associated with subscribing members that do not want alerts having to do with tagging events not meeting those safety data constraints.

Certain types of subscribing members may be "regulated alert subscribers." Regulated alert subscribers include regulatory or enforcement entities or other organizations that have an interest in receiving alerts about specific safety issues relating to target road user vehicles. Included, for example, are law enforcement personnel or dispatch systems (e.g., locality/municipality or state police department, sheriff's office, or federal law enforcement agency), EMS personnel (e.g., ambulance services, fire departments, paramedics), regulatory bodies with a quasi-investigative or enforcement role (e.g., FAA, air traffic control, or NTSB), agencies with a mandate to do traffic or safety management or avoid road hazards (e.g., state, county, or local/municipal road management or traffic control authorities, municipal bus systems, school districts with bus systems or child-safety/crossing zones), or traffic awareness services such as Google Maps.

Regulated alert subscribers can receive watch-determined alerts about specific target road user vehicles or broad categories of vehicle types (e.g., semi-trailer trucks, commercial vans, etc.), as well as geolocation-determined alerts about safety-related activities of vehicles in geo-bounded enforcement zones. Hence, for example, alerts may be sent to one or more regulated alert subscribers (e.g., the NTSB) when any vehicle of type "semi-trailer truck" is the target of a tagging transaction; or, alerts may be sent to subscribing members of the local sheriff's department (e.g., deputies) when a target vehicle exhibits a safety-related behavior of a certain severity level (e.g., driving while appearing intoxicated, aggressive driving) while within a range or distance around the deputy's location; or an alert may be sent to a law enforcement agency when vehicle identification data or safety data indicates an erratic elder driver, which might indicate, for example, the location of a missing subject of a "silver alert" or the need to publicize a new "silver alert". Naturally, regulated alert subscribers (being a type of subscribing member, but with varied alert properties and permissions), can fine tune the alerts received with alert parameters such as severity constraints and minimum proximity constraints.

As noted, an alerting geolocation boundary may be determined separately or iteratively for regulated alert subscribers receiving geolocation-determined alerts. The alerting geolocation boundary appropriate to regulated alert subscribers may, for example, be wider than it is for standard or premium subscribers, since law enforcement or EMS personnel may want to see alerts for target road user vehicles anywhere in their "zone," which might include the city limits, county, or other enforcement zone associated with that regulated alert subscriber.

For each alert receiver device in the set of alert receiver devices, an alert is determined that is customized to the alert parameters associated with the subscribing member and the alert receiver device, and which aligns with the characteristics of the safety data (431).

A type of alert parameter includes the type of alert receiver device that will receive it, and the alert may be customized accordingly. For example, if the alert receiver device is a device designated to receive an SMS/MMS message, the alert may be simple, text-based, and include the vehicle identification data; if the alert receiver device is a CSD, the alert may, for example, include a popup notification on the CSD interface, an icon or symbol depicting the location of the target road user vehicle on a map interface and/or simulating the predicted movement of the target road user vehicle over time, and/or an audible warning (e.g., voice, beep, ding, or other distinctive sound). An alert for geolocation-determined alert receiver devices may contain additional information that some kinds of alert receiver devices can display on their interfaces, such as an estimated time that the target road user vehicle will intersect with or approach the alert receiver device.

An alert may be customized according to the characteristics of the safety data (e.g., a safety behavior type, tagging event weighting score, or other severity rating derived from the safety data), for example by denoting different types of tagging event weighting scores or safety behavior types in different colors or other differing user interface indicators, or by utilizing different kinds of audible sounds or voice warnings. Any combination of such examples (e.g. audible and visual alerts sent to the same alert receiver device) are also possible.

A type of alert parameter includes the type of subscribing member associated with an alert receiver device. For example, a subscribing member defining a watch parameter may receive an alert about the target road user vehicle being watched with information that is summarized subsequent to a tagging event; such an alert might include a summary of pertinent information about the tagging event, e.g., vehicle identification data, date and time and geolocation of the tagging event, number and types of confirmatory data, and summarized telemetry data. A subscribing member receiving a geolocation-derived alert may only want enough information to safely avoid, react to, or be aware of the target road user vehicle, e.g., enough vehicle identification data to avoid the target vehicle, the type of hazard it represents, and its approximate distance and approach vector.

In some embodiments, partial or provisional alerts can be sent to alert receiver devices without complete vehicle identification data or safety data. For example, a first, provisional alert might indicate that a target vehicle has been "tagged" nearby and so the alerted member should be on the lookout. As vehicle identification and safety data are refined with further information from the initiating device, a second or updated alert might provide the additional information; or, cancellation of the first alert might occur if the enhanced safety data does not match the subscribing member's alert parameters.

In some embodiments, an alert can include aspects of a confirmation request, described in regard to FIG. 3A. The alert, for instance, might contain descriptive text or other interface elements whereby the recipient subscribing member who received the alert can confirm the target road user vehicle's presence, or some aspect of the vehicle identification data or safety data. An alert with confirmation request asking the receiving member to indicate if he or she sees the target road user vehicle (e.g., via an interface button, special voice command, or reply SMS message) can provide the valuable technical effect of allowing the predicted geolocation of the target road user vehicle to be updated. confirming. Essentially any confirmation request that implies or requests member interaction may be combined with an alert.

The alert is sent to each receiver device, respectively, using the message format and transfer protocol appropriate to the type of alert receiver device and the type of alert (432). For example, if the alert receiver device is a collaborative safety device 100, the alert may be sent, for example, to the alert component 103 of the CSD for rendering on the appropriate interface system of that device (e.g., render the alert on the display, make a sound, etc.). If the alert receiver device is designated to receive an alert as a mobile device "notification," the alert is formatted and sent using the notification methodology of the particular mobile device operating system. If the alert receiver device is designated to receive the alert in SMS/MMS, then the alert is formatted and sent using the SMS/MMS protocols to the mobile system number designated by the subscribing member. If the alert receiver device is designated to receive the alert as an email, then the alert is formatted and sent via SMTP protocols to the email address designated by the subscribing member. If the alert is destined for alert receiver device that is part of a console/dispatch system, the alert is formatted and sent according to the API of that console/dispatch system. In some embodiments, the alert may be available for other systems to "pull" via an API of the CRSS, for example, from an alert log or alert queue that receives alert messages and associated metadata as they occur.

The type of subscribing member and the type of the alert may also impact the speed with which the subscribing member is sent the alert. For example, watch-determined alerts may be sent with some delay after the tagging event, according to system necessity or implementation, as these types of alerts may be sent to inform interested members, rather than to assist members in real-time avoidance of road safety issues. Further, subscribing members being sent watch alerts when their own vehicle is the target of a tagging event may receive them only later (e.g., minutes or even hours later), for example, after a time interval or after the member has stopped the vehicle, to discourage retaliatory tagging or road rage. Alerts sent to target members may also, in some scenarios, obfuscate or anonymize data about the initiating member.

In examples and embodiments, certain technical features support the determination of weighting scores in relation to the tagging event that assigns a composite designator of the validity and severity of a tagging event derived from multiple aspects. These technical features may facilitate and enable data sharing between participants in the collaborative road user safety service (CRSS) and help to enhance data quality when used in conjunction with other technical features (e.g., data feed smart contracts).

Figure 5:
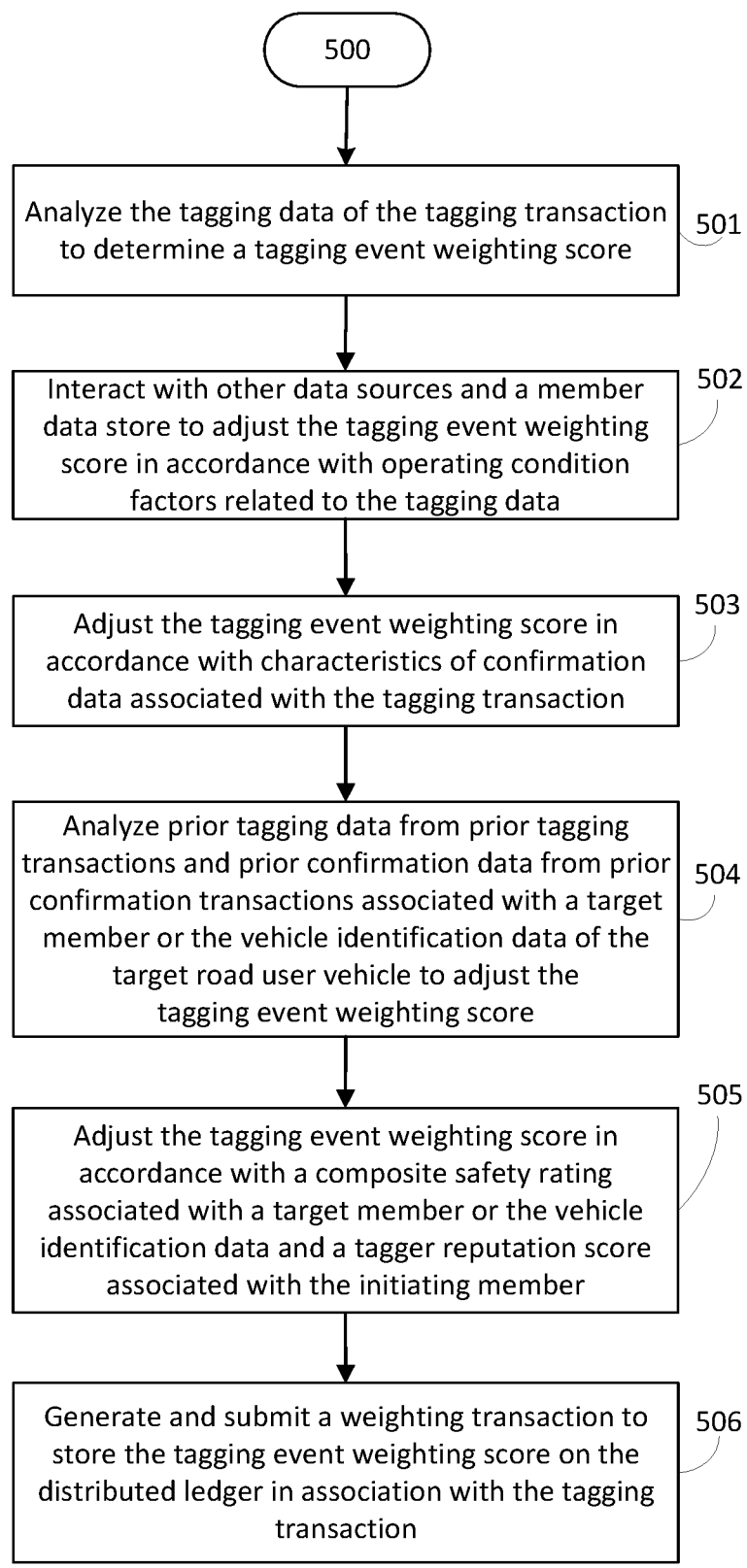
FIG. 5 shows an example process flow for determining a measure of the validity and severity of a tagging event, derived from multiple aspects, and storing it on the distributed ledger.

FIG. 5 shows an example process flow for determining a measure ("tagging event weighting score") of the validity and severity of a tagging event, derived from multiple aspects, and storing it on the distributed ledger.

Certain operations described in the example process flow 500 of FIG. 5 may be implemented in some embodiments by a CRSS 120, or by components thereof, such as weighting unit 123. Process flow 500 may execute, for example, periodically, on a timed interval, to associate tagging event weighting scores with any new tagging transactions that have been stored on the distributed ledger since the last timed interval elapsed, or in in response to a monitoring process that watches for new tagging transactions to be entered on the distributed ledger; or, the process flow may execute after the process flow of FIG. 2B.

Initially, the tagging data of the tagging transaction is analyzed to determine a tagging event weighting score (501). A tagging event weighting score may contain a single metric (e.g., a single number or rating value that expresses multiple concepts, such as validity and severity), or it may contain a compound metric; for instance, a compound metric might show two separate indicators, one that expresses validity of the tagging event, and the other that expresses its severity; or, a compound metric might express separate indicators for validity, severity, and historical trend. Tagging event weighting scores that are compound metrics can be stored as data structures on the distributed ledger.

The tagging data of the instant tagging transaction may contain particular aspects or characteristics that indicate the severity of the tagging event; for example, the safety behavior type indicated by the initiating member may be associated with severity weights that serve as a starting indicator of the tagging event's severity. For example, a safety behavior type of "Aggressive" might have a severity weight of 100 units, while "Speeding" has a severity weight of 50 units.

Vehicle identification data in the tagging data can be analyzed to influence a validity indicator of the tagging transaction. For instance, vehicle identification data that is partial and/or originates from input by the initiating member may have a lower starting validity weight than vehicle identification data that is complete and/or determined by OCR of a plate number captured from a camera on the CSD (see, e.g., FIGS. 2A-2B).

In embodiments that incorporate sensor component data and telemetry data, and depending on capabilities and operating conditions associated with initiating device of the tagging event, the safety data and the vehicle identification data might include telemetry data from a sensor or connected telemetry device that influences the severity or validity weights positively or negatively. For example, the severity weight might be increased by accelerometer data that indicates the initiating member had to swerve to avoid an erratic driver; or, validity weight might be decreased if a radar sensor indicates at target vehicle marked as "Speeding" was in fact driving below the speed limit.

The tagging event weighting score is adjusted in accordance with operating condition factors related to the tagging data, obtained by interacting with other data sources and a member data store (502). The techniques for interacting with other data sources, such as weather services and traffic services, by using their APIs over the communications interface, have been previously described. Some of the operating condition factors that can be obtained that could influence the weighting score include, for example: darkness level at the locality indicated in the GPS data of the tagging data by interacting with a data source containing sunrise and sunset times at a particular locality; directionality indicated by the GPS data can reveal whether the time of day could have impacted the target vehicle operator's vision (e.g., traveling westward at sundown in the summer); interacting with weather condition data sources can indicate the presence of snow, ice, fog, or rain that might either increase or decrease a severity weight; interaction with a mapping data source might indicate the tagging event occurred in the city center, where many pedestrians cross, or in a school zone active at a particular time of day (e.g., increasing the severity weight); interacting with a traffic data source might reveal important weighting factors such as the level of traffic, speed limit, average real-time speed level, and/or the presence of a construction zone, on a roadway at the time of the tagging event—all of which might impact the severity indicator of the tagging event weighting score; the member data store might be interacted with to indicate how far a target member is from home or work, and her unfamiliarity with the area might reduce the severity indicator; the member data store might also reveal whether the target member has a commercial driving license, or the age (e.g., experience level) of the driver, which might influence the severity indicator or validity indicator; interaction with an insurance database might reveal whether and for how long the target road user vehicle has been insured; interacting with a data source of vehicle types using the make/model of the target vehicle from the vehicle identification data (or member data store, if it belongs to a member) might reveal its capacity for harm or be correlated with factors that increase or decrease the validity or severity of the weighting score.

In embodiments that include confirming devices, and depending on the capabilities of confirming devices and operating conditions associated with a particular tagging event, there may be confirmation data available in relation to a tagging transaction. The tagging event weighting score is adjusted in accordance with characteristics of the confirmation data associated with the tagging transaction (503). Initially, the mere existence of confirmation data, in embodiments that support the related techniques and systems, may influence the tagging event weighting score. For example, tagging event weighting scores for tagging transactions with no associated confirmation data may be lowered in validity, or receive no validity adjustment.

When confirmation data associated with the tagging transaction does exist, it may increase or decrease the tagging event weighting score depending on its quantity and its nature. Each individual confirmation transaction encodes a variety of factors, including the nature of the confirmation data (i.e., interactive or sensor-based), the existence of sensor or telemetry data, and the sensor/telemetry data quality rating. Such factors may combine to form a "confirmation data quality rating." The confirmation data quality rating is an evaluation metric based on characteristics of the confirmation data that describes the likelihood that the confirmation data confirms the initiating member's tagging transaction. The confirmation data quality rating may be computed in various ways, for example, it may assign a numerical score from +1.0 to −1.0 that indicates both the quality of the confirmation data (its precision) and the likelihood that it strongly confirms (e.g., +1.0), strongly disconfirms (e.g., −1.0), or gives little information about (e.g., 0.0) the data in the tagging transaction. The confirmation data quality rating can be computed collectively in view of all the confirmation data from multiple confirmation transactions, or it can be computed individually for each confirmation transaction and then combined (e.g., averaged).

Prior tagging data from prior tagging transactions and prior confirmation data from prior confirmation transactions associated with a target member or the vehicle identification data of the target road user vehicle are analyzed in order to adjust the tagging event weighting score (504). Prior tagging transactions relating to the same vehicle identification data or target member may be filtered by factors that relate the tagging data of the instant tagging transaction to matching prior tagging transactions. For example, prior tagging transactions may be selected that have the same safety behavior type and/or occurred in proximate geolocations to the tagging transaction being scored. If such prior tagging transactions exist, their confirmation data quality rating can then be assessed to determine the degree to which the prior transaction is confirmed.

The existence of (or lack of) these similar prior tagging transactions may affect the tagging event weighting score in any of, for example, the validity, severity, or historical trend indicators/weights. For example, the existence of similar prior tagging transactions may positively influence the validity weight of the tagging event weighting score, as it indicates that the target member or target vehicle "tends" toward such behaviors even if the current tagging event is unconfirmed. To the extent that the prior tagging transaction is confirmed (e.g. has a higher confirmation data quality rating), it may influence the tagging event weighting score more. To the extent the prior tagging transaction is disconfirmed, it might reduce or have no effect on the tagging event weighting score. Severity weights might be increased by the existence of confirmed behaviors that indicate a pattern of repeating, unsafe activity. Historical trend weights may be increased if the safety behaviors are persistent and long term.

The tagging event weighting score is adjusted in accordance with a composite safety rating associated with a target member or the vehicle identification data and a tagger reputation score associated with the initiating member (505).

One factor that may be used to influence the tagging event weighting score is the composite safety rating associated with the vehicle identification data or a target member. A "composite safety rating" is associated with a particular member (or a particular vehicle, when no member is associated with the vehicle's identification data). The "Driver Score" shown in element 910 of FIG. 9 is an example of a composite safety rating attached to a particular vehicle's identification data. The composite safety rating is derived from aggregated tagging event weighting scores associated with prior tagging events in which the particular member or vehicle identification data was the target (i.e., was "tagged"). The individual tagging event weighting scores of the prior tagging events may be combined in various ways to form the composite safety rating. For example, individual tagging event weighting scores of the prior tagging events may be summed or averaged together, or filtered by time range and then those meeting the filter criteria are summed or averaged (e.g., to derive a composite safety rating that is taken from tagging events only in the last six months, or only in the last 30 days), or given a weighted average according to a curve based on the age of the tagging event (e.g., causing tagging event weighting scores from the most recent events to impact the composite safety rating more than older events). The combined tagging event weighting scores may then be used as the composite safety rating or subtracted from (or added to) a default rating assigned to vehicles or members. The value of the composite safety rating, i.e., whether a higher or lower number indicates a less safe driver, depends on how the combined tagging event weighting scores are used to derive the composite safety rating.

In some embodiments, aspects of a composite safety rating may relate to characteristics of the particular member (or vehicle). For example, the member data store might reveal whether the member has a commercial driving license, or the age (e.g., experience level) of the driver, or whether and for how long a vehicle has been insured. Such member-related or vehicle-related data might be used to further adjust the composite safety rating.

One factor that may be used to influence the tagging event weighting score is the tagger reputation score associated with the initiating member. A "tagger reputation score" is derived from the aggregated or composite validity of tagging data and confirmation data associated with tagging events in which the particular member was the initiating member. The presence of confirmation data tending to confirm the accuracy of the initiating member's tagging data will tend to increase his/her tagger reputation score, whereas the presence of confirmation data tending to disconfirm the accuracy of the initiating member's tagging data will tend to lower the tagger reputation score; lack of confirmation data might have no influence on the tagger reputation score.

The tagger reputation score may be computed from the confirmation data quality rating(s) (described above) of tagging events that were initiated by the initiating member. In some examples, the tagger reputation score may be computed dynamically by subtracting a composite (e.g., summed, averaged, time-filtered, or time-averaged) confirmation data quality rating from the current composite safety rating of the initiating member. The tagger reputation score may be reduced in some example embodiments if the initiating member attempts to "revenge tag" vehicles that have tagged the initiating member in the same geolocation/timeframe.

A weighting transaction (e.g., 133) is generated and submitted, storing the tagging event weighting score on the distributed ledger in association with the tagging transaction (506). As noted, the tagging event weighting score can be a single value or a compound value as part of a data structure. The tagging event weighting score can include a referent to associate the weighting transaction with the related tagging transaction, e.g. via a tagging transaction identifier, tagging transaction address, or a tagging UUID.

The tagging event weighting score may be private by being cryptographically encoded, as described previously. The tagging event weighting score, once formatted, can be submitted (e.g., transmitted or stored) on the distributed ledger 165 by executing a transaction, via the CRSS distributed application node 125, that broadcasts it to one or more nodes 131 on the distributed application network 130, calling a function of a CRSS smart contract, or other method substantially as described in regard to element 255 of FIG. 2B.

In examples and embodiments, certain technical features encourage participation and data sharing between members of the CRSS. These technical features have the advantage of encouraging data sharing between devices participating in the service, in addition to having the advantageous technical effect of improving and ensuring the quality of data that is used to make road user safety assessments at all levels of collaboration, from individual safety decisions, to regulatory/enforcement performance, to road safety operations, planning, and systems design.

Embodiments include technical features for the transfer of cryptographic token into and out of cryptographic token repositories belonging to or associated with members who serve various roles in the CRSS. Several of these embodiments have common elements which are described before those of individual member types and the manner of computing the quantity of cryptographic token transferred.

A cryptographic token represents units of value that can be exchanged for another commodity, such as money (e.g., a fiat currency or another unit that can be exchanged for a fiat currency) or other asset category (e.g., gold, stock, wheat futures, etc.), or which can be exchanged for something of value connected to the distributed application network e.g., a service or "right," discounts or rewards in an online store, airline mileage, insurance policy discounts, etc.

In some embodiments, cryptographic tokens may be in denominations of cryptocurrencies, such as BTC (Bitcoin) or ETH (Ether). Or, the CRSS may issue specialized cryptographic tokens that are representative of the incentive value being transferred on the CRSS and the distributed application network of which it is a part.

In a distributed application network with smart contracts, cryptographic tokens may represent the smart contract. In Ethereum, for example, a cryptographic token is a smart contract running on top of the Ethereum network; specialized cryptographic tokens can be created using a token-creation smart contract that adheres to standards defined in, e.g., ERC-20. A token smart contract, then, is a set of code (functions) with an associated state database. The code describes the behavior of the token, and the state database tracks who owns how many tokens. Some embodiments herein may employ specialized cryptographic tokens that confer a tradeable value to incentivize member CSDs to participate in certain kinds of safety or data quality-enhancing activities. Specialized cryptographic tokens, if used, may have a tradeable valuation measured in another cryptocurrency, and such tokens may be traded for other cryptocurrencies on an exchange.

A cryptographic token repository may be associated with a member of the CRSS in various ways. For example, the signup process for the CRSS might occur when a new user downloads an App onto their mobile device and enters signup information, such as an email address and vehicle identification data about their vehicle(s); the cryptographic token repository may be created by the CRSS on behalf of the new member at that time. A member may also associate an existing cryptographic token repository with their member account. In some cases, a blockchain-based identity solution may be used integrate the CRSS with an existing cryptographic token repository provisioned by the identity solution (i.e., a service that provides features for associating a common identity or set of accounts on a distributed application network with multiple DApps; CIVIC is one of many examples of companies providing this solution). In some cases, a cryptographic token repository may be called a blockchain wallet or "account" or "wallet address".

In some implementations or operating scenarios, a new member may receive cryptographic token in their existing, associated member token repository at the time of signup, or even periodically at set intervals (e.g., every month or year). Sometimes, the new member may themselves fund a new cryptographic token repository with an initial token transfer. In other implementations or scenarios, the new member may associate their account on the CRSS with a cryptographic token repository containing existing token to be drawn from or added to depending on the nature of the incentivized event.

The CRSS may transfer cryptographic token into, or from, a member's cryptographic token repository at the time one of the member's CSDs participates in an incentivized event (e.g., the device acts as an initiating device or confirming device). The directionality of the transfer transaction depends on the nature of the incentivized event. Incentivized events with negative incentives, such as the member's vehicle being the target of a tagging event where the vehicle was operated in a questionable or unsafe manner, may remove or withdraw token from their token repository. Incentivized events with positive incentives, such as the member's CSD responding to a confirmation request with a confirming (or disconfirming) response, may add or send token to their token repository.

The transactions for transferring cryptographic token from one cryptographic token repository to another may be called incentive transactions (e.g., 132). Multiple incentive transactions may be executed on the distributed application network in conjunction with any relevant incentivized transaction type on the CRSS. For example, as will be described below, a tagging transaction may cause incentive transactions to be executed on both the initiating member token repository and, if identified, a target member token repository.

In some examples or implementations, the CRSS may deploy an incentive smart contract (e.g., 160) which includes program instructions for transferring cryptographic token from one distributed application network token repository address to another token repository address. It should be noted that an incentive smart contract may be program instructions within another smart contract deployed by the CRSS, including functions or instructions within functions. In some implementations, the program instructions or smart contract functions for transfer of token between cryptographic token repositories may be triggered during the execution of other program instructions, such as the storing of a tagging transaction or confirmation transaction (e.g., 127, 134, respectively) on the distributed ledger of the distributed application network. In some implementations, event watching logic may trigger the program instructions of an incentive smart contract when a relevant transaction (e.g., a tagging transaction or confirmation transaction) is committed to the blockchain.

For any incentive transaction, the cryptographic token that is transferred into or out of a member token repository has one or more source token repository or one or more destination token repository, respectively, i.e., the cryptographic token comes from some token repository or goes to some token repository during the transfer. The source/destination token repository can be of various broad types, varying based on the type of incentivized transaction, implementation, and operating conditions, that are discussed below in respect to the individual types of incentivized transactions.

In embodiments, these source/destination token repositories may belong to "incentivizing members," which may belong to any individual or organization that wants to incentivize/de-incentivize various types of transactions. For example, police departments might wish to incentivize tagging and fund a token repository to pay cryptographic token to initiating members. As another example, insurance companies might wish to de-incentivize unsafe behavior of all types and fund an initial token repository for its policyholders whose balance is reduced (the quantity being returned to the insurance company's token repository) when the member/policyholder is the target of a tagging transaction; the policyholders might receive the remaining balance at the end of the policy period (for example, to redeem a reward, discount, or receive the funds at some currency-token exchange rate). As another example, localities or municipalities might wish to incentivize both tagging and safe driving, for example in relation to zones of high danger or accident rates. As another example, the token repository associated with the CRSS, or with a regulator or other organization (e.g., Vision Zero) might wish to incentivize valuable confirmation response behaviors in its members to improve road behavior data quality that could be valuable in road safety management.

It should also be noted that the quantity of cryptographic token transferred into or out of any member token repository may have multiple source repositories and/or multiple destination repositories, respectively. For example, the quantity of token paid into a member token repository may come in part from the CRSS' token repository, in part from a member's insurance company's token repository, and in part from a local police department's token repository. Similarly, the quantity paid out of the member token repository may be transferred back to multiple token repositories. Thus, any transfer of token may have multiple transfer steps.

With the basic process flow and concepts of incentive transactions now understood, discussion turns to individual types of incentive transactions. It should be noted that any combination of these individual types may be present in any embodiment.

In some embodiments, techniques may be used for transferring cryptographic token to an initiating member token repository in association with a tagging transaction. The initiating member repository receives (or sends) some quantity of cryptographic token when the initiating member initiates a tagging transaction. Whether the initiating member token repository receives the cryptographic token or sends the token depends on implementation of the CRSS. In some embodiments of the CRSS or under other operating conditions, initiating members are rewarded positively with token when they tag. In some embodiments, initiating members "stake" the validity of the tagging transaction they initiated with various quantities of token that may be later returned if a subsequent confirming device confirms the tagging transaction data, or which may be sent out if confirming devices subsequently disconfirm the tagging transaction data. Thus, when the CRSS is implemented such that tagging is rewarded with token, the token is received by the initiating member token repository, whereas when the CRSS is implemented such that tagging is staked, the token may be (a) transferred out from the initiating member token repository and then transferred back when subsequent confirmation data quality rating is above a positive threshold, or (b) transferred out from the initiating member token repository when subsequent confirmation data quality rating is below a negative threshold.

The quantity of cryptographic token transferred is derived from factors that include a tagger reputation score of the initiating member, a composite safety rating associated with the vehicle identification data of the target vehicle, and the characteristics of the safety data.

The tagger reputation score of the initiating member may be derived from aggregated tagging and confirming reputation over a period of time and may be determined as described with respect to FIG. 5.

The composite safety rating associated with the vehicle identification data of the target vehicle may be derived as described in regard to FIG. 5, (see, e.g., user interface element 910 of FIG. 9).

The composite safety rating of the target vehicle may then be modulated or adjusted in accordance with factors that relate the tagging data associated with the current tagging transaction with historical tagging transaction activities related to the same vehicle identification data. For instance, tagging transactions related to the same vehicle identification data may be analyzed for their GPS data to see whether the target road user vehicle has additional tagging transactions at or nearby the geolocation of the current tagging transaction. If so, the composite safety rating may be adjusted to increase the incentive quantity of cryptographic token.

Similarly, tagging transactions related to the same vehicle identification data may be analyzed for their safety behavior type to see whether the target road user vehicle has additional tagging transactions which are similar to the safety behavior type in the current tagging transaction. If so, the composite safety rating of the target vehicle may be adjusted to increase the incentive quantity of cryptographic token.

Confirmation transactions related to the same vehicle identification data, where the confirmation transactions positively confirm the safety behavior type or GPS data in previous tagging transactions, may also adjust the composite safety rating of the target vehicle to increase the incentive quantity of cryptographic token.

Characteristics of the safety data may also influence the incentive quantity of cryptographic token. One such characteristic in some embodiments includes the existence/non-existence and/or quality of telemetry in the safety data, which may influence a safety data value that increases or decreases the quantity. For example, vehicle identification data that is verified or entered by a photograph taken from a dashcam in the initiating member's vehicle might increase the safety data value; a speeding target vehicle whose safety data is verified by telemetry from the initiating member's vehicle's LIDAR device might also increase the safety data value.

Another such characteristic in some embodiments includes the safety behavior type that is reported. Initiating members might be incentivized to tag certain types of safety behaviors by different incentivizing members. For example, a local police department might wish to incentivize the reporting of intoxicated drivers and offer a greater quantity of cryptographic token to initiating members who report this type of safety behavior.

The factors that include the tagger reputation score of the initiating member, the composite safety rating of the target vehicle, and the safety data value may be combined into an aggregated proportionality factor that, when multiplied by a constant, a token value exchange rate, or other value, determines a quantity of cryptographic token with which to incentivize the initiating member. Any of the individual factors may be adjusted by weights that adjust their relevance to the aggregated proportionality factor that determines the quantity of cryptographic token being transferred.

In some embodiments the quantity of cryptographic token being transferred is proportional to or derived from the tagging event weighting score of the tagging transaction, described in regard to FIG. 5. The tagging event weighting score may be used as an additional factor in any embodiment or can be the sole factor.

The source of cryptographic token transferred to initiating members may be provided, in some embodiments, by incentivizing member token repositories, as described previously.

In some embodiments, techniques enable the transfer of cryptographic token into or out of the target member token repository of a "target member" (i.e., a member of the CRSS with a vehicle identifier in their membership data that matches the vehicle identification data of the target road user vehicle associated with a tagging transaction). Initially, the vehicle identification data of the tagging transaction is compared with vehicle identification data associated with member accounts in the member data store (e.g., 126). If a target member is found, i.e., the vehicle identification data of the tagging transaction is, in fact, associated with a member of the CRSS, then the target member's associated "target member token repository" is identified.

If a target member token repository is identified, then a quantity of cryptographic token is transferred into or out of the target member token repository, using techniques similar to those described previously. The directionality of the transfer (i.e., "to" or "from" the token repository), as before, depends on implementation and operating conditions and may vary. For instance, tagging transactions can have as their targets those vehicles who exhibit a safety behavior type that indicates a positively incentivized safety behavior—e.g., courteous driving, using caution or driving skill to avoid an accident almost caused by another driver or difficult road conditions, allowing other vehicles to safely merge on a busy freeway on-ramp, etc. In such cases, the target member token repository may be positively influenced to result in an increase in the amount or value of cryptographic token in the repository.

In situations where the tagging transaction or event exhibits a safety behavior type that indicates a negatively incentivized safety behavior—e.g., aggressive driving, unsafe driving, inattentive driving, excessive speed, etc.—the target member token repository may be negatively influenced to result in a decrease in the amount or value of cryptographic token in the repository.

The target member token repository may have been funded initially with cryptographic token, for example, by the target member him/herself, by an incentivizing member (such as the target member's auto insurance policy carrier), or by the CRSS.

The incentivizing member or other member who funded the target member token repository initially or subsequently may also determine or influence the destination token repository to which transfers from the target member token repository are sent. For example, if the target member's repository was initially funded by his or her insurance carrier, then the transfer from the repository to reduce the balance may be sent to the insurance carrier's repository. If the initial funder of the repository was the CRSS, the token might be transferred back to the CRSS's account (to be used, for example, to increase the token pool used to reward members for good driving behaviors, initiating tagging transactions, or confirming tagging transactions). In some scenarios, all or part of the cryptographic token transferred out from the target member token repository might be sent to the initiating member, for example, as an incentive for tagging activities or as a compensation for the offense by the target member's safety behavior.

The quantity of cryptographic token transferred is derived from factors that include a composite safety rating of the target member, a tagger reputation score of the initiating member, and the characteristics of the safety data. The techniques for determining these factors, and their influence on the quantity of cryptographic token transferred, are described above in respect to initiating member token transfers, with the difference being that the composite safety rating is associated with the target member's account, rather than with only the vehicle identification data; thus, the composite safety rating may incorporate target member data spanning multiple vehicles. In some embodiments the quantity of cryptographic token being transferred is proportional to or derived from the tagging event weighting score of the tagging transaction, described in regard to FIG. 5. The tagging event weighting score may be used as an additional factor in any embodiment or can be the sole factor in determining the quantity of token being transferred.

The incentivized transactions described above pertain primarily to tagging transactions; the discussion now turns to embodiments employing techniques of incentivizing the outcomes of and members associated with confirmation transactions: the confirming member associated with confirming devices, and the initiating member and/or target member when a tagging transaction is confirmed or disconfirmed.

Recall that, in some embodiments, the vehicle identification data or safety data of a tagging transaction may be confirmed (or disconfirmed) by confirming devices that have been identified within a geolocation boundary surrounding a tagging request. Confirming devices belonging to other members of the CRSS (i.e., "confirming members") may be sent confirmation requests which, as described previously, may require interactive responses (e.g., the member has to interact with an interface of a device to confirm the subject matter of the confirmation request) and/or the passive use of the confirming member's device or a paired telemetry device.

Members who receive a confirmation request that is interactively responded to or who assent to the use of CSD sensor component telemetry, or telemetry devices (e.g., 106) connected to their CSDs, are incentivized using the techniques described. (Recall that use of CSD sensor components or telemetry devices paired with the CSD for the purpose of responding to confirmation requests may be explicitly assented to at the time of the request by the confirming member, or may have been implicitly assented to via a system setting, user configurable setting, or other conditions associated with members who download CSD-related software).

In some embodiments, a quantity of cryptographic token is transferred into or out of a confirming member token repository associated with a confirming device who has responded to a confirmation request with a confirmation response (including positive confirmation or disconfirmation or the passive sending of telemetry data back to the CRSS). These transfers are effected substantially as previously described with regard to tagging transactions, and the source or destination token repositories for the transfers may be incentivizing members as previously described.

The quantity of cryptographic token transferred to a confirming member token repository is derived from factors including characteristics of the confirmation data of the confirmation transaction. One such characteristic in some embodiments includes the type of confirmation request/response. For example, a confirmation request that requires an interactive response from the confirming member might serve to positively influence the quantity of token transferred to that confirming member token repository, whereas more passive confirmation request/response modalities might ultimately incentivize the confirming member with less token.

Another characteristic of the confirmation data includes the existence/non-existence and/or quality of sensor/telemetry data in the confirmation data of the confirmation response; a higher quality of sensor/telemetry data might increase the quantity of token transferred. For example, vehicle identification data that is verified or entered by a photograph taken from a dashcam in the confirming member's vehicle might increase the quantity of token transferred; a speeding target vehicle whose safety data is verified by telemetry from the confirming member's vehicle's LIDAR device might also increase the quantity of token transferred. On the other hand, telemetry data that is ambiguous or inconclusive might decrease the quantity of token transferred. Naturally, these examples are not intended to be limiting, as different types of confirmation responses may be rewarded based on implementation choices or even adjusted dynamically based on factors determined by incentivizing members (e.g., encouraging data quality initiatives in particular geographic areas). In addition, these various types of characteristics can be combined, being weighted equally or in different proportions, to form a composite score that can be used to adjust the quantity of token being transferred.

In some embodiments, a quantity of cryptographic token is transferred into or out of a member token repository when the confirmation data of the confirmation transaction supports or disconfirms the initiating member's tagging transaction. In varying embodiments and examples, the member token repository can be the initiating member token repository associated with the initiating member of the tagging transaction. In varying embodiments and examples, the member token repository can be the target member token repository associated with a target member of the CRSS associated with the vehicle identification data of the tagging transaction. In some embodiments, token can be transferred into or out of both types of member token repository based on the same confirmation data. The source/destination of cryptographic token transferred to or from member token repositories may be provided, in some embodiments, by incentivizing member token repositories, as described previously.

The quantity of token transferred is derived from factors including a confirmation data quality rating associated with the confirmation data of one or more confirmation transaction. Described in regard to FIG. 5, the confirmation data quality rating, when multiplied with a fixed token quantity value, would influence the amount of token transferred and also determine the directionality of the transfer (e.g., a negative confirmation data quality rating showing disconfirmation would serve to recapture, or even punish, the original incentive received by the initiating member, while reducing or returning the disincentive received by the target member; whereas, a near-zero confirmation data quality rating would add or subtract very little from a member's token repository).

In some implementations, each confirmation transaction may initiate a transfer of token to a member's token repository. In other implementations, the confirmation data of more than one confirmation transaction may be collected and processed to assess a confirmation data quality rating computed for multiple sets of confirmation data, and then a single composite transfer of token may be performed (for either or both types of member token repositories).

As noted previously, one key technical effect of the collaborative nature of the described systems and techniques is the ability to interchange highly reliable safety data between disparate data subscribers who need reliable data for complex decision-making, especially decision-making performed by automated systems.

Therefore, in some embodiments, the CRSS provides the capability for permissioned data subscribers (e.g., 150) to receive aggregated, anonymized, de-anonymized, or specific road user data pertaining to one or more road users via smart contract interfaces.

Certain distributed application networks include smart contracts. In embodiments utilizing smart contracts, a data feed smart contract that is configured as described below in FIG. 6 can be deployed from program instructions by the CRSS to the distributed application network as described in respect to FIG. 1. Listing 1, at the end of this specification, shows program instructions in the Solidity programming language (e.g., for deployment on the ETHEREUM network) for an embodiment combining data feed smart contract program instructions and tagging contract program instructions.

The data feed smart contract binary code at deployment is propagated to the nodes of the distributed application network, and the nodes are then capable of handling calls and transactions that perform the functions below with regard to road user safety data.

FIG. 6 shows an example process flow for a data feed smart contract that provides road user data to permissioned data subscribers. Element 600 designates the entry point for the process flow. Initially, a data feed request is received from a permissioned data subscriber via a data feed smart contract interface (601).

The presence of a data feed smart contract on the nodes of the distributed application network enables network participants to interact with the data feed smart contract through interfaces (e.g., functions and/or data structures). A data feed smart contract (e.g., 155) is configured, through smart contract interfaces, to provide portals into various kinds of road user data placed on the distributed ledger by the CRSS. Those portals may make the road user data more interpretable, aggregated, summarized, or anonymous than the data stored within the individual transaction data structures stored on the distributed ledger. In embodiments where all or part of the individual transaction data structures are encrypted or otherwise obfuscated (e.g., for privacy or security of road users' data), the data feed smart contract interfaces may allow the encrypted or obfuscated data to be viewed or used by permissioned data subscribers in a manner that is not possible for other participants in the distributed application network to do using raw transaction data structures.

A "permissioned data subscriber" interacts with the data feed smart contract via its distributed application node on the distributed application network. A permissioned data subscriber has a distributed application network account that, typically, is owned or controlled by an organization (or individual) that has an interest in individualized or aggregated safety data relating to road user vehicles.

In some instances, the permissioned data subscriber interacts with the data feed smart contract directly via transactions submitted to the distributed application network via its own distributed application node. Such nodes can be full or partial nodes and can be un-permissioned or permissioned users (when a permissioned distributed application network is used), as described in relation to FIG. 1.

In some instances, a permissioned data subscriber owns or controls a smart contract that has been published to the distributed application network by the permissioned data subscriber's account, and their smart contract performs functions that interact with the data feed smart contract (for example, when an insurance company performs blockchain-based auto policy pricing and issuance, the insurance company's smart contracts might automatically interact with the data feed smart contract to obtain the prospective insured's historical safety behaviors and factor the driver's composite safety rating into the insurance quotation).

In some instances, a permissioned data subscriber might obtain data from the data feed smart contract via a web-based or mobile application "DApp" interface provided by the CRSS, in which the DApp interacts with the data feed smart contract via the permissioned data subscriber's account on the distributed application network via a browser extension or other software that connects the permissioned data subscriber's account credentials from an account wallet to the distributed application network through a shadow node. For example, a browser extension called METAMASK allows users to connect accounts stored in the METAMASK wallet through a METAMASK-provided shadow node in order to authenticate transactions on a distributed application network that are sent via web application code. The smart contract represented by the code listing in Listing 1 connects with the DApp shown in the interface of FIG. 9 via the METAMASK browser extension.

Non-limiting examples of types of permissioned data subscribers include public-sector organizations such as law enforcement personnel or dispatch systems (e.g., locality/municipality or state police department, sheriff's office, or federal law enforcement agency), EMS personnel (e.g., ambulance services, fire departments, paramedics), regulatory bodies with a quasi-investigative or enforcement role (e.g., FAA, air traffic control, or NTSB), and/or agencies with a mandate to do traffic planning or safety management, or to avoid road user safety hazards (e.g., state, county, or local/municipal road management or traffic control authorities, municipalities with "smart city" systems, municipal bus systems, school districts with bus systems or child-safety/crossing zones). Further examples of types of entities that own or control permissioned data subscribers include private organizations or companies such as traffic awareness services (e.g., Google Maps), insurance companies (e.g., for individual policy pricing and/or overall rate setting), law firms (e.g., to gather safety information in support of individual or class action litigation), and/or private enterprises with safety-related products or services to market (e.g., firms that provide driving safety improvement courses).

A permissioned data subscriber becomes "permissioned" because its account address has special access credentials to perform transactions utilizing the data feed smart contract. In instances where a permissioned distributed application network is used, the special access credentials may be present because the distributed application network is a "permissioned" or private blockchain and the access credentials are controlled by the permissioned blockchain's overall functionality. In some implementations (for example, when the implementation uses a public/un-permissioned distributed application network such as ETHEREUM), the access credentials are controlled by data feed smart contract itself. For example, the data feed smart contract may store a list of authorized accounts and their access credentials in data structures belonging to or controlled by the data feed smart contract, and then check the identity of the account address and associated access credentials before executing a transaction (e.g., such as a function to return aggregated data).

In some instances, permissioned data subscribers may become permissioned (e.g., having access credentials to execute smart contract functions) by virtue of their role as a public-sector entity, though their individual access credentials may still vary by the role/mandate they serve as public-sector entities. In some instances, permissioned data subscribers may become permissioned by virtue of making a payment, e.g., for a monthly or yearly subscription. Such payments may be made via payment functions of the data feed smart contract and accepted by transfer of cryptographic token from the data subscriber's account or wallet to an account associated with the data feed smart contract.

In some implementations or embodiments, permissioned data subscribers may, in conjunction with other ways (e.g., role, payment) of becoming permissioned data subscribers, make payments in association with the individual transactions to run functions of the smart contract. Such payments may entail a fee in cryptographic token, paid at the time the transaction is submitted, from the data subscriber's account or wallet to an account associated with the data feed smart contract. Many blockchain networks (e.g., ETHEREUM) have the capability to attach cryptographic token transfers between accounts to most types of transactions. Any or all of an individual transaction fee may be used to satisfy network computation processing fees and/or other transaction fees (e.g., mining fees) required on the distributed application network.

In some implementations, some or all permissioned data subscribers may only have rights to access functions of the data feed smart contract because of transaction fee payments. For example, access to some functions may not be controlled by a separate data structure or designation of "authorized accounts" as such; for some types of functions or users, the access to the function is provided in conjunction with the payment of the processing fee.

It should be noted that any combination, or all, of these methods of giving "permissioned data subscribers" special access to road user data via the data feed smart contract may be combined in the same embodiment or implementation.

Continuing with FIG. 6, road user data is determined in accordance with the data feed request and access credentials associated with the permissioned data subscriber (602).

A data feed request is a call on the distributed application network that calls one or more functions of a data feed smart contract; the call may include a transaction or be a call to function(s) that only return data available to the local node. The data feed request may be defined by the specific function or functions being called and/or the parameters to those functions and/or may, as described below, be modified by the specific access credentials of the specific permissioned data subscriber sending the data feed request. Parameters to function calls can include selection criteria for filtering, grouping, or aggregating the road user data according to certain data elements.

"Road user data" can include information in tagging transaction data, confirmation transaction data, and/or associated weighting transactions, composite safety ratings, tagger reputation scores, tagging event weighting scores, confirmation data quality ratings, and/or other results computed thereon. Road user data may pertain to specific members and/or specific road user vehicles, aggregate sets of members according to selection criteria such as geolocation boundaries, and/or may be anonymized (or de-anonymized) in accordance with access credentials of the requesting permissioned data subscriber. Specific member road user data may include composite safety ratings, tagger reputation scores, and/or tagging transaction detail, as selection criteria and access credentials dictate (i.e., sometimes only reputation and sometimes only transaction detail may be available). FIG. 9 shows an example of a DApp web user interface containing both a vehicle safety rating 910 and associated tagging transaction details 920 that have been obtained via the data feed smart contract interfaces of Listing 1.

In some cases, road user data may be aggregated according to selection criteria in the data feed request, for example, geolocation boundary, tagging transaction date range, vehicle identification data, vehicle type, safety behavior type, member account identity, range of member safety ratings or vehicle safety ratings, range of tagger reputation scores, range of confirmation data quality ratings, range of tagging event weighting scores, or any other data element computed by the CRSS from distributed ledger transaction data in relation to the operation of the system.

Different types of and/or instances of permissioned data subscribers may have different access credentials that determine the granularity or visibility level (e.g., anonymized, aggregated, detailed and specific) of the road user data being returned. As described previously, these access credentials may enact granularity-level controls by controlling access to certain data feed smart contract functions or interfaces. For example, certain permissioned data subscribers can call functions that return anonymized road user data (e.g., data without specific vehicle identification data, lacking precise geolocation information, or lacking/obscuring other information), whereas they cannot call data feed smart contract functions that return data about specific road users. In some cases, access credentials may enact visibility level controls by obfuscating certain data before it is sent back to certain permissioned data subscribers. Some permissioned data subscribers may have access credentials that permit an unrestricted view of road user data.

Access credentials can, in some implementations, control the time window of data that is available to a permissioned data subscriber. For example, the permissioned data subscriber might only be sent the road user data gathered in the past 30 days (or another time limit), regardless of the selection criteria in the data feed request. This technical feature for advanced interchange helps prevent certain types of permissioned data subscribers, such as insurance companies, from having access to the "permanent record" of members of the CRSS, which may reduce the possibility of discrimination based on automated systems (a current principle in "fair" technical system design).

Other implementations may use access credentials to control data ranges pertaining to other aspects of transaction data, such geolocation boundaries or safety behavior type. For example, local law enforcement might be restricted to seeing only road user data pertaining to tagging transactions in their locality zone, e.g., city limits, county, state, etc., or whose safety behavior type is above a certain severity level (e.g., DUI, aggressive).

In some cases, access credentials may include not only the intrinsic access credentials associated with the permissioned data subscriber, but also the access credentials delegated by the member to which the road user data pertains. Certain implementations can utilize distributed application networks that include features for "multi-sig transactions," wherein the transaction request has to be signed or authorized by more than one distributed application network account. In embodiments that use these techniques, for instance, a data feed request "call" for a specific member's road user data (e.g., by the member's insurance company for a policy quoting contract) might require the transaction to be "signed" by both the permissioned data subscriber account's private key and the specific member account's private key before the function will execute and return the road user data to the permissioned data subscriber.

The road user data is sent to the permissioned data subscriber (603) in accordance with the characteristics of the distributed application network on which the data feed smart contract is instantiated. For example, data structures, database cursors, or links to secure files stored on storage services (including distributed storage services such as IPFS) may be returned to the node, smart contract, web or mobile DApp interface, or other system from which the data feed request originated.

In addition to previously mentioned examples, the examples below show outcomes and potential uses involving different kinds of permissioned data subscribers, access credentials, and data feed requests.

E1. An insurance company data subscriber, limited to road user data from only the past six month time window of tagging transactions, uses the road user data as an execution parameter for a smart contract that allows the insurance company to automate bespoke and highly accurate insurance policy quotes; the member "multi-sigs" the first stage of the request at the time he requested the quote on the insurer's website.

E2. An insurance company data subscriber requests anonymized and aggregated road user data about a geolocation boundary (e.g., the area bounded by a postal code) and uses the road user data to accurately set overall risk pool and pricing rate parameters based on the safety history of the geolocation boundary.

E3. The traffic engineering department of a municipality requests anonymized road user data about tagging transactions in a very specific geolocation designating a particular road intersection; it uses the road user data (e.g., which indicates a high incidence of running red traffic lights) to tune its traffic light-timing algorithm.

E4. A company that sells driver improvement courses requests specific road user data about members who have safety ratings below a certain threshold. It uses the data to automate a discount coupon campaign to the drivers who need it most.

E5. A law firm filing class-action litigation requests specific road user data that involves tagging transactions during a particular time period in a particular geolocation in order to identify class members who might have been harmed by the defective design of a certain freeway on-ramp.

E6. A local police department can request specific road user data about a particular driver who has been stopped by an officer. The specific road user data includes a composite safety rating and individual tagging event details for the past two weeks. The officer might use the information to make an informed decision about whether to issue a warning or a citation.

E7. Medical personnel (e.g., a member's doctor) or researchers request road user data about a member or members who have composite safety ratings below a certain threshold or demonstrate downward trends in safety ratings. The road user data is used to assess the progression of a disease associated with cognitive or physical degenerative qualities to determine a need for supervision, additional care or access to personal transportation.

E8. Municipal bus systems, school districts with bus systems or child-safety/crossing zones request anonymized road user data about tagging transactions in a very specific geolocation designating a particular road intersection periodically and/or at seasonal intervals (start of a school year). This data is used to reevaluate crossing zones and adjust bus routes to ensure safety of children or riders upon entering or exiting a bus and crossing a street.

E9. A conference organizer or tourist bureau requests anonymized road user data about tagging transactions in specific geolocations in the area around a conference or around popular tourist sights. This data is used to create maps of suggested crossing zones so that out of town visitors know how to move safely around a city. This data may also be distributed directly to out of town visitors through a website link that provides the data from dynamic interactions with the data feed smart contract.

In some embodiments, permissioned data subscribers (described in regard to FIG. 6) have the capability to utilize smart contracts to define the terms of incentives to road users that "self-revise" if a road user's vehicle identification data is the target of a tagging transaction.

In embodiments utilizing smart contracts, a self-revising incentive smart contract that is configured as described below in FIG. 7 can be deployed from program instructions by the CRSS to the distributed application network as described in respect to FIG. 1. The self-revising incentive smart contract binary code at deployment is propagated to the nodes of the distributed application network, and the nodes are then capable of handling calls and transactions that perform the functions below with regard to self-revising incentives. A self-revising incentive smart contract's interfaces may be a part of a distinct contract (e.g., logically or physically separate), or they may be functions and/or data structures that are part of one or more other contracts deployed by the CRSS, e.g., the incentive smart contract 160 or data feed smart contract 155.

The presence of a self-revising incentive smart contract on the nodes of the distributed application network enables network participants to interact with the self-revising incentive smart contract through interfaces (e.g., functions and/or data structures). FIG. 7 shows an example process flow for a self-revising incentive smart contract that enables permissioned data subscribers to define self-revising incentives in relation to specific vehicle identification data.

Types of permissioned data subscribers, their access credentials, and their modalities for interacting with and sending transactions to smart contracts of the distributed application network were discussed extensively with respect to FIG. 6. In embodiments where all or part of the individual transaction data structures are encrypted or otherwise obfuscated (e.g., for privacy or security of road users' data), the self-revising incentive smart contract interfaces may allow the encrypted or obfuscated data to be interacted with by permissioned data subscribers in a manner that is not possible for other participants in the distributed application network to do using raw transaction data structures.

Using the described technical features, advanced automated technical interchange modalities are possible. Examples of self-revising incentives, in broad concept, may be illustrative before discussing operational details of a self-revising incentive smart contract process flow. For example, police or sheriff's department data subscribers can issue drivers traffic violations/citations ("tickets") that have self-revising properties, such as warning tickets that convert to real tickets if the driver is "tagged" exhibiting a similar behavior in the next 30 days by other CRSS members, or tickets that have incremental fines (e.g., the amount of the fine doubles if the driver is tagged). As another example, insurance company data subscribers can issue policies wherein the discount is revoked if the driver is tagged. As another example, a regulator- or ratings-organization data subscriber (e.g., AAA, NTSB) can define credentials that revert to different levels if the driver is tagged, e.g., a truck-operator with a 5-star safety rating is lowered if the driver is tagged twice in the next month.

Element 700 designates the entry point for the process flow. Initially, a self-revising incentive transaction associated with specific vehicle identification data is received from the permissioned data subscriber via the self-revising incentive smart contract interface (701). The self-revising incentive transaction includes self-revision conditions and reversion events.

In embodiments, self-revising incentive transactions allow the permissioned data subscriber to define a "self-revising incentive token" provided by the smart contract that identifies or represents a data structure having the properties of the self-revising incentive. Properties include the vehicle identification data of the specific vehicle (or vehicles operated by a particular member) to watch. Specific vehicle identification data can describe more than one vehicle. For instance, in some cases, a self-revising incentive transaction may allow the permissioned data subscriber to define vehicle identification data for more than one vehicle by transmitting a member account identifier, which is then used to determine one or more specific vehicle identifiers associated with the member's account.

Properties can also include the "self-revision conditions" that are met before the self-revising incentive token reversion events are invoked: for example, a time range for the watch (e.g., the incentive will only self-revise for the next 30 days), a range (e.g., upper and/or lower threshold) for a member's or vehicle's composite safety rating, the threshold severity of safety behavior types (e.g., "aggressive"-level severity but not "speeding"-level severity), an event threshold indicating number of tagging transactions the specific vehicle identification data must be a target of before the reversion event is invoked, and/or an event condition that needs to be proven using a token or signature from another network account (e.g., a safe-driving class that must be attended or the reversion event is invoked). More than one self-revision condition can be combined with others.

The self-revising incentive token properties can also describe or define the "reversion events" (e.g., effects or behaviors) that are executed by the smart contract when the specific vehicle identification data is the target of a tagging transaction and the conditions hold true. For instance, the reversion event can initiate a transfer of a specific amount of cryptographic token from the target member token repository associated with the specific vehicle identification data to the permissioned data subscriber (e.g., to instantly reverse an insurance discount payment or cause a civil fine to be paid). In some cases, in some embodiments, the self-revising incentive token can be returned or reverted back to the permissioned data subscriber account (e.g., with a "violated" flag set to true) so that the permissioned data subscriber can automate a further behavior in its own or another smart contract (e.g., a smart contract defined by a local police department for tracking "warning tickets" that convert to real tickets if the driver is "tagged" for the same behavior in the next 30 days) or in another system attached to the distributed application network. In some cases or embodiments, the reversion behavior can include or define additional indicators or warnings to be sent to the permissioned data subscriber, such as an email to an email address associated with the permissioned data subscriber's account. More than one reversion event can be combined with others.

Self-revising incentive transactions may include payment of a transaction fee (e.g., to the contract account of the self-revising incentive smart contract or to an account belonging to another party, such as the CRSS) in some embodiments and operating conditions, as described in FIG. 6.

The distributed ledger is monitored for particular tagging transactions wherein the specific vehicle identification data matches the vehicle identification data in the particular tagging transactions, and, when self-revision conditions of the self-revising incentive transaction are met, the reversion events defined in the self-revising incentive transaction are enacted (702).

Tagging transactions stored on the distributed ledger may be monitored in a variety of ways. In an embodiment, events can be defined that communicate data about the tagging transaction (such as the vehicle identification data, tagging request data, and safety data) to distributed application network participants. The events can be acted on when event data meets certain conditions (e.g., the vehicle identification data noted in the event matches any member of a data structure containing specific vehicle identification data to monitor) to trigger the execution of additional smart contract functions. In another embodiment, a data structure containing specific vehicle identification data to monitor could be checked each time the CRSS stores a tagging transaction on the distributed ledger.

Having thus identified tagging transactions with associated self-revising incentive tokens (or data structures), the self-revision conditions in those data structures can be checked. For example, the self-revision condition for a time range might be checked against the tagging request timestamp; the safety behavior type in the tagging transaction data might be checked against the safety behavior severity threshold in the self-revision conditions; a composite safety rating might be checked against a self-revision condition defining a safety rating threshold.

If the self-revision conditions are met, then the reversion events defined in self-revising incentive transaction are enacted as described above, i.e., by initiating a transfer of a quantity of token from a distributed application network account associated with the vehicle identification data (e.g., the associated member's cryptographic token repository) to the permissioned data subscriber's account; and/or by returning or reverting the self-revising incentive token back to the permissioned data subscriber account so that the permissioned data subscriber can enact a further automated behavior in its own or another smart contract or other system attached to the distributed application network; and/or by sending additional indicators or warnings, such as an email, to the permissioned data subscriber describing the self-revising status.

It should be noted that in at least one implementation of the collaborative road user safety service/system, the example process flows of FIGS. 2B, 3A, 3C, and 4-7 are linked into a common embodiment.

FIG. 9 shows an example user interface a member can use to initiate tagging requests and view associated information. User interface screen 900 may be presented as part of an application, app, DApp, or web browser application that executes on a CSD. It should be noted that the example user interface screen in FIG. 9 is merely one way of interacting with the collaborative road user safety service using visual and/or touch screen-related user interaction motifs; others are possible, such as by using voice commands to a conversation/assistant agent (e.g., AMAZON ALEXA).

FIG. 9 shows various user interface elements and other information. Vehicle identification data for a target road user vehicle can be entered using the "Plate No." and "State" input elements 901. Informational element 902 shows the current latitude and longitude of the initiating device, and informational element 903 shows the account address of the initiating member on the distributed application network (here, a blockchain network). The safety behavior type of the target road user vehicle (part of the safety data) can be entered using input element 904. The user can initiate a tagging request by interacting with button-style command element 905. The "driver score," or composite safety rating, associated with the vehicle identification data can be requested using button-style command element 909, which shows the composite safety rating in element 910. In this example user interface, the initiating member can also review previous tagging event historical data associated with the vehicle identification data by interacting with command element 919. Informational grouping 920 shows the most recent prior tagging event data.

FIG. 10 shows a block diagram illustrating components of a system or computing device used in some embodiments of techniques and systems for facilitating collaborative road user safety. Any system, device, or component described herein, including a collaborative road user safety service/system (CRSS) (and components and subcomponents thereof), collaborative safety device (CSD), other alert receiver device, or distributed application node, may be implemented on one or more systems as described with respect to system 1000.

System 1000 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 1000 may be incorporated to implement a particular computing device; for example, a CSD may incorporate a GPS component and/or other sensors as described with respect to certain embodiments. System 1000 can itself include one or more computing systems or devices or be distributed across multiple computing devices or sub-systems that cooperate in executing program instructions. The hardware can be configured according to any suitable computer architectures such as a Symmetric Multi-Processing (SMP) architecture or a Non-Uniform Memory Access (NUMA) architecture.

The system 1000 can include a processing system 1001, which may include a processor or processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general-purpose CPU.

Storage system 1003 may comprise any computer-readable storage media readable by processing system 1001 and capable of storing software 1002 including, e.g., program instructions facilitating collaborative road user safety using program instruction modules, units, or smart contracts. Storage system 1003 may include volatile and nonvolatile, removable and non-removable media implemented in any method or technology for storage of information, such as computer-readable instructions, data structures, program modules, or other data.

Examples of storage media include random access memory (RAM), read only memory (ROM), magnetic disks, optical disks, write-once-read-many disks, CDs, DVDs, flash memory, solid state memory, phase change memory, 3D-XPoint memory, Universal Memory, or any other suitable storage media. Certain implementations may involve either or both virtual memory and non-virtual memory. In no case do storage media consist of a transitory propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by system 1000 in general or processing system 1001 in particular, direct system 1000 or processing system 1001 to operate as described herein. Software 1002 may provide program instructions 1004 that implement components for facilitating collaborative road user safety. Software 1002 may be implemented on system 1000 components, programs, agents, or layers that implement in machine-readable processing instructions 1004 the methods and techniques described herein.

Application programs 1010, OS 1015 and other software may be loaded into and stored in the storage system 1003. Device operating systems 1015 generally control and coordinate the functions of the various components in the computing device, providing an easier way for applications to connect with lower level interfaces like the networking interface. Non-limiting examples of operating systems include Windows® from Microsoft Corp., IOS™ from Apple, Inc., Android® OS from Google, Inc., Windows® RT from Microsoft, and different types of the Linux OS, such as Ubuntu® from Canonical or the Raspberry Pi OS. It should be noted that the OS 1015 may be implemented both natively on the computing device and on software virtualization layers running atop the native Device OS. Virtualized OS layers, while not depicted in FIG. 10, can be thought of as additional, nested groupings within the OS 1015 space, each containing an OS, application programs, and APIs.

In general, software 1002 may, when loaded into processing system 1001 and executed, transform system 1000 overall from a general-purpose computing system into a special-purpose computing system customized to facilitate collaborative road user safety in various systems, services devices, and apparatuses herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-readable storage media are characterized as primary or secondary storage. Software 1002 may also include firmware or some other form of machine-readable processing instructions executable by processing system 1001. Software 1002 may also include additional processes, programs, or components, such as operating system software and other application software.

System 1000 may represent any computing system on which software 1002 may be staged and from where software 1002 may be distributed, transported, downloaded, or otherwise provided to yet another computing system for deployment and execution, or yet additional distribution. System 1000 may also represent other computing systems that may form a necessary or optional part of an operating environment for the disclosed techniques and systems.

A communications interface 1005 may be included, providing communication connections and devices that allow for communication between system 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface may be controlled by the OS 1015, which informs applications and APIs of communications events when necessary.

Communications interface 1005 can also include components or interfaces for connecting CSDs to telemetry devices as described in regard to FIG. 2A.

It should be noted that many elements of system 1000 may be included in a system-on-a-chip (SoC) device. These elements may include, but are not limited to, the processing system 1001, a communications interface 1005, an audio interface 1040, a video interface 1045, and even elements of the storage system 1003 and software 1002.

Interface devices 1050 may include input devices such as a mouse 1051, track pad, keyboard 1052, microphone 1053, a touch device 1054 for receiving a touch gesture from a user, a motion input device 1055 for detecting non-touch gestures and other motions by a user, and other types of input devices and their associated processing elements capable of receiving user input.

The interface devices 1050 may also include output devices such as display screens 1056, speakers 1057, haptic devices for tactile feedback, and other types of output devices. In certain cases, the input and output devices may be combined in a single device, such as a touchscreen display which both depicts images and receives touch gesture input from the user. Visual output may be depicted on the display 1056 in myriad ways, presenting graphical user interface elements, text, images, video, notifications, virtual buttons, virtual keyboards, or any other type of information capable of being depicted in visual form. Other kinds of user interface are possible, such as voice user interfaces combining a microphone 1053 with speakers 1057 to receive audio prompts and input audio commands. User interface 1050 may also include associated user interface software executed by the OS 1015 in support of the various user input and output devices. Such software assists the OS in communicating user interface hardware events to application programs 1010 using defined mechanisms.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

EXAMPLES

The following examples present aspects of the disclosed systems and techniques present in some non-limiting embodiments:

Example 1. A system for a collaborative road user safety service, comprising: computer-readable storage media; a processing system; a communications interface; program instructions stored on the computer-readable storage media that, when executed by the processing system, direct the processing system to: receive a tagging request from an initiating device associated with an initiating member of a collaborative road user safety service, wherein the tagging request comprises GPS data from a GPS component of the initiating device and an initiating device identifier; receive vehicle identification data about a target road user vehicle associated with the tagging request; receive safety data associated with the tagging request; analyze and refining the GPS data, the vehicle identification data, and the safety data; and generate and submit a tagging transaction to store tagging data comprising the tagging request, the vehicle identification data, and the safety data in a data structure on a distributed ledger of a distributed application network.

Example 2. The system of example 1, wherein the computer-readable storage media further comprise program instructions that, when executed by the processing system, direct the processing system to: determine a confirming device geolocation boundary, derived from the GPS data of the initiating device, that includes the predicted locations of the target road user vehicle within a confirmation time interval; select a set of confirming devices of members of the collaborative road user safety service estimated to be within the confirming device geolocation boundary; send at least one confirmation request to at least one confirming device of the set of confirming devices; receive, from the at least one confirming device, at least one confirmation response to the at least one confirmation request, wherein the confirmation response comprises confirmation data including at least GPS data of the confirming device and one or more of user response data, sensor component data, and telemetry data; and generate and submit at least one confirmation transaction to store, on the distributed ledger in association with the tagging transaction, the confirmation data from the at least one confirmation response.

Example 3. The system of any of examples 1-2, wherein the computer-readable storage media further comprise program instructions that, when executed by the processing system, direct the processing system to: determine a set of confirming devices associated with members of the collaborative road user safety service that are linked to the target road user vehicle identified by the vehicle identification data; send a confirmation request to each confirming device of the set of confirming devices; receive a confirmation response from each confirming device of the set of confirming devices, the confirmation response comprising confirmation data including one or more of GPS data, sensor component data, and telemetry data; analyze and refine the confirmation data; and generate and submit a confirmation transaction to store the confirmation data from each confirming device on the distributed ledger in association with the tagging transaction.

Example 4. The system of any of examples 1-3, wherein the computer-readable storage media further comprise program instructions that, when executed by the processing system, direct the processing system to: determine a set of alert receiver devices of subscribing members of the collaborative road user safety service, wherein, for an alert receiver device in the set, the vehicle identification data of the target road user vehicle matches a watch parameter set by the subscribing member associated with the alert receiver device; refine the set of alert receiver devices in accordance with alert parameters associated with the related subscribing member to match characteristics of the safety data; and, for each alert receiver device in the set of alert receiver devices: determine an alert, wherein the alert is customized according to the alert parameters and the characteristics of the safety data; and send the alert to each alert receiver device.

Example 5. The system of any of examples 1-4, wherein the computer-readable storage media further comprise program instructions that, when executed by the processing system, direct the processing system to: determine an alerting geolocation boundary that includes the predicted locations of the target road user vehicle within an alerting time interval; determine a set of alert receiver devices of subscribing members of the collaborative road user safety service, wherein, for an alert receiver device in the set, the alert receiver device geolocation is within the alerting geolocation boundary and within minimum proximity constraints associated with the subscribing member associated with the alert receiver device; refine the set of alert receiver devices in accordance with alert parameters associated with the related subscribing member to match characteristics of the safety data; and, for each alert receiver device in the set of alert receiver devices: determine an alert, wherein the alert is customized according to the alert parameters and the characteristics of the safety data; and send the alert to each alert receiver device.

Example 6. The system of any of examples 4-5, wherein the alert receiver device is selected from a group comprising: a collaborative safety device, a vehicle electronic dashboard interface panel or console, a law enforcement dispatch console, an Emergency Management System (EMS) dispatch/monitoring console.

Example 7: The system of any of examples 4-6, wherein the alert is one or more of an in-app message, a mobile device operating system notification, a vehicle electronic dashboard interface panel or console message, a text message (e.g., SMS or MMS), phone message, email, browser notification, desktop OS notification, a notification or indicator within the interface of another mobile app or desktop application (such as Google® Maps), a virtual assistant notification (such as an Amazon Alexa® or Amazon Echo® notification enabled via a "skill"), and a message exposed via an API.

Example 8. The system of any of examples 1-7, wherein the computer-readable storage media further comprise program instructions that, when executed by the processing system, direct the processing system to: analyze the tagging data of the tagging transaction to determine a tagging event weighting score; interact with other data sources and a member data store to adjust the tagging event weighting score in accordance with operating condition factors related to the tagging data; adjust the tagging event weighting score in accordance with characteristics of confirmation data associated with the tagging transaction; analyze prior tagging data from prior tagging transactions and prior confirmation data from prior confirmation transactions associated with a target member or the vehicle identification data of the target road user vehicle to adjust the tagging event weighting score; adjust the tagging event weighting score in accordance with a composite safety rating associated with a target member or the vehicle identification data and a tagger reputation score associated with the initiating member; and generate and submit a weighting transaction to store the tagging event weighting score on the distributed ledger in association with the tagging transaction.

Example 9. The system of example 8, wherein the other data sources include one or more of a weather data service, a traffic data service, and a mapping data service.

Example 10. The system of any of examples 1-9, wherein the computer-readable storage media further comprise program instructions that, when executed by the processing system, direct the processing system to: transfer a quantity of cryptographic token into or out of an initiating member token repository associated with the initiating member, wherein the quantity of cryptographic token is derived from factors including a tagger reputation score of the initiating member, a composite safety rating associated with the vehicle identification data, and characteristics of the safety data.

Example 11. The system of any of examples 1-10, wherein the computer-readable storage media further comprise program instructions that, when executed by the processing system, direct the processing system to: identify a target member token repository associated with a target member of the collaborative road user safety service associated with the vehicle identification data of the tagging transaction; and transfer a quantity of cryptographic token into or out of the target member token repository, wherein the quantity of cryptographic token is derived from factors including a composite safety rating associated with the target member, a tagger reputation score of the initiating member, and characteristics of the safety data.

Example 12. The system of any of examples 1-11, wherein the computer-readable storage media further comprise program instructions that, when executed by the processing system, direct the processing system to: transfer a quantity of cryptographic token into or out of a confirming member token repository associated with a confirming device, wherein the quantity of cryptographic token is derived from factors including characteristics of the confirmation data of the confirmation transaction.

Example 13. The system of any of examples 1-12, wherein the computer-readable storage media further comprise program instructions that, when executed by the processing system, direct the processing system to: transfer a quantity of cryptographic token into or out of a member token repository, wherein the quantity of cryptographic token is derived from factors including a confirmation data quality rating associated with the confirmation data of the confirmation transaction.

Example 14. The system of example 13, wherein the member token repository is the target member token repository or the initiating member token repository.

Example 15. The system of any of examples 10-14, wherein the cryptographic token is a cryptocurrency.

Example 16. The system of any of examples 10-14, wherein the cryptographic token is a specialized cryptographic token issued by the system.

Example 17. The system of any of examples 1-16, wherein the computer-readable storage media further comprise program instructions for a data feed smart contract that, when executed by a node of the distributed application network, provide a data feed smart contract interface to permissioned data subscribers of the distributed application network configured to: receive a data feed request from a permissioned data subscriber via the data feed smart contract interface; determine road user data in accordance with the data feed request and access credentials associated with the permissioned data subscriber, wherein the road user data is aggregated, anonymized, de-anonymized, or specific data pertaining to one or more road users; and send the road user data to the permissioned data subscriber.

Example 18. The system of any of examples 1-17, wherein the computer-readable storage media further comprise program instructions for a self-revising incentive smart contract that, when executed by a node of the distributed application network, provide a self-revising incentive smart contract interface to permissioned data subscribers of the distributed application network configured to: receive, from a permissioned data subscriber via the self-revising incentive smart contract interface, a self-revising incentive transaction associated with specific vehicle identification data, wherein the self-revising incentive transaction includes self-revision conditions and reversion events; and monitor the distributed ledger for particular tagging transactions wherein the specific vehicle identification data matches vehicle identification data in the particular tagging transactions, and, when self-revision conditions of the self-revising incentive transaction are met, enact the reversion events defined in the self-revising incentive transaction.

Example 19. The system of any of examples 1-18, wherein the distributed ledger is a blockchain.

Example 20. The system of any of examples 1-19, further comprising a member data store disposed on the distributed ledger.

Example 21. The system of any of examples 2-20, wherein the confirmation request includes one or more of a question to confirm vehicle identification data or safety data, or an instruction to collect telemetry data or sensor data.

Example 22. A method for enhancing collaborative awareness of road user safety, comprising: receiving a tagging request from an initiating device associated with an initiating member of a collaborative road user safety service, wherein the tagging request comprises GPS data from a GPS component of the initiating device and an initiating device identifier; receiving vehicle identification data about a target road user vehicle associated with the tagging request; receiving safety data associated with the tagging request; analyzing and refining the GPS data, the vehicle identification data, and the safety data; and generating and submitting a tagging transaction to store tagging data comprising the tagging request, the vehicle identification data, and the safety data in a data structure on a distributed ledger of a distributed application network.

Example 23. The method of example 22, further comprising: determining a confirming device geolocation boundary, derived from the GPS data of the initiating device, that includes the predicted locations of the target road user vehicle within a confirmation time interval; selecting a set of confirming devices of members of the collaborative road user safety service estimated to be within the confirming device geolocation boundary; sending at least one confirmation request to at least one confirming device of the set of confirming devices; receiving, from the at least one confirming device, at least one confirmation response to the at least one confirmation request, wherein the confirmation response comprises confirmation data including at least GPS data of the confirming device and one or more of user response data, sensor component data, and telemetry data; and generating and submitting at least one confirmation transaction to store, on the distributed ledger in association with the tagging transaction, the confirmation data from the at least one confirmation response.

Example 24. The method of any of examples 22-23, further comprising: determining a set of confirming devices associated with members of the collaborative road user safety service that are linked to the target road user vehicle identified by the vehicle identification data; sending a confirmation request to each confirming device of the set of confirming devices; receiving a confirmation response from each confirming device of the set of confirming devices, the confirmation response comprising confirmation data including one or more of GPS data, sensor component data, and telemetry data; analyzing and refining the confirmation data; and generating and submitting a confirmation transaction to store the confirmation data from each confirming device on the distributed ledger in association with the tagging transaction.

Example 25. The method of any of examples 22-24, further comprising: determining a set of alert receiver devices of subscribing members of the collaborative road user safety service, wherein, for an alert receiver device in the set, the vehicle identification data of the target road user vehicle matches a watch parameter set by the subscribing member associated with the alert receiver device; refining the set of alert receiver devices in accordance with alert parameters associated with the related subscribing member to match characteristics of the safety data; and, for each alert receiver device in the set of alert receiver devices: determine an alert, wherein the alert is customized according to the alert parameters and the characteristics of the safety data; and send the alert to each alert receiver device.

Example 26. The method of any of examples 22-25, further comprising: determining an alerting geolocation boundary that includes the predicted locations of the target road user vehicle within an alerting time interval; determining a set of alert receiver devices of subscribing members of the collaborative road user safety service, wherein, for an alert receiver device in the set, the alert receiver device geolocation is within the alerting geolocation boundary and within minimum proximity constraints associated with the subscribing member associated with the alert receiver device; refining the set of alert receiver devices in accordance with alert parameters associated with the related subscribing member to match characteristics of the safety data; and, for each alert receiver device in the set of alert receiver devices: determine an alert, wherein the alert is customized according to the alert parameters and the characteristics of the safety data; and send the alert to each alert receiver device.

Example 27. The method of any of examples 25-26, wherein the alert receiver device is selected from a group comprising: a collaborative safety device, a vehicle electronic dashboard interface panel or console, a law enforcement dispatch console, an Emergency Management System (EMS) dispatch/monitoring console.

Example 28: The method of any of examples 25-27, wherein the alert is one or more of an in-app message, a mobile device operating system notification, a vehicle electronic dashboard interface panel or console message, a text message (e.g., SMS or MMS), phone message, email, browser notification, desktop OS notification, a notification or indicator within the interface of another mobile app or desktop application (such as Google® Maps), a virtual assistant notification (such as an Amazon Alexa® or Amazon Echo® notification enabled via a "skill"), and a message exposed via an API.

Example 29: The method of any of examples 22-28, further comprising: analyzing the tagging data of the tagging transaction to determine a tagging event weighting score; interacting with other data sources and a member data store to adjust the tagging event weighting score in accordance with operating condition factors related to the tagging data; adjusting the tagging event weighting score in accordance with characteristics of confirmation data associated with the tagging transaction; analyzing prior tagging data from prior tagging transactions and prior confirmation data from prior confirmation transactions associated with a target member or the vehicle identification data of the target road user vehicle to adjust the tagging event weighting score; adjusting the tagging event weighting score in accordance with a composite safety rating associated with a target member or the vehicle identification data and a tagger reputation score associated with the initiating member; and generating and submitting a weighting transaction to store the tagging event weighting score on the distributed ledger in association with the tagging transaction.

Example 30. The system of example 29, wherein the other data sources include one or more of a weather data service, a traffic data service, and a mapping data service.

Example 31: The method of any of examples 22-30, further comprising: transferring a quantity of cryptographic token into or out of an initiating member token repository associated with the initiating member, wherein the quantity of cryptographic token is derived from factors including a tagger reputation score of the initiating member, a composite safety rating associated with the vehicle identification data, and characteristics of the safety data.

Example 32: The method of any of examples 22-31, further comprising: identifying a target member token repository associated with a target member of the collaborative road user safety service associated with the vehicle identification data of the tagging transaction; and transferring a quantity of cryptographic token into or out of the target member token repository, wherein the quantity of cryptographic token is derived from factors including a composite safety rating associated with the target member, a tagger reputation score of the initiating member, and characteristics of the safety data.

Example 33: The method of any of examples 22-32, further comprising: transferring a quantity of cryptographic token into or out of a confirming member token repository associated with a confirming device, wherein the quantity of cryptographic token is derived from factors including characteristics of the confirmation data of the confirmation transaction.

Example 34: The method of any of examples 22-33, further comprising: transferring a quantity of cryptographic token into or out of a member token repository, wherein the quantity of cryptographic token is derived from factors including a confirmation data quality rating associated with the confirmation data of the confirmation transaction.

Example 35. The method of example 34, wherein the member token repository is the target member token repository or the initiating member token repository.

Example 36. The method of any of examples 31-35, wherein the cryptographic token is a cryptocurrency.

Example 37. The method of any of examples 31-35, wherein the cryptographic token is a specialized cryptographic token.

Example 38. The method of any of examples 22-37, further comprising: receiving a data request for road user quality data from a permissioned data subscriber; and providing, via a smart contract interface of the distributed application network, aggregated, anonymized, or specific road user quality data pertaining to one or more road users in accordance with access credentials associated with the permissioned data subscriber.

Example 39. The method of any of examples 22-38, wherein the distributed ledger is a blockchain.

Example 40. The method of any of examples 22-39, further comprising a member data store disposed on the distributed ledger.

Example 41. The method of any of examples 23-40, wherein the confirmation request includes one or more of a question to confirm vehicle identification data or safety data, or an instruction to collect telemetry data or sensor data.

Example 42. One or more computer-readable storage media having instructions stored theron, that when executed by a processing system, direct the processing system to perform the method according to any of examples 22-41.

Example 43. A system comprising: computer-readable storage media; a processing system; a communications interface; a GPS component; program instructions stored on the computer-readable storage media that, when executed by the processing system, direct the processing system to: provide a user interface for initiating a tagging request; upon receiving, at the user interface, an indication by an initiating member of a collaborative road user safety service: send a tagging request to the collaborative road user safety service via the communications interface, the tagging request comprising GPS data from the GPS component and an initiating device identifier; collect and send vehicle identification data about a target road user vehicle associated with the tagging request to the collaborative road user safety service, via the communications interface; and collect and send safety data associated with the tagging request to the collaborative road user safety service, via the communications interface.

Example 44. The system of example 43, wherein the collecting of at least some of the vehicle identification data or at least some of the safety data is performed by further program instructions stored on the computer-readable storage media that, when executed by the processing system, direct the processing system to: collect the vehicle identification data or the safety data from one or more of: a sensor component; and a telemetry device connected via the communications interface.

Example 45. The system of any of examples 43-44, wherein the computer-readable storage media further comprise program instructions that, when executed by the processing system, direct the processing system to: receive a confirmation request from the collaborative road user safety service, via the communications interface; in response to the confirmation request, collect confirmation data comprising GPS data from the GPS component; and send at least one confirmation response including the confirmation data to the collaborative road user safety service, via the communications interface.

Example 46. The system of example 45, wherein the confirmation data further comprises vehicle identification data or safety data collected from one or more of: a sensor component; and a telemetry device connected via the communications interface.

Example 47. The system of example 44 or example 46, wherein the sensor component includes one or more of: a camera, a GPS, an accelerometer, a gyroscope, a magnetometer, a proximity sensor, an ambient light sensor, a microphone, a touchscreen sensor, a fingerprint sensor, a barometer, a thermometer, a heart rate sensor, an air humidity sensors, and a Geiger counter.

Example 48. The system of example 44 or example 46, wherein the telemetry device includes one or more of: a camera placed on or in a vehicle, a motion sensor, and a part of the vehicle system of the vehicle.

Example 49. The system of any of examples 43-48, wherein the system is embodied in a mobile device and the program instructions are stored in an app on the computer-readable storage media.

Example 50. The system of any of examples 43-48, wherein the system is embodied in a vehicle system and the program instructions are uploaded into the computer-readable storage media of the vehicle system.

Example 51. The system of any of examples 43-48, wherein the system is embodied in a wearable device and the program instructions are stored in an app on the computer-readable storage media.

Example 52. The system of any of examples 43-49, wherein the user interface is substantially as shown in element 900.

Example 53. The system of any of examples 1-21, wherein the processing system is distributed across multiple computing devices in a cloud server configuration.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Certain features that are described in this disclosure in the context of separate embodiments can also be implemented in combination in a single embodiment. Conversely, various features that are described in the context of a single embodiment can be implemented in multiple embodiments separately or in various suitable sub-combinations. Also, features described in connection with one combination can be excised from that combination and can be combined with other features in various combinations and sub-combinations. Various features can be added to the example embodiments disclosed herein. Also, various features can be omitted from the example embodiments disclosed herein.

When "or" is used herein, it is intended to be used according to its typical meaning in logic, in which both terms being true (e.g., present in an embodiment) also result in configurations having an affirmative truth value. If the "XOR" meaning is intended (in which both terms being true would result in a negative truth value), "xor" or "exclusive or" will be explicitly stated.

Similarly, while operations are depicted in the drawings or described in a particular order, the operations can be performed in a different order than shown or described. Other operations not depicted can be incorporated before, after, or simultaneously with the operations shown or described. In certain circumstances, parallel processing or multitasking using separate processes or threads within an operating system may be used. Also, in some cases, the operations shown or discussed can be omitted or recombined to form various combinations and sub-combinations.

Listing 1

```
pragma solidity ^0.4.24;
import "./Ownable.sol";
import "./Pausable.sol"; // library enables pausing of smart contract
import "./SafeLicenseTags.sol"; // library for validating License Tag data
/** @title DriveAudit - Contract for recording driver behaviors and
locations associated with License Tags */
contract DriveAudit is Pausable {
    mapping (bytes10 => Tag) private tags; //mapping key is of the form 2-
letter state code and 8 alphacharacter plateno
        uint private numTags; //count of the number of tags
        enum Behaviors { None, Aggressive, Speeding, Proximity, Erratic, Hazard
}
        struct DriverReport {
            Behaviors behavior;
            address reportedBy;
            uint entryTime; //time code of entry of the driver report
```

Listing 1

```
        int longitude;
        int latitude;
    }
    struct Tag {
        bytes8 plateNo;
        bytes2 state;
        uint numReports;
        mapping (uint => DriverReport) driverReports;
        bool bExists;
        uint driverScore; //The total Driver Score
    }
    //Events
    event LogReported (address reportedBy, bytes8 plateNo, bytes2 state,
Behaviors behavior);
    event LogNewTag (bytes10 tagID, uint numTags);
    event LogPlateAccess (bytes10 tagID);
    //Const
    uint constant private MAX_RETURN = 10;
    int constant private UPPER_BOUND_GEO = 90*1e5;
    int constant private LOWER_BOUND_GEO = -90*1e5;
    // Driver Score weightings related to the behavior types
    uint constant private WT_AGGRESSIVE = 10;
    uint constant private WT_SPEEDING = 8;
    uint constant private WT_PROXIMITY = 5;
    uint constant private WT_ERRATIC = 6;
    uint constant private WT_HAZARD = 4;
    /**
    * @notice File a DriverReport on a specified Tag
    * @dev File a DriverReport on a specified Tag
    * @param _tagID The TagID of the vehicle's tag. BYTES10 composite of
two-letter state code and up to 8 letter plate number
    * @param _plateNo The plate number of the vehicle's tag - BYTES8
    * @param _state The state of the vehicle's tag - BYTES2
    * @param _behavior The reported behavior category - from BEHAVIORS
enum
    * @param _latitude The latitude of the geolocation of the report
(converted to integer at 1e5 precision)
    * @param _longitude The longitude of the geolocation of the report
(converted to integer at 1e5 precision)
    * @return key The TagID of the key in the mapping
    * @return numReports The number of reports against this tag
    */
    function fileReport (bytes10 _tagID, bytes8 _plateNo, bytes2 _state,
Behaviors _behavior, int _latitude, int _longitude)
    external whenNotPaused
    returns (bytes10 tag, uint) {
        //Validate PlateNo and State using Library
        require(SafeLicenseTags.validatePlateNoInternal(_plateNo)==true,
"Invalid Plate No");
        require(SafeLicenseTags.validateStateInternal(_state)==true,
"Invalid State Code");
        //Rather than failing, fix the latitude and longitude to zero if
they are out of bounds
        int latitude;
        int longitude;
        if (_latitude > UPPER_BOUND_GEO || _latitude < LOWER_BOUND_GEO ||
_longitude > UPPER_BOUND_GEO || _longitude < LOWER_BOUND_GEO) {
            latitude = 0;
            longitude = 0;
        } else {
            latitude = _latitude;
            longitude = _longitude;
        }
        //Check to see if tag is already initialized.
        //If not, set the tag data
        //Then add the driver report to the tag
        bytes10 key = _tagID;
        emit LogPlateAccess (key);
        if (!(tags[key].bExists)) {
            tags[key].plateNo = _plateNo;
            tags[key].state = _state;
            tags[key].driverScore = 0;
            tags[key].bExists = true;
            numTags++;
            emit LogNewTag (_tagID, numTags);
        }
        tags[key].numReports++;
```

Listing 1

```
        //Note: only using "now" for approximate entryTime, not for fine-
grained calculations
        tags[key].driverReports[tags[key].numReports] = DriverReport(
            {behavior: _behavior, reportedBy: msg.sender, entryTime: now,
latitude: latitude, longitude: longitude});
        //Add the behavior weight to the composite score
        tags[key].driverScore += _getBehaviorWeight(_behavior);
        emit LogReported (msg.sender, _plateNo, _state, _behavior);
        return (key, tags[key].numReports);
    }
    /** * @notice Get the most recent DriverReports about a specified Tag
     * @dev Returns most recent (up to MAX_RETURN) reports in LIFO order
     * @param tagID the TagID of the vehicle's tag
     * @return numReturned - the number of records returned
     * @return arrays of length MAX_RETURN - reportNo, addresses,
behaviors, timestamp, latitude, longitude       */
    function getRecentDriverReports(bytes10 tagID) external view
whenNotPaused
        returns (
        uint numReturned,
        uint[MAX_RETURN] reportNo,
        address[MAX_RETURN] addresses,
        Behaviors[MAX_RETURN] behaviors,
        uint[MAX_RETURN] timeReport,
        int[MAX_RETURN] latitude,
        int[MAX_RETURN] longitude ) {
            uint nR = tags[tagID].numReports;
            uint loopCount = 0;
            //Return the Driver reports in reverse entry order
            for (uint i = nR; (i > 0 && loopCount < MAX_RETURN); i--) {
                DriverReport memory dr = tags[tagID].driverReports[i];
                reportNo[loopCount] = i;
                addresses[loopCount] = dr.reportedBy;
                behaviors[loopCount] = dr.behavior;
                timeReport[loopCount] = dr.entryTime;
                latitude[loopCount] = dr.latitude;
                longitude[loopCount] = dr.longitude;
                loopCount++;
            }
            return (loopCount, reportNo, addresses, behaviors, timeReport,
latitude, longitude);
    }
    /** * @notice Get the driver score based on weighted composite of a
Tag's associated Driver Reports.
     * @dev Score is based on severity weighting of all the driver reports.
     * @param _tagID The tagID of the vehicles tag (i.e., STATE code +
PlateNo)
     * @return uint Driver Score value of driver */
    function getDriverScore(bytes10 _tagID) external view whenNotPaused
returns (uint) {
        return tags[_tagID].driverScore;
    }
    /**
     * @notice Return the weight value of a behavior
     * @dev Based on constants
     * @param _behavior Behavior type from Behaviors enum
     * @return uint Returns the Behavior weight
     */
    function _getBehaviorWeight(Behaviors _behavior) internal pure returns
(uint) {
        if (_behavior == Behaviors.Aggressive) {
            return WT_AGGRESSIVE;
        } else if (_behavior == Behaviors.Speeding) {
            return WT_SPEEDING;
        } else if (_behavior == Behaviors.Proximity) {
            return WT_PROXIMITY;
        } else if (_behavior == Behaviors.Erratic) {
            return WT_ERRATIC;
        } else if (_behavior == Behaviors.Hazard) {
            return WT_HAZARD;
        } else {
            return 0;
        }
    }
    /**
     * @notice Get the total number of Tags
     * @dev Accessor function for the private state variable numTags
```

Listing 1

```
 * @return uint Number of Tags in the DriveAudit registry.
 */
function getTagCount( ) external view whenNotPaused returns (uint) {
    return numTags;
}
/**
 * @notice Get the total number of DriverReports in the specified Tag.
 * @dev TagID in BYTES10 form.
 * @param _tagID the TagID of the vehicle's tag.
 * @return numReports Number of reports on this Tag.
 */
function getReportCount(bytes10 _tagID) external view whenNotPaused
returns (uint) {
    return tags[_tagID].numReports;
}
/**
 * @notice Get a specific DriverReport about a specified Tag
 * @param _tagID the TagID of the vehicle's tag
 * @param _index the number of the driver report
 * @return the members of the DriverReport struct
 */
function getDriverReportByIndex(bytes10 _tagID, uint _index) external
view whenNotPaused
    returns (Behaviors, address, uint, int, int) {
        DriverReport memory dr = tags[_tagID].driverReports[_index];
        return (dr.behavior, dr.reportedBy, dr.entryTime, dr.latitude,
dr.longitude);
}
/**
 * @notice Kill the contract and send funds to owner
 * @dev Can only be called by owner, when paused
 */
function terminateContract( ) public onlyOwner whenPaused {
    selfdestruct(owner);
}
/**
 * @notice DriverReport fallback function
 * @dev Fallback function, called if other functions don't match call
or Ether is sent without data.
 * @dev Ether sent to this contract is reverted to sender.
 * @dev Typically, called when invalid data is sent.
 */
function ( ) public {
    revert("Fallback function - reverted any Ether to sender");
}
}
```

What is claimed is:

1. A system for a collaborative road user safety service, comprising:

computer-readable storage media;

a processing system;

a communications interface;

a distributed application node belonging to a distributed application network comprising a distributed ledger;

program instructions stored on the computer-readable storage media that, when executed by the processing system, direct the processing system to:

receive a tagging request from an initiating device associated with an initiating member of a collaborative road user safety service, wherein the tagging request comprises GPS data from a GPS component of the initiating device and an initiating device identifier;

receive vehicle identification data about a target road user vehicle associated with the tagging request;

receive safety data associated with the tagging request;

analyze and refine the GPS data, the vehicle identification data, and the safety data;

using the distributed application node, generate and submit a tagging transaction to store tagging data comprising the tagging request, the vehicle identification data, and the safety data in a data structure on the distributed ledger;

determine an alerting geolocation boundary that includes predicted locations of the target road user vehicle within an alerting time interval;

determine a set of alert receiver devices of subscribing members of the collaborative road user safety service, wherein, for an alert receiver device in the set, the alert receiver device geolocation is within the alerting geolocation boundary and within minimum proximity constraints associated with the subscribing member associated with the alert receiver device;

refine the set of alert receiver devices in accordance with alert parameters associated with the related subscribing member to match characteristics of the safety data; and for each alert receiver device in the set of alert receiver devices:

determine an alert, wherein the alert is customized according to the alert parameters and the characteristics of the safety data; and send the alert to each alert receiver device.

2. The system of claim 1, wherein the computer-readable storage media further comprise program instructions that, when executed by the processing system, direct the processing system to:
- determine a confirming device geolocation boundary, derived from the GPS data of the initiating device, that includes the predicted locations of the target road user vehicle within a confirmation time interval;
- select a set of confirming devices of members of the collaborative road user safety service estimated to be within the confirming device geolocation boundary;
- send at least one confirmation request to at least one confirming device of the set of confirming devices;
- receive, from the at least one confirming device, at least one confirmation response to the at least one confirmation request, wherein the confirmation response comprises confirmation data including at least GPS data of the confirming device and one or more of user response data, sensor component data, and telemetry data; and
- using the distributed application node, generate and submit at least one confirmation transaction to store, on the distributed ledger in association with the tagging transaction, the confirmation data from the at least one confirmation response.

3. The system of claim 1, wherein the computer-readable storage media further comprise program instructions that, when executed by the processing system, direct the processing system to:
- determine a set of confirming devices associated with members of the collaborative road user safety service that are linked to the target road user vehicle identified by the vehicle identification data;
- send a confirmation request to each confirming device of the set of confirming devices;
- receive a confirmation response from each confirming device of the set of confirming devices, the confirmation response comprising confirmation data including one or more of GPS data, sensor component data, and telemetry data;
- analyze and refine the confirmation data; and
- using the distributed application node, generate and submit a confirmation transaction to store the confirmation data from each confirming device on the distributed ledger in association with the tagging transaction.

4. The system of claim 1, wherein the computer-readable storage media further comprise program instructions that, when executed by the processing system, direct the processing system to:
- determine a set of alert receiver devices of subscribing members of the collaborative road user safety service, wherein, for an alert receiver device in the set, the vehicle identification data of the target road user vehicle matches a watch parameter set by the subscribing member associated with the alert receiver device;
- refine the set of alert receiver devices in accordance with alert parameters associated with the related subscribing member to match characteristics of the safety data; and
- for each alert receiver device in the set of alert receiver devices:
  - determine an alert, wherein the alert is customized according to the alert parameters and the characteristics of the safety data; and
  - send the alert to each alert receiver device.

5. The system of claim 1, wherein the computer-readable storage media further comprise program instructions that, when executed by the processing system, direct the processing system to:
- analyze the tagging data of the tagging transaction to determine a tagging event weighting score;
- interact with other data sources and a member data store to adjust the tagging event weighting score in accordance with operating condition factors related to the tagging data;
- adjust the tagging event weighting score in accordance with characteristics of confirmation data associated with the tagging transaction;
- obtain, from the distributed application node, prior tagging data from prior tagging transactions and prior confirmation data from prior confirmation transactions associated with a target member or the vehicle identification data of the target road user vehicle;
- analyze the prior tagging data and the prior confirmation data to adjust the tagging event weighting score;
- adjust the tagging event weighting score in accordance with a composite safety rating associated with a target member or the vehicle identification data and a tagger reputation score associated with the initiating member; and
- using the distributed application node, generate and submit a weighting transaction to store the tagging event weighting score on the distributed ledger in association with the tagging transaction.

6. The system of claim 1, wherein the computer-readable storage media further comprise program instructions that, when executed by the processing system, direct the processing system to:
- using the distributed application node, transfer a quantity of cryptographic token into or out of an initiating member token repository on the distributed application network associated with the initiating member, wherein the quantity of cryptographic token is derived from factors including a tagger reputation score of the initiating member, a composite safety rating associated with the vehicle identification data, and characteristics of the safety data.

7. The system of claim 1, wherein the computer-readable storage media further comprise program instructions that, when executed by the processing system, direct the processing system to:
- identify a target member token repository on the distributed application network associated with a target member of the collaborative road user safety service associated with the vehicle identification data of the tagging transaction; and
- using the distributed application node, transfer a quantity of cryptographic token into or out of the target member token repository, wherein the quantity of cryptographic token is derived from factors including a composite safety rating associated with the target member, a tagger reputation score of the initiating member, and characteristics of the safety data.

8. The system of claim 1, wherein the computer-readable storage media further comprise program instructions that, when executed by the processing system, direct the processing system to:
- using the distributed application node, transfer a quantity of cryptographic token into or out of a confirming member token repository on the distributed application network associated with a confirming device, wherein the quantity of cryptographic token is derived from factors including characteristics of the confirmation data of the confirmation transaction.

9. The system of claim 1, wherein the computer-readable storage media further comprise program instructions that, when executed by the processing system, direct the processing system to:

using the distributed application node, transfer a quantity of cryptographic token into or out of a member token repository on the distributed application network, wherein the quantity of cryptographic token is derived from factors including a confirmation data quality rating associated with the confirmation data of the confirmation transaction.

10. A system for a collaborative road user safety service, comprising:

computer-readable storage media;

a processing system;

a communications interface;

a distributed application node belonging to a distributed application network comprising a distributed ledger;

program instructions stored on the computer-readable storage media that, when executed by the processing system, direct the processing system to:

receive a tagging request from an initiating device associated with an initiating member of a collaborative road user safety service, wherein the tagging request comprises GPS data from a GPS component of the initiating device and an initiating device identifier;

receive vehicle identification data about a target road user vehicle associated with the tagging request;

receive safety data associated with the tagging request;

analyze and refine the GPS data, the vehicle identification data, and the safety data;

using the distributed application node, generate and submit a tagging transaction to store tagging data comprising the tagging request, the vehicle identification data, and the safety data in a data structure on the distributed ledger;

further instructions stored on the data storage device of the distributed application node for a data feed smart contract that, when executed by a node of the distributed application network, provide a data feed smart contract interface to permissioned data subscribers of the distributed application network configured to:

receive a data feed request from a permissioned data subscriber via the data feed smart contract interface;

determine road user data in accordance with the data feed request and access credentials associated with the permissioned data subscriber, wherein the road user data is aggregated, anonymized, de-anonymized, or specific data pertaining to one or more road users; and send the road user data to the permissioned data subscriber.

11. A system for a collaborative road user safety service, comprising:

computer-readable storage media;

a processing system;

a communications interface;

a distributed application node belonging to a distributed application network comprising a distributed ledger;

program instructions stored on the computer-readable storage media that, when executed by the processing system, direct the processing system to:

receive a tagging request from an initiating device associated with an initiating member of a collaborative road user safety service, wherein the tagging request comprises GPS data from a GPS component of the initiating device and an initiating device identifier;

receive vehicle identification data about a target road user vehicle associated with the tagging request;

receive safety data associated with the tagging request;

analyze and refine the GPS data, the vehicle identification data, and the safety data;

using the distributed application node, generate and submit a tagging transaction to store tagging data comprising the tagging request, the vehicle identification data, and the safety data in a data structure on the distributed ledger;

further instructions stored on the data storage device of the distributed application node for a self-revising incentive smart contract that, when executed by a node of the distributed application network, provide a self-revising incentive smart contract interface to permissioned data subscribers of the distributed application network configured to:

receive, from a permissioned data subscriber via the self-revising incentive smart contract interface, a self-revising incentive transaction associated with specific vehicle identification data, wherein the self-revising incentive transaction comprises a self-revising incentive token that includes self-revision conditions and reversion events; and monitor the distributed ledger for particular tagging transactions wherein the specific vehicle identification data matches vehicle identification data in the particular tagging transactions, and, when self-revision conditions of the self-revising incentive token are met, enact the reversion events defined in the self-revising incentive token.

* * * * *